US012386055B2

(12) United States Patent
Duan et al.

(10) Patent No.: US 12,386,055 B2
(45) Date of Patent: Aug. 12, 2025

(54) ENHANCED TIME DIFFERENCE OF ARRIVAL BASED POSITIONING FOR USER EQUIPMENT

(71) Applicant: QUALCOMM Incorporated, San Diego, CA (US)

(72) Inventors: Weimin Duan, San Diego, CA (US); Alexandros Manolakos, Escondido, CA (US); Seyong Park, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 386 days.

(21) Appl. No.: 18/018,535

(22) PCT Filed: Sep. 1, 2021

(86) PCT No.: PCT/US2021/048717
§ 371 (c)(1),
(2) Date: Jan. 27, 2023

(87) PCT Pub. No.: WO2022/055772
PCT Pub. Date: Mar. 17, 2022

(65) Prior Publication Data
US 2024/0012129 A1    Jan. 11, 2024

(30) Foreign Application Priority Data
Sep. 11, 2020    (GR) ............................... 20200100553

(51) Int. Cl.
H04W 64/00    (2009.01)
G01S 13/74    (2006.01)

(52) U.S. Cl.
CPC ............. *G01S 13/74* (2013.01); *H04W 64/00* (2013.01)

(58) Field of Classification Search
None
See application file for complete search history.

(56) References Cited

U.S. PATENT DOCUMENTS

| 2011/0216747 | A1  | 9/2011 | Shao et al. |
| 2017/0307723 | A1* | 10/2017 | Edge .......................... G01S 5/10 |
| 2020/0112867 | A1 | 4/2020 | Opshaug et al. |

FOREIGN PATENT DOCUMENTS

| KR | 20140081498 A | 7/2014 |
| WO | 2017040075 A1 | 3/2017 |

(Continued)

OTHER PUBLICATIONS

International Search Report and Written Opinion—PCT/US2021/048717—ISA/EPO—Apr. 5, 2022.

(Continued)

*Primary Examiner* — Suhail Khan
(74) *Attorney, Agent, or Firm* — Procopio, Cory, Hargreaves & Savitch LLP

(57) ABSTRACT

Downlink and uplink Time Difference of Arrival (TDOA) is performed using Reference Signal Time Difference (RSTD) measurements. The transmissions and measurements of positioning reference signals (PRS) are configured to mitigate or eliminate network synchronization errors which conventionally limit positioning accuracy of TDOA. The synchronization errors are mitigated using inter-base station PRS, and transmission of the PRS in response to receipt of the initial reference signal. For DL TDOA, a reference base station may transmit PRS to the user equipment (UE) and neighboring base station. In response, the neighboring base station transmits PRS to the UE. The RSTD may be determined as the difference in the time of reception of the PRS signals received at the UE after removal of the total delay for transmitting the PRS by the neighboring base station, (Continued)

including propagation time and processing time. The RSTD for UL TDOA may be determined in a similar manner.

18 Claims, 26 Drawing Sheets

(56) References Cited

FOREIGN PATENT DOCUMENTS

| | | |
|---|---|---|
| WO | 2020003896 A1 | 1/2020 |
| WO | 2020063393 A1 | 4/2020 |

OTHER PUBLICATIONS

Partial International Search Report—PCT/US2021/048717—ISA/EPO—Feb. 11, 2022.

* cited by examiner

ENHANCED TIME DIFFERENCE OF ARRIVAL BASED POSITIONING FOR USER EQUIPMENT

CROSS REFERENCE TO RELATED APPLICATION(S)

This application is a National Stage Application filed under 35 U.S.C. § 371 of PCT International Application Serial No. PCT/US2021/048717 entitled "METHODS AND APPARATUS FOR ENHANCED TIME DIFFERENCE OF ARRIVAL BASED POSITIONING FOR USER EQUIPMENT" and filed on Sep. 1, 2021, which claims priority to Greek application No. 20200100553, filed Sep. 11, 2020, entitled "METHODS AND APPARATUS FOR ENHANCED TIME DIFFERENCE OF ARRIVAL BASED POSITIONING FOR USER EQUIPMENT," which are expressly incorporated by reference herein in their entirety.

BACKGROUND

Field

Subject matter disclosed herein relates to positioning of user equipment using received positioning reference signals and more particularly to antenna adaptation for the user equipment based on the configuration of the positioning references signals.

Information

The location of a user equipment (UE), such as a cellular telephone, may be useful or essential to a number of applications including emergency calls, navigation, direction finding, asset tracking and Internet service. The location of a UE may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit downlink reference signals that are used for positioning, such as a positioning reference signal (PRS). Assistance data is sent to a UE to assist in acquiring and measuring signals, and in some implementations, to compute a location estimate from the measurements. A UE may acquire PRSs transmitted from different base stations and perform positioning measurements such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AOD), and multi-cell Round Trip Time (RTT). The UE may compute an estimate of its own location using various positioning methods or may send the positioning measurements to a network entity, e.g., location server, which may compute the UE location based on the positioning measurements. Improvements in accuracy in positioning are desirable.

SUMMARY

Downlink and uplink Time Difference of Arrival (TDOA) is performed using Reference Signal Time Difference (RSTD) measurements. The transmission of positioning reference signals (PRS) and measurement of the reception of the PRS are configured to mitigate or eliminate network synchronization errors which conventionally limit positioning accuracy of TDOA. The synchronization errors are mitigated using inter-base station PRS, and transmission of the PRS in response to receipt of the initial reference signal. For DL TDOA, for example, a reference base station may transmit PRS to the user equipment (UE) and neighboring base station, e.g. as the same PRS transmission or separate PRS transmissions. In response to the initial reference signal from the reference base station, the neighboring base station transmits PRS to the UE. The RSTD may be determined as the difference in the time of reception of the PRS signals received at the UE after removal of the total delay for transmission of the PRS by the neighboring base station in response to receiving the PRS from the reference base station, including propagation time of the PRS from the reference base station to the neighboring base station and the processing time at the neighboring base station. The processing delay, for example, includes the time between receiving the initial reference signal by the neighboring base station and transmitting the PRS to the UE. The RSTD for UL TDOA may be determined in a similar manner. For example, the UE transmits sounding reference signals (SRS) to the reference and neighboring base stations, e.g., as a single SRS transmission or separate SRS transmissions. The neighboring base station transmits PRS to the reference base station in response to receipt of the initial reference signal from the UE. The RSTD may be determined as the difference in the time of reception of the SRS and PRS signals received at the reference base station after removal of the total delay associated with the PRS received by the reference base station, including the propagation time of the PRS from the neighboring base station to the reference base station and the processing delay at the neighboring base station. The processing delay, in this example, includes the time between receiving the initial reference signal (SRS) from the UE by the neighboring base station and transmitting the PRS to the reference base station.

In one implementation, a method for supporting Observed Time Difference of Arrival (OTDOA) positioning of a user equipment (UE) in a wireless network performed by a base station, includes receiving a first positioning reference signal (PRS) from a reference base station; transmitting a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmitting to a network entity at least a portion of the total delay for determination of a Reference Signal Time Difference (RSTD) between reception by the UE of a third PRS transmitted by the reference base station and reception by the UE of the second PRS.

In one implementation, a base station configured for supporting Observed Time Difference of Arrival (OTDOA) positioning of a user equipment (UE) in a wireless network includes an external interface configured to communicate with entities in a wireless network; at least one memory; at least one processor coupled to the external interface and the at least one memory, wherein the at least one processor is configured to: receive a first positioning reference signal (PRS) from a reference base station; transmit a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmit to a network entity at least a portion of the total delay for determination of a Reference Signal Time Difference (RSTD) between reception by the UE of a third PRS transmitted by the reference base station and reception by the UE of the second PRS.

In one implementation, a base station configured for supporting Observed Time Difference of Arrival (OTDOA) positioning of a user equipment (UE) in a wireless network, includes means for receiving a first positioning reference signal (PRS) from a reference base station; means for transmitting a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and means for transmitting to a network entity at least a portion of the total delay for determination of a Reference Signal Time Difference (RSTD) between reception by the UE of a third PRS transmitted by the reference base station and reception by the UE of the second PRS.

In one implementation, a non-transitory storage medium including program code stored thereon, the program code is operable to configure at least one processor in a base station for supporting Observed Time Difference of Arrival (OTDOA) positioning of a user equipment (UE) in a wireless network, the program code comprising instructions to: receive a first positioning reference signal (PRS) from a reference base station; transmit a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmit to a network entity at least a portion of the total delay for determination of a Reference Signal Time Difference (RSTD) between reception by the UE of a third PRS transmitted by the reference base station and reception by the UE of the second PRS.

In one implementation, a method for supporting Observed Time Difference of Arrival (OTDOA) positioning of a user equipment (UE) in a wireless network performed by a location server, includes receiving a location information message from the UE comprising an indication of a first time of reception of a first positioning reference signal (PRS) from a reference base station and a second time of reception of a second PRS from a neighboring base station; receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and determining a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

In one implementation, a location server configured for supporting Observed Time Difference of Arrival (OTDOA) positioning of a user equipment (UE) in a wireless network includes an external interface configured to communicate with entities in a wireless network; at least one memory; at least one processor coupled to the external interface and the at least one memory, wherein the at least one processor is configured to: receive a location information message from the UE comprising an indication of a first time of reception of a first positioning reference signal (PRS) from a reference base station and a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and determine a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

In one implementation, a location server configured for supporting Observed Time Difference of Arrival (OTDOA) positioning of a user equipment (UE) in a wireless network, includes means for receiving a location information message from the UE comprising an indication of a first time of reception of a first positioning reference signal (PRS) from a reference base station and a second time of reception of a second PRS from a neighboring base station; means for receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and means for determining a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

In one implementation, a non-transitory storage medium including program code stored thereon, the program code is operable to configure at least one processor in a location server for supporting Observed Time Difference of Arrival (OTDOA) positioning of a user equipment (UE) in a wireless network, the program code comprising instructions to: receive a location information message from the UE comprising an indication of a first time of reception of a first positioning reference signal (PRS) from a reference base station and a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and determine a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

In one implementation, a method for supporting Observed Time Difference of Arrival (OTDOA) positioning of a user equipment (UE) in a wireless network performed by the UE, includes measuring a first time of reception of a first positioning reference signal (PRS) from a reference base station; measuring a second time of reception of a second PRS from a neighboring base station; receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; determining a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

In one implementation, a user equipment (UE) configured for supporting Observed Time Difference of Arrival (OTDOA) positioning of the UE in a wireless network includes a wireless transceiver configured to wirelessly communicate with entities in a wireless network; at least one memory; at least one processor coupled to the wireless transceiver and the at least one memory, wherein the at least one processor is configured to: measure a first time of reception of a first positioning reference signal (PRS) from a reference base station; measure a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; determine a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

In one implementation, a user equipment (UE) configured for supporting Observed Time Difference of Arrival (OTDOA) positioning of the UE in a wireless network, includes means for measuring a first time of reception of a first positioning reference signal (PRS) from a reference base station; means for measuring a second time of reception of a second PRS from a neighboring base station; means for receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; and means for determining a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

In one implementation, a non-transitory storage medium including program code stored thereon, the program code is operable to configure at least one processor in a user equipment (UE) for supporting Observed Time Difference of Arrival (OTDOA) positioning of the UE in a wireless network, the program code comprising instructions to: measure a first time of reception of a first positioning reference signal (PRS) from a reference base station; measure a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; determine a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

In one implementation, a method for supporting Uplink Time Difference of Arrival (UTDOA) positioning of a user equipment (UE) in a wireless network performed by a base station, includes receiving a sounding reference signal (SRS) for positioning from the UE; transmitting a positioning reference signal (PRS) to a reference base station in response to receiving the SRS, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and transmitting to a network entity at least a portion of the total delay for determination of a Reference Signal Time Difference (RSTD) between receiving the SRS from the UE and reception by the reference base station of a second SRS transmitted by the UE.

In one implementation, a base station configured for supporting Uplink Time Difference of Arrival (UTDOA) positioning of a user equipment (UE) in a wireless network includes an external interface configured to communicate with entities in a wireless network; at least one memory; at least one processor coupled to the external interface and the at least one memory, wherein the at least one processor is configured to: receive a sounding reference signal (SRS) for positioning from the UE; transmit a positioning reference signal (PRS) to a reference base station in response to receiving the SRS, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and transmit to a network entity at least a portion of the total delay for determination of a Reference Signal Time Difference (RSTD) between receiving the SRS from the UE and reception by the reference base station of a second SRS transmitted by the UE.

In one implementation, a base station configured for supporting Uplink Time Difference of Arrival (UTDOA) positioning of a user equipment (UE) in a wireless network, includes means for receiving a sounding reference signal (SRS) for positioning from the UE; means for transmitting a positioning reference signal (PRS) to a reference base station in response to receiving the SRS, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and means for transmitting to a network entity at least a portion of the total delay for determination of a Reference Signal Time Difference (RSTD) between receiving the SRS from the UE and reception by the reference base station of a second SRS transmitted by the UE.

A non-transitory storage medium including program code stored thereon, the program code is operable to configure at least one processor in a base station for supporting Uplink Time Difference of Arrival (UTDOA) positioning of a user equipment (UE) in a wireless network, the program code comprising instructions to: receive a sounding reference signal (SRS) for positioning from the UE; transmit a positioning reference signal (PRS) to a reference base station in response to receiving the SRS, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and transmit to a network entity at least a portion of the total delay for determination of a Reference Signal Time Difference (RSTD) between receiving the SRS from the UE and reception by the reference base station of a second SRS transmitted by the UE.

In one implementation, a method for supporting Uplink Time Difference of Arrival (UTDOA) positioning of a user equipment (UE) in a wireless network performed by a base station, includes measuring a first time of reception of a sounding reference signal (SRS) from the UE; measuring a second time of reception of a positioning reference signal (PRS) from a neighboring base station; and transmitting to a network entity an indication of a difference between the first time of reception of the SRS and the second time of reception of the PRS for determination of a Reference Signal Time Difference (RSTD) between receiving the SRS from the UE and receiving the PRS from the neighboring base station.

In one implementation, a base station configured for supporting Uplink Time Difference of Arrival (UTDOA) positioning of a user equipment (UE) in a wireless network includes an external interface configured to communicate with entities in a wireless network; at least one memory; at least one processor coupled to the external interface and the at least one memory, wherein the at least one processor is configured to: measure a first time of reception of a sounding reference signal (SRS) from the UE; measure a second time of reception of a positioning reference signal (PRS) from a neighboring base station; and transmit to a network entity an indication of a difference between the first time of reception of the SRS and the second time of reception of the PRS for determination of a Reference Signal Time Difference (RSTD) between receiving the SRS from the UE and receiving the PRS from the neighboring base station.

In one implementation, a base station configured for supporting Uplink Time Difference of Arrival (UTDOA) positioning of a user equipment (UE) in a wireless network, includes means for measuring a first time of reception of a sounding reference signal (SRS) from the UE; means for measuring a second time of reception of a positioning reference signal (PRS) from a neighboring base station; and means for transmitting to a network entity an indication of a difference between the first time of reception of the SRS and the second time of reception of the PRS for determination of a Reference Signal Time Difference (RSTD) between receiving the SRS from the UE and receiving the PRS from the neighboring base station.

In one implementation, a non-transitory storage medium including program code stored thereon, the program code is operable to configure at least one processor in a base station for supporting Uplink Time Difference of Arrival (UTDOA) positioning of a user equipment (UE) in a wireless network, the program code comprising instructions to: measure a first time of reception of a sounding reference signal (SRS) from the UE; measure a second time of reception of a positioning reference signal (PRS) from a neighboring base station; and transmit to a network entity an indication of a difference between the first time of reception of the SRS and the second time of reception of the PRS for determination of a Reference Signal Time Difference (RSTD) between receiving the SRS from the UE and receiving the PRS from the neighboring base station.

In one implementation, a method for supporting Uplink Time Difference of Arrival (UTDOA) positioning of a user equipment (UE) in a wireless network performed by a location server, includes receiving a first measurement report message from a reference base station comprising an indication of a first time of reception of a first sounding reference signal (SRS) for positioning from the UE and a second time of reception of a positioning reference signal (PRS) from a neighboring base station; receiving a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and determining a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

In one implementation, a location server configured for supporting Uplink Time Difference of Arrival (UTDOA) positioning of a user equipment (UE) in a wireless network includes an external interface configured to communicate with entities in a wireless network; at least one memory; at least one processor coupled to the external interface and the at least one memory, wherein the at least one processor is configured to: receive a first measurement report message from a reference base station comprising an indication of a first time of reception of a first sounding reference signal (SRS) for positioning from the UE and a second time of reception of a positioning reference signal (PRS) from a neighboring base station; receive a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and determine a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

In one implementation, a location server configured for supporting Uplink Time Difference of Arrival (UTDOA) positioning of a user equipment (UE) in a wireless network, includes means for receiving a first measurement report message from a reference base station comprising an indication of a first time of reception of a first sounding reference signal (SRS) for positioning from the UE and a second time of reception of a positioning reference signal (PRS) from a neighboring base station; means for receiving a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and means for determining a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

In one implementation, a non-transitory storage medium including program code stored thereon, the program code is operable to configure at least one processor in a location server for supporting Uplink Time Difference of Arrival (UTDOA) positioning of a user equipment (UE) in a wireless network, the program code comprising instructions to: receive a first measurement report message from a reference base station comprising an indication of a first time of reception of a first sounding reference signal (SRS) for positioning from the UE and a second time of reception of a positioning reference signal (PRS) from a neighboring base station; receive a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and determine a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

In one implementation, a method for supporting Uplink Time Difference of Arrival (UTDOA) positioning of a user equipment (UE) in a wireless network performed by the UE, includes transmitting at least one sounding reference signal (SRS) for positioning to be received by a reference base station and a neighboring base station; receiving a first measurement report message from the reference base station comprising an indication of a first time of reception of at least one SRS by the reference base station and a second time of reception by the reference base station of a positioning reference signal (PRS) from the neighboring base station; receiving a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and determining a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

In one implementation, a user equipment (UE) configured for supporting Uplink Time Difference of Arrival (UTDOA) positioning of the UE in a wireless network includes a wireless transceiver configured to wirelessly communicate with entities in a wireless network; at least one memory; at least one processor coupled to the wireless transceiver and the at least one memory, wherein the at least one processor is configured to: transmit at least one sounding reference signal (SRS) for positioning to be received by a reference base station and a neighboring base station; receive a first measurement report message from the reference base station comprising an indication of a first time of reception of at least one SRS by the reference base station and a second time of reception by the reference base station of a positioning reference signal (PRS) from the neighboring base station; receive a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and determine a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

In one implementation, a user equipment (UE) configured for supporting Uplink Time Difference of Arrival (UTDOA) positioning of the UE in a wireless network, includes means for transmitting at least one sounding reference signal (SRS) for positioning to be received by a reference base station and a neighboring base station; means for receiving a first measurement report message from the reference base station comprising an indication of a first time of reception of at least one SRS by the reference base station and a second time of reception by the reference base station of a positioning reference signal (PRS) from the neighboring base station; means for receiving a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and means for determining a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

In one implementation, a non-transitory storage medium including program code stored thereon, the program code is operable to configure at least one processor in a user equipment (UE) for supporting Uplink Time Difference of Arrival (UTDOA) positioning of the UE in a wireless network, the program code comprising instructions to: transmit at least one sounding reference signal (SRS) for positioning to be received by a reference base station and a neighboring base station; receive a first measurement report message from the reference base station comprising an indication of a first time of reception of at least one SRS by the reference base station and a second time of reception by the reference base station of a positioning reference signal (PRS) from the neighboring base station; receive a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and determine a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
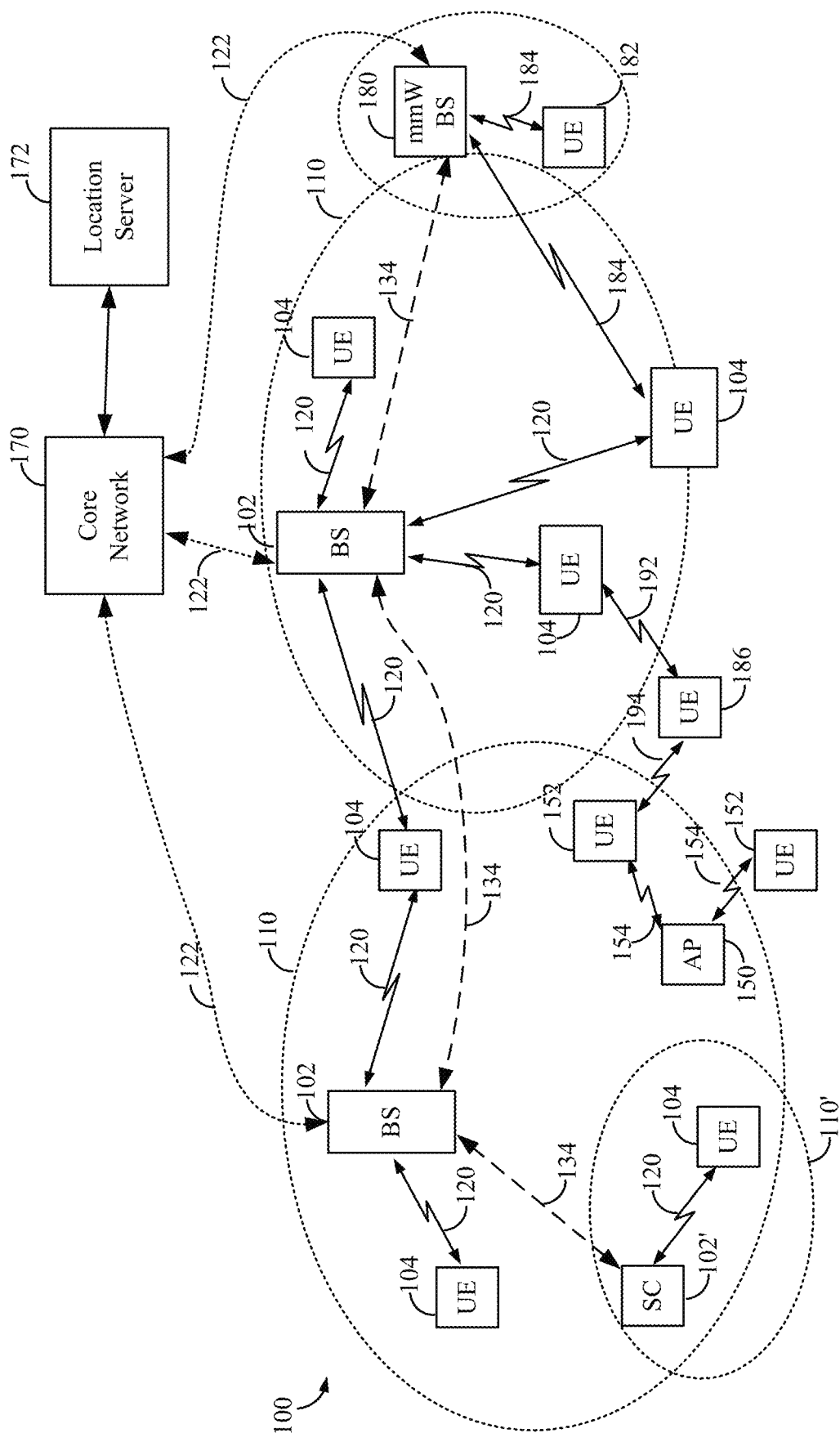
FIG. 1A illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station or transmission point or transmission reception point (TRP) may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AOD), Round Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires dedicated positioning signals transmitted by base stations, e.g., PRS, which are used to generate the desired measurements for the supported positioning technique. Positioning Reference Signals (PRS) are defined for 5G NR positioning to enable UEs to detect and measure more neighbour base stations or Transmission and Reception Points (TRPs). Downlink (DL) PRS from a reference base station and one or more neighboring stations. Based on the time of arrival (TOA) of the PRS from the reference and neighboring base stations, the UE may generate DL Reference Signal Time Difference (RSTD) for DL TDOA positioning, sometimes referred to as Observed Time Difference of Arrival (OTDOA). In a similar process, the UE may transmit uplink references signals for positioning, referred to as Sounding Reference Signals (SRS) for positioning to a reference base station and neighboring base stations. The TOAs of the SRS at the reference and neighboring stations may be used to generate an UL RSTD of UL TDOA positioning, sometimes referred to as Uplink Time Difference of Arrival (UTDOA).

Enhancements to improve the accuracy of DL and UL TDOA positioning are desirable. One of the limitations in the accuracy of DL and UL TDOA positioning is related to synchronization between base stations. Even a small synchronization error between the reference and neighboring base station may result in relatively large positioning error. For example, a 100 ns synchronization error may produce up to a 30 m positioning error. Accordingly, the limitation on accuracy due to network synchronization error is one of the main bottlenecks to the use of TDOA based positioning.

Accordingly, as described herein, enhancements to RSTD measurements are used to mitigate network synchronization errors in TDOA positioning. In one implementation, DL TDOA (OTDOA) is enhanced to remove network synchronization errors by delaying the transmission of the PRS from the neighboring base station until the neighboring base station receives the PRS transmitted from the reference base station, e.g., the same PRS that the reference base station transmitted to the UE. The PRS from the neighboring base station, accordingly, is received by the UE after a total time that includes a propagation delay, i.e., the propagation time (time of flight) for the PRS from the reference base station to the neighboring base station, a processing delay, i.e., the time between the neighboring base station's reception of the PRS from the reference base station and transmission of the PRS to the UE, and the propagation time (time of flight) for the PRS from the neighboring base station to the UE. The DL RSTD may then be determined, without synchronization errors, based on the difference in the time of arrival at the UE of the PRS from the reference and neighboring base stations after removing the total delay time, i.e., the time of flight between the reference and neighboring base station and the processing delay at the neighboring station, which may be reported by the neighboring base station to a location server (for UE assisted positioning) or to the UE (for UE based positioning).

In one implementation, UL TDOA (UTDOA) may be enhanced to remove network synchronization errors through use of PRS that is transmitted from the neighboring base station to the reference base station after the neighboring base station receives the SRS from the UE, e.g., the same SRS that the UE transmitted to the reference base station. Similar to the OTDOA implementation, the PRS from the neighboring base station will be received by the reference base station after a total time that includes a propagation delay, i.e., the propagation time (time of flight) for the SRS from the UE to the neighboring base station, a processing delay, i.e., the time between the neighboring base station's reception of the SRS from the UE and transmission of the PRS to the reference base station, and the propagation time (time of flight) for the PRS from the neighboring base station to the reference base station. The UL RSTD may then be determined, without synchronization errors, based on the difference in the time of arrival at the reference base station of the SRS from the UE and the PRS from the neighboring base stations after removing the total delay time, i.e., the time of flight between the neighboring and reference base stations and the processing delay at the neighboring base station, which may be reported by the neighboring base station to a location server (for UE assisted positioning) or to the UE (for UE based positioning).

FIG. 1A illustrates an exemplary wireless communications system 100. The wireless communications system 100 (which may also be referred to as a wireless wide area network (WWAN)) may include various network nodes, including base stations and UEs. The base stations 102, sometimes referred to as TRPs 102, may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1A, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 186, that connects indirectly to one or more communication networks via one or more device-to-device (D2D) peer-to-peer (P2P) links. In the example of FIG. 1A, UE 186 has a D2D P2P link 192 with one of the UEs 104 connected to one of the base stations 102 (e.g., through which UE 186 may indirectly obtain cellular connectivity) and a D2D P2P link 194 with WLAN STA 152 connected to the WLAN AP 150 (through which UE 186 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 180 over a mmW communication link 184. For example, the macro cell base station 102 may support a PCell and one or more SCells for the UE 104 and the mmW base station 180 may support one or more SCells for the UE 104.

Figure 1B:
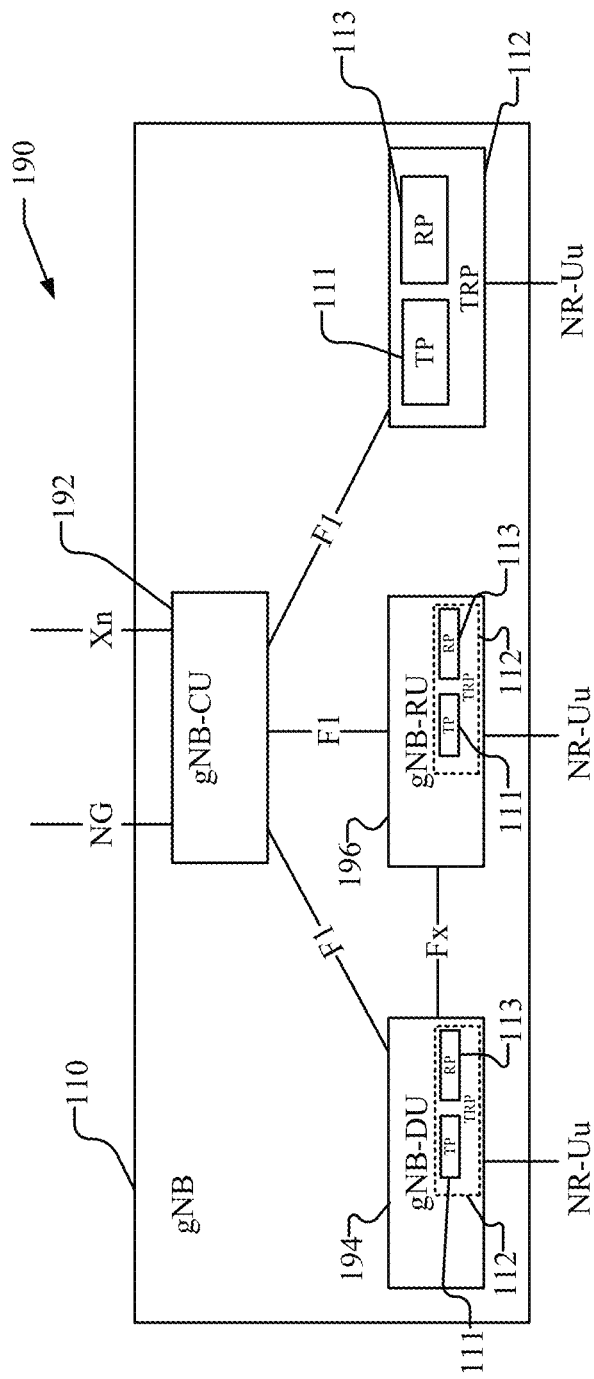
FIG. 1B shows an architecture diagram of an NG-RAN node that includes a gNB Central Unit, a gNB Distributed Unit, and gNB Remote Unit.

FIG. 1B shows an architecture diagram of an NG-RAN node 190 that may be within an NG-RAN in FIG. 1A, e.g., as a separate entity or as part of another gNB. The NG-RAN node 190 may be a gNB 102, according to one implementation. The architecture shown in FIG. 1B, for example, may be applicable to any gNB 102 in FIG. 1A.

As illustrated, gNB 102 may include a gNB Central Unit (gNB-CU) 192, a gNB Distributed Unit (gNB-DU) 194, a gNB Remote Unit (gNB-RU) 196, which may be physically co-located in the gNB 102 or may be physically separate. The gNB-CU 192 is a logical or physical node hosting support for Radio Resource Control (RRC), Service Data Adaptation Protocol (SDAP) and Packet Data Convergence Protocol (PDCP) protocols of the gNB 102 used over the NR Uu air interface and controlling the operation of one or more gNB-DUs and/or gNB-RUs. The gNB-CU 192 terminates an F1 interface connected with a gNB-DU and in some implementations, an F1 interface connected with a gNB-RU. As illustrated, the gNB-CU 192 may communicate with an AMF via an NG interface. The gNB-CU 192 may further communicate with one or more other gNBs 102 via an Xn interface. The gNB-DU 194 is a logical or physical node hosting support for Radio Link Control (RLC), Medium Access Control (MAC) and Physical (PHY) protocol layers used over the NR Uu air interface of the gNB 102, operation of which is partly controlled by gNB-CU 192. The gNB-DU terminates the F1 interface connected with the gNB-CU 192, and may terminate a lower layer split point interface Fx with a gNB-RU. The gNB-RU 196 may be based on a lower layer function split and is a logical or physical node hosting support for lower layer functions, such as PHY and Radio Frequency (RF) protocol layers used over the NR Uu air interface of the gNB 102, operation of which is partly controlled by gNB-CU 192 and/or gNB-DU 194. The gNB-RU 196 terminates the Fx interface connected with the gNB-DU 194 and in some implementations may terminate the F1 interface connected with the gNB-CU 192.

The gNB-CU 192 requests positioning measurements (e.g. E-CID) to the gNB-DU 194 and/or gNB-RU 196. The gNB-DU 194 and/or gNB-RU 196 may report the measurements back to the gNB-CU 192. A gNB-DU 194 or gNB-RU 196 may include positioning measurement functionality. It should be understood that a separate measurement node is not precluded.

Additionally, as illustrated in FIG. 1B, gNB 102 may include a Transmission Point (TP) 111 and a Reception Point (RP) 113 combined into a Transmission Reception Point (TRP) 112, which may be physically or logically located in the gNB 102. The gNB-CU 192 may be configured to communicate with the TP 111 and RP 113, e.g., via F1 interfaces. The gNB-CU 192, thus, controls one or more TPs 111 and RPs 113 which are accessible from the gNB-CU 192 via an F1 interface.

In some embodiments, the NG-RAN node 190 (or gNB 102) may comprise a subset of the elements shown in FIG. 1B. For example, the NG-RAN node 190 may comprise the gNB-CU 192 but may not include one or more of gNB-DU 194 and gNB-RU 196, RP 113 or TP 111. Alternatively, NG-RAN node 190 may include one or more of gNB-DU 194 and, RP 113 or TP 111 but may not include gNB-RU 196. Further, the elements shown in FIG. 1B may be logically separate but physically co-located or may be partially or completely physically separate. For example, one or more of gNB-DU 194 and/or gNB-RU 196, RP 113 or TP 111 may be physically separate from gNB-CU 192 or may be physically combined with gNB-CU 192. In the case of physical separation, the F1 or Fx interface may define signaling over a physical link or connection between two separated elements. In some implementations, gNB-CU 192 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 194 and/or gNB-RU 196 to support NR Uu air interface signaling for control plane and user plane, respectively. However, only the gNB-CU-CP may interact with TPs 111 and RPs 113 to support and control location related communication.

Protocol layering between the gNB-CU 192 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 192 may comprise all location related procedures on NG, Xn, and NR-Uu interfaces. For example, the location procedures between AMF 115 and the NG-RAN node 190 may use NGAP. The location procedures between NG-RAN node 190 and other NG-RAN nodes, e.g., gNBs 102, may use XnAP or a protocol above XnAP, such as an extended NR Positioning Protocol A (NRPPa) as defined in 3GPP TS 38.455. The location procedures between NG-RAN node 190 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC (LPP) messages may be carried in an UL/DL RRC (LPP) Message Transfer.

Figure 2A:
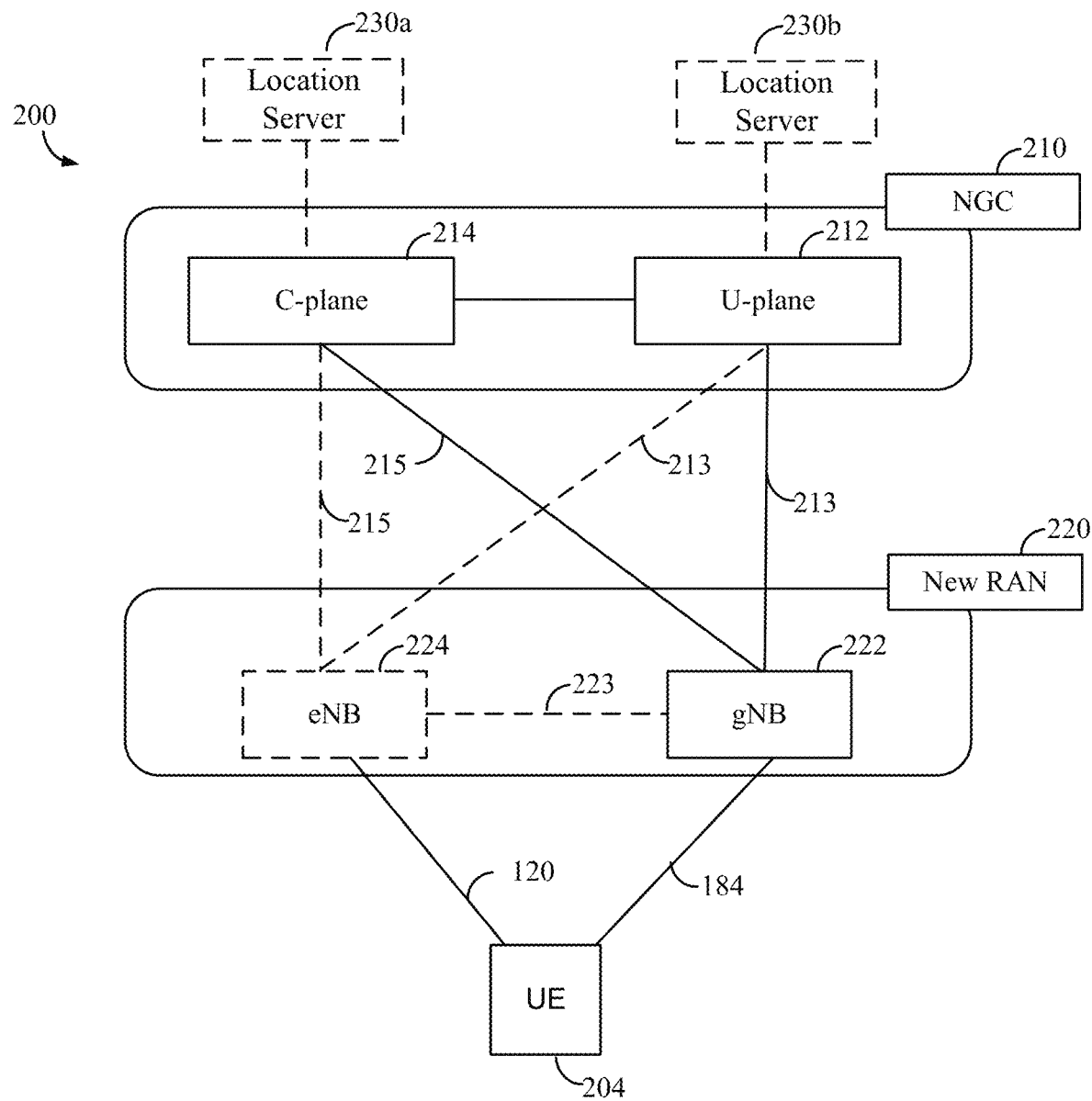
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NGC) 215 connect the gNB 222 to the NGC 210 and specifically to the control plane functions 214 and user plane functions 212. In an additional configuration, an eNB 224 may also be connected to the NGC 210 via NGC 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1A). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
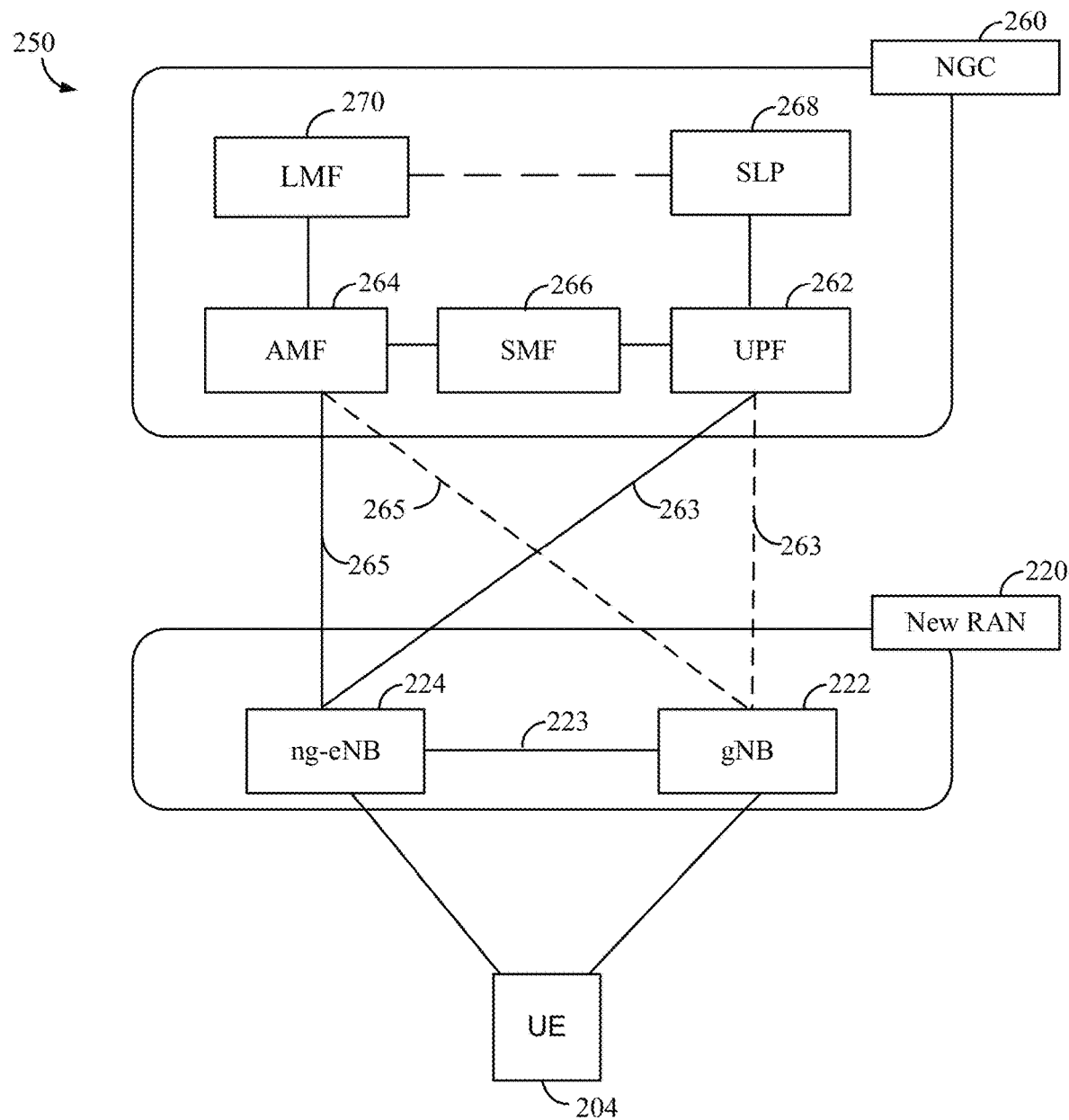

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1A). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
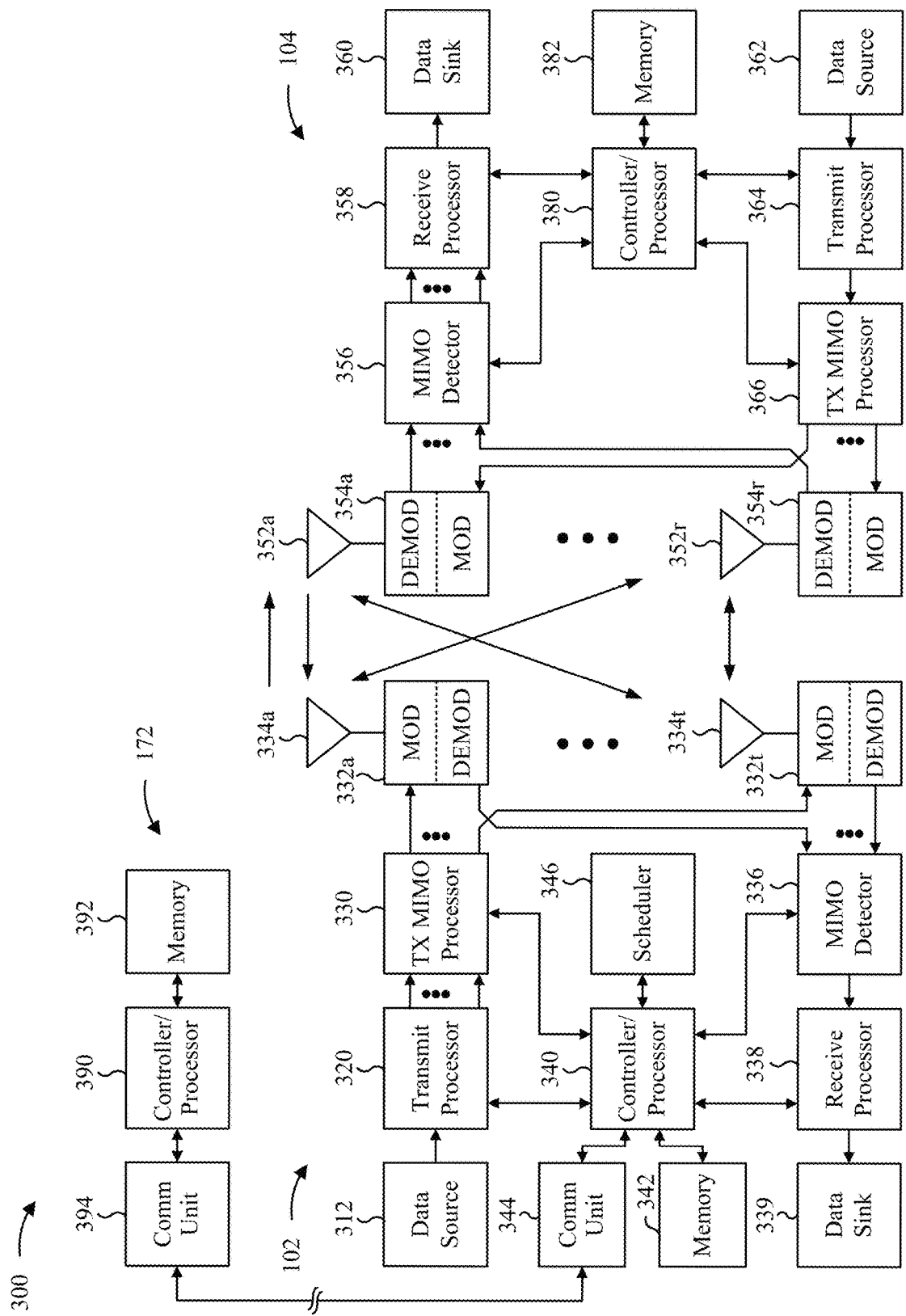
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1A. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to location server 172 via communication unit 344. Location server 172 may include communication unit 394, controller/processor 390, and memory 392.

Controller/processor 340 of base station 102, controller/processor 380 of UE 104, controller/processor 390 of location server 172, and/or any other component(s) of FIG. 3 may perform one or more techniques associated broadcasting positioning assistance data in a differential manner, as described in more detail elsewhere herein. For example, controller/processor 340 of base station 102, controller/processor 390 of location server 172, controller/processor 380 of UE 104, and/or any other component(s) of FIG. 3 may perform or direct operations of, for example, process 1900-2500 of FIGS. 19-25, and/or other processes as described herein. Memories 342, 382, and 392 may store data and program codes for base station 102, UE 104, and location server 172, respectively. In some aspects, memory 342 and/or memory 382 and/or memory 392 may comprise a non-transitory computer-readable medium storing one or more instructions for wireless communication. For example, the one or more instructions, when executed by one or more processors of base station 102, location server 172, and/or the UE 104 may perform or direct operations of, for example, process 1900-2500 of FIGS. 19-25 and/or other processes as described herein. A scheduler 346 may schedule UEs for data transmission on the downlink and/or uplink.

As indicated above, FIG. 3 is provided as an example. Other examples may differ from what is described with regard to FIG. 3.

Figure 4:
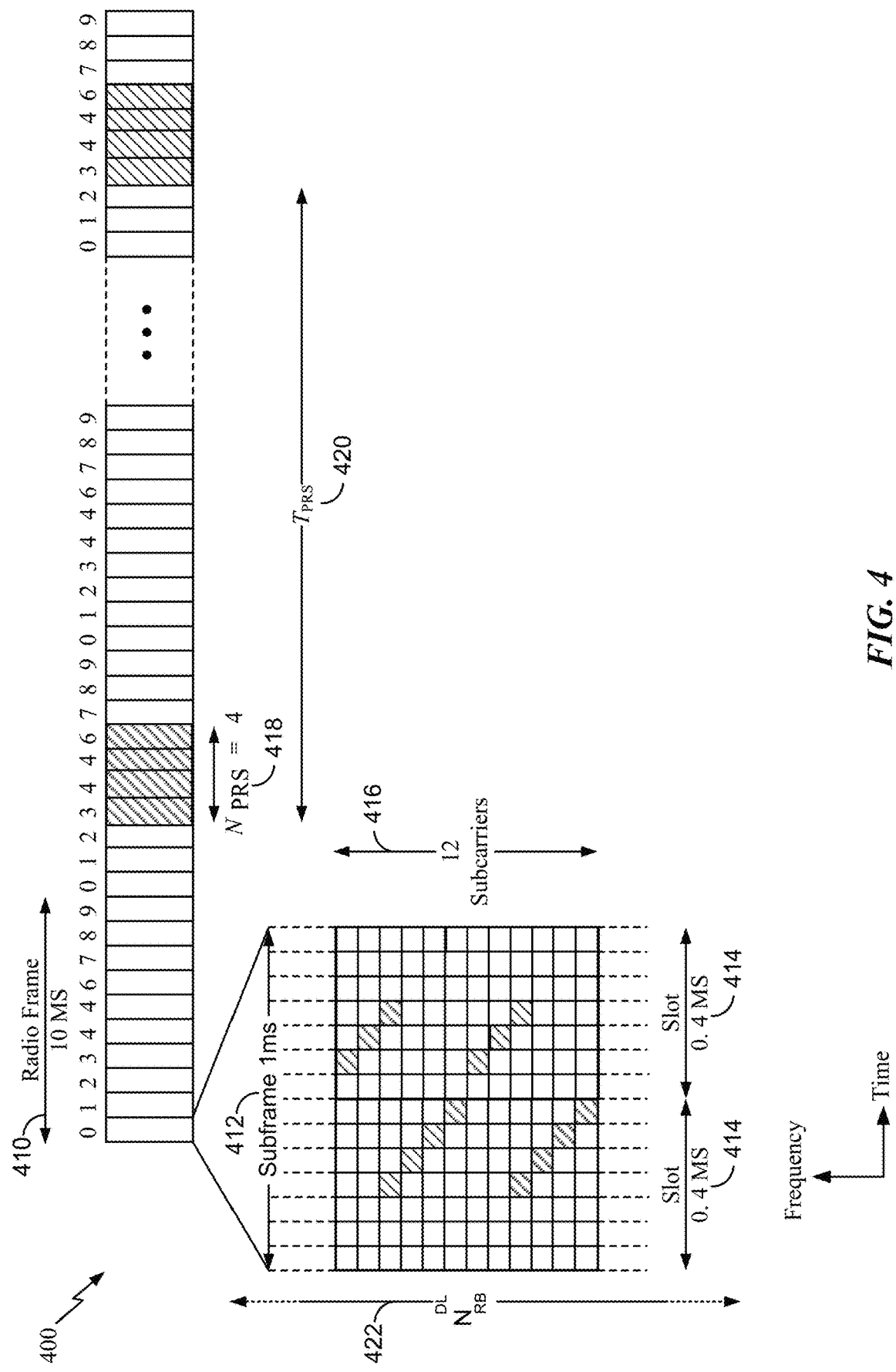
FIG. 4 shows a structure of an exemplary subframe sequence for a positioning reference signal (PRS).

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Similar to DL PRS transmitted by base stations, discussed above, a UE may transmit UL PRS for positioning. The UL PRS may be, e.g., sounding reference signals (SRS) for positioning.

Using received DL PRS from base stations or SL signaling from other UEs, and/or UL PRS transmitted to base stations or SL to other UEs, the UE may perform various positioning measurements, such as reference signal time difference (RSTD) measurements for time difference of arrival (TDOA) a positioning technique, reference signal received power (RSRP) measurements for TDOA, Angle of Departure, and Round Trip Time (RTT) or multi cell RTT (multi-RTT) positioning techniques, time difference between reception and transmission of signals (Rx–Tx) for a multi-RTT positioning technique, etc. Positioning technologies that use reference signal include downlink based positioning, uplink based positioning, and combined downlink and uplink based positioning. For example, downlink based positioning includes positioning methods such as DL-TDOA and DL-AOD. Uplink based positioning includes positioning method such as UL-TDOA and UL-AOA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

Figure 5:
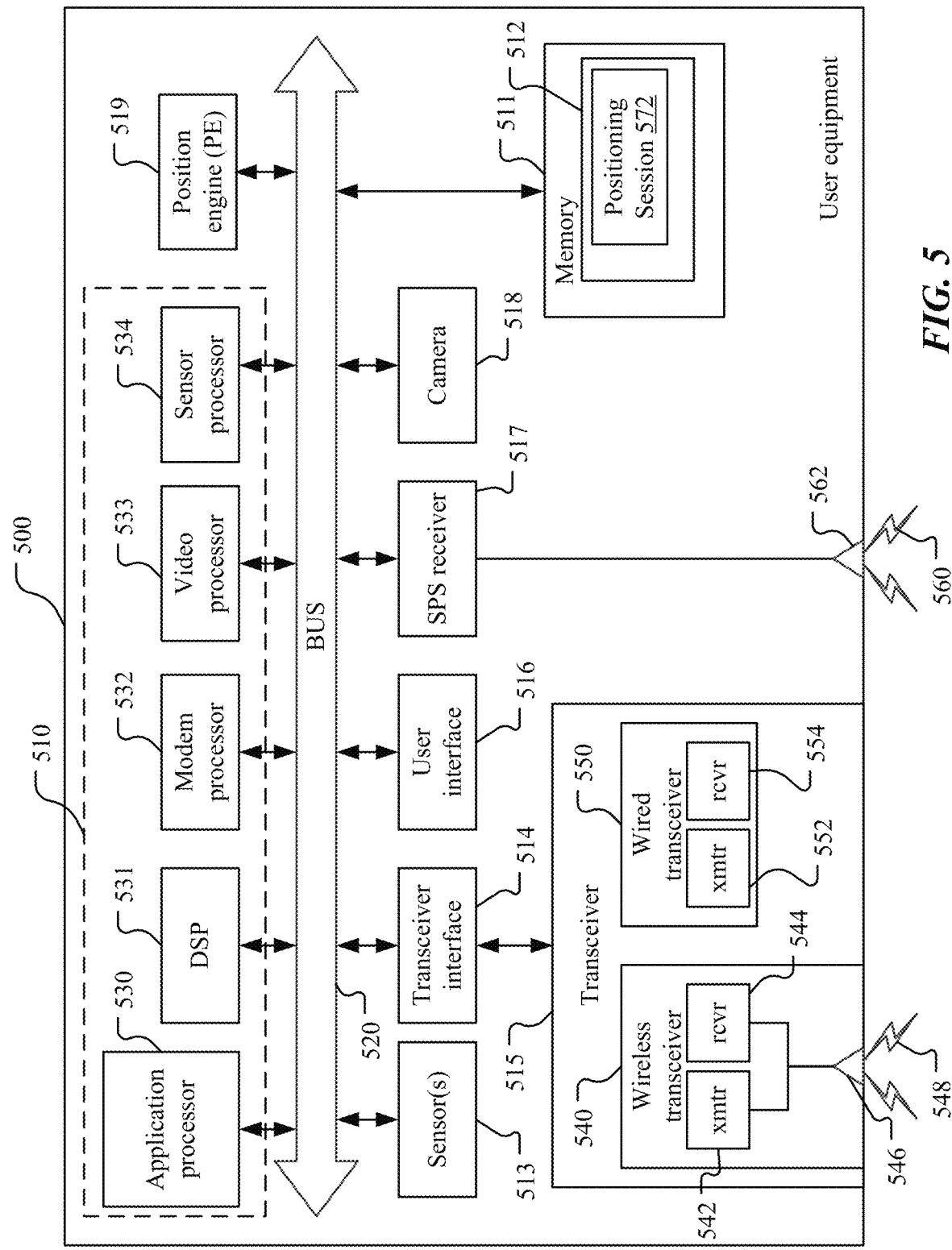
FIG. 5 illustrates a UE capable of TDOA positioning using RSTD determined based on the delayed transmission of PRS by the neighboring gNBs.

FIG. 5 illustrates a UE 500, which is an example of the UE 104, capable of TDOA positioning using RSTD determined based on the delayed transmission of PRS by the neighboring gNBs to mitigate effects of network synchronization error. The UE 500 includes a computing platform including at least one processor 510, memory 511 including software (SW) 512, one or more sensors 513, a transceiver interface 514 for a transceiver 515, a user interface 516, a Satellite Positioning System (SPS) receiver 517, a camera 518, and a position engine (PE) 519. The at least one processor 510, the memory 511, the sensor(s) 513, the transceiver interface 514, the user interface 516, the SPS receiver 517, the camera 518, and the position engine 519 may be communicatively coupled to each other by a bus 520 (which may be configured, e.g., for optical and/or electrical communication). One or more of the shown apparatus (e.g., the camera 518, the SPS receiver 517, and/or one or more of the sensor(s) 513, etc.) may be omitted from the UE 500. The at least one processor 510 may include one or more intelligent hardware devices, e.g., a central processing unit (CPU), a microcontroller, an application specific integrated circuit (ASIC), etc. The at least one processor 510 may comprise multiple processors including an application processor 530, a Digital Signal Processor (DSP) 531, a modem processor 532, a video processor 533, and/or a sensor processor 534. The at least one processor 510 may further include the position engine 519, or the position engine 519 may be considered separate from the at least one processor 510. One or more of the processors 530-534 may comprise multiple devices (e.g., multiple processors). For example, the sensor processor 534 may comprise, e.g., processors for radar, ultrasound, and/or lidar, etc. The modem processor 532 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 500 for connectivity. The memory 511 is a non-transitory storage medium that may include random access memory (RAM), flash memory, disc memory, and/or read-only memory (ROM), etc. The memory 511 stores the software 512 which may be processor-readable, processor-executable software code containing instructions that are configured to, when executed, cause the at least one processor 510 to operate as a special purpose computer programmed to perform the various functions described herein. Alternatively, the software 512 may not be directly executable by the at least one processor 510 but may be configured to cause the at least one processor 510, e.g., when compiled and executed, to operate as a special purpose computer to perform the various functions described herein. The description may refer only to the at least one processor 510 performing a function, but this includes other implementations such as where the at least one processor 510 executes software and/or firmware. The description may refer to the at least one processor 510 performing a function as shorthand for one or more of the processors 530-234 performing the function. The description may refer to the UE 500 performing a function as shorthand for one or more appropriate components of the UE 500 performing the function. The at least one processor 510 may include a memory with stored instructions in addition to and/or instead of the memory 511. Functionality of the at least one processor 510 is discussed more fully below.

The configuration of the UE 500 shown in FIG. 5 is an example and not limiting of the invention, including the claims, and other configurations may be used. For example, an example configuration of the UE includes one or more of the processors 530-534 of the at least one processor 510, the memory 511, and the wireless transceiver 540. Other example configurations include one or more of the processors 530-534 of the at least one processor 510, the memory 511, the wireless transceiver 540, and one or more of the sensor(s) 513, the user interface 516, the SPS receiver 517, the camera 518, the PE 519, and/or the wired transceiver 550.

The UE 500 may comprise the modem processor 532 that may be capable of performing baseband processing of signals received and down-converted by the transceiver 515 and/or the SPS receiver 517. The modem processor 532 may perform baseband processing of signals to be upconverted for transmission by the transceiver 515. Also or alternatively, baseband processing may be performed by the processor 530 and/or the DSP 531. Other configurations, however, may be used to perform baseband processing.

The UE 500 may include the sensor(s) 513 that may include, for example, one or more of various types of sensors such as one or more inertial sensors, one or more barometric pressure sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 500 in three dimensions) and/or one or more gyroscopes capable of detecting motion including rotation of the UE 500. The sensor(s) 513 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 513 may generate analog and/or digital signals indications of which may be stored in the memory 511 and processed by the DSP 531 and/or the processor 530 in support of one or more applications such as, for example, applications directed to positioning and/or navigation operations.

The sensor(s) 513 may be used in relative location measurements, relative location determination, motion determination, etc. Information detected by the sensor(s) 513 may be used for motion detection, relative displacement, dead reckoning, sensor-based location determination, and/or sensor-assisted location determination. The sensor(s) 513 may be useful to determine whether the UE 500 is fixed (stationary) or mobile including rotating and/or whether to report certain useful information to the location server 172 regarding the mobility of the UE 500. For example, based on the information obtained/measured by the sensor(s), the UE 500 may notify/report to the location server 172 that the UE 500 has detected movements or that the UE 500 has moved, and report the relative displacement/distance (e.g., via dead reckoning, or sensor-based location determination, or sensor-assisted location determination enabled by the sensor(s) 513). In another example, for relative positioning information, the sensors/IMU can be used to determine the angle and/or orientation of the other device with respect to the UE 500, etc.

The IMU may be configured to provide measurements about a direction of motion and/or a speed of motion of the UE 500, which may be used in relative location determination. For example, one or more accelerometers and/or one or more gyroscopes of the IMU may detect, respectively, a linear acceleration and a speed of rotation of the UE 500. The linear acceleration and speed of rotation measurements of the UE 500 may be integrated over time to determine an instantaneous direction of motion as well as a displacement of the UE 500. The instantaneous direction of motion and the displacement may be integrated to track a location of the UE 500. For example, a reference location of the UE 500 may be determined, e.g., using the SPS receiver 517 (and/or by some other means) for a moment in time and measurements from the accelerometer(s) and gyroscope(s) taken after this moment in time may be used in dead reckoning to determine present location of the UE 500 based on movement (direction and distance) of the UE 500 relative to the reference location.

The magnetometer(s) may determine magnetic field strengths in different directions which may be used to determine orientation of the UE 500. For example, the orientation may be used to provide a digital compass for the UE 500. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the at least one processor 510.

The barometric pressure sensors(s) may determine air pressure, which may be used to determine the elevation or current floor level in a building of the UE 500. For example, a differential pressure reading may be used to detect when the UE 500 has changed floor levels as well as the number of floors that have changed. The barometric pressure sensors (s) may provide means for sensing air pressure and providing indications of the air pressure, e.g., to the at least one processor 510.

The transceiver 515 may include a wireless transceiver 540 and a wired transceiver 550 configured to communicate with other devices through wireless connections and wired connections, respectively. For example, the wireless transceiver 540 may include a transmitter 542 and receiver 544 coupled to one or more antennas 546 for transmitting (e.g., on one or more uplink channels and/or one or more sidelink channels) and/or receiving (e.g., on one or more downlink channels and/or one or more sidelink channels) wireless signals 548 and transducing signals from the wireless signals 548 to wired (e.g., electrical and/or optical) signals and from wired (e.g., electrical and/or optical) signals to the wireless signals 548. Thus, the transmitter 542 may include multiple transmitters that may be discrete components or combined/integrated components, and/or the receiver 544 may include multiple receivers that may be discrete components or combined/integrated components. The wireless transceiver 540 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 550 may include a transmitter 552 and a receiver 554 configured for wired communication, e.g., with the network 135. The transmitter 552 may include multiple transmitters that may be discrete components or combined/integrated components, and/or the receiver 554 may include multiple receivers that may be discrete components or combined/integrated components. The wired transceiver 550 may be configured, e.g., for optical communication and/or electrical communication. The transceiver 515 may be communicatively coupled to the transceiver interface 514, e.g., by optical and/or electrical connection. The transceiver interface 514 may be at least partially integrated with the transceiver 515.

The antennas 546 may include an antenna array, which may be capable of receive beamforming, e.g., by increasing the gain setting and/or adjust the phase setting of an array of antennas in a particular direction to amplify (e.g., to increase the gain level of) the RF signals received from that direction. The antennas 546 may further include a plurality of antenna panels, wherein each antenna panel is capable of beamforming. The antennas 546 is capable of adaptation, e.g., selection of one or more antennas for controlling receiving transmitted beams from a base station. A reduced number of beams or a single beam, for example, may be selected for reception of a wide angle beam, e.g., to reduce power consumption, while an increased number of antennas in an antenna array may be selected when the transmit beam is relatively narrow.

The user interface 516 may comprise one or more of several devices such as, for example, a speaker, microphone, display device, vibration device, keyboard, touch screen, etc. The user interface 516 may include more than one of any of these devices. The user interface 516 may be configured to enable a user to interact with one or more applications hosted by the UE 500. For example, the user interface 516 may store indications of analog and/or digital signals in the memory 511 to be processed by DSP 531 and/or the processor 530 in response to action from a user. Similarly, applications hosted on the UE 500 may store indications of analog and/or digital signals in the memory 511 to present an output signal to a user. The user interface 516 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 516 may comprise one or more touch sensors responsive to touching and/or pressure, e.g., on a keyboard and/or touch screen of the user interface 516.

The SPS receiver 517 (e.g., a Global Positioning System (GPS) receiver) may be capable of receiving and acquiring SP S signals 560 via an SP S antenna 562. The antenna 562 is configured to transduce the wireless signals 560 to wired signals, e.g., electrical or optical signals, and may be integrated with the antenna 546. The SPS receiver 517 may be configured to process, in whole or in part, the acquired SPS signals 560 for estimating a location of the UE 500. For example, the SPS receiver 517 may be configured to determine location of the UE 500 by trilateration using the SP S signals 560. The processor 530, the memory 511, the DSP 531, the PE 519 and/or one or more additional specialized processors (not shown) may be utilized to process acquired SPS signals, in whole or in part, and/or to calculate an estimated location of the UE 500, in conjunction with the SP S receiver 517. The memory 511 may store indications (e.g., measurements) of the SPS signals 560 and/or other signals (e.g., signals acquired from the wireless transceiver 540) for use in performing positioning operations. The general-purpose processor 530, the DSP 531, the PE 519, and/or one or more additional specialized processors, and/or the memory 511 may provide or support a location engine for use in processing measurements to estimate a location of the UE 500.

The UE 500 may include the camera 518 for capturing still or moving imagery. The camera 518 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 530 and/or the DSP 531. Also or alternatively, the video processor 533 may perform conditioning, encoding, compression, and/or manipulation of signals representing captured images. The video processor 533 may decode/decompress stored image data for presentation on a display device (not shown), e.g., of the user interface 516.

The position engine (PE) 519 may be configured to determine a position of the UE 500, motion of the UE 500, and/or relative position of the UE 500, and/or time. For example, the PE 519 may communicate with, and/or include some or all of, the SP S receiver 517 and the wireless transceiver 540. The PE 519 may work in conjunction with the at least one processor 510 and the memory 511 as appropriate to perform at least a portion of one or more positioning methods, although the description herein may refer only to the PE 519 being configured to perform, or performing, in accordance with the positioning method(s). The PE 519 may also or alternatively be configured to determine location of the UE 500 using terrestrial-based signals (e.g., at least some of the signals 548) for trilateration, for assistance with obtaining and using the SP S signals 560, or both. The PE 519 may be configured to use one or more other techniques (e.g., relying on the UE's self-reported location (e.g., part of the UE's position beacon)) for determining the location of the UE 500, and may use a combination of techniques (e.g., SPS and terrestrial positioning signals) to determine the location of the UE 500. The PE 519 may include one or more of the sensors 513 (e.g., gyroscope(s), accelerometer(s), magnetometer(s), etc.) that may sense orientation and/or motion of the UE 500 and provide indications thereof that the at least one processor 510 (e.g., the processor 530 and/or the DSP 531) may be configured to use to determine motion (e.g., a velocity vector and/or an acceleration vector) of the UE 500. The PE 519 may be configured to provide indications of uncertainty and/or error in the determined position and/or motion.

The memory 511 may store software 512 that contains executable program code or software instructions that when executed by the at least one processor 510 may cause the at least one processor 510 to operate as a special purpose computer programmed to perform the functions disclosed herein. As illustrated, the memory 511 may include one or more components or modules that may be implemented by the at least one processor 510 to perform the disclosed functions. While the components or modules are illustrated as software 512 in memory 511 that is executable by the at least one processor 510, it should be understood that the components or modules may be stored in another computer readable medium or may be dedicated hardware either in the at least one processor 510 or off the processor. A number of software modules and data tables may reside in the memory 511 and be utilized by the at least one processor 510 in order to manage both communications and the functionality described herein. It should be appreciated that the organization of the contents of the memory 511 as shown is merely exemplary, and as such the functionality of the modules and/or data structures may be combined, separated, and/or be structured in different ways depending upon the implementation.

The memory 511, for example, may include a positioning session module 572 that when implemented by the one or more processors 510 configures the one or more processors 510 to engage in a positioning session for the UE, e.g., either UE based positioning or UE assisted positioning, as described herein. For example, the one or more processors 510 may be configured to engage in a positioning session by providing positioning capabilities to a location server, via the transceiver 515. The one or more processors 510 may be configured to determine the times of reception of PRS signals from the reference base station and neighboring base station. The one or more processors 510 may transmit the times of reception of PRS signals or a difference in the times of reception of the PRS signals to a location server. The one or more processors 510 may generate RSTD measurements for OTDOA based on the difference between the times of reception of PRS signals from the reference base station and neighboring base station, and further based on delay information received from the neighboring base station and the reference base station as described herein. The one or more processors 510 may be configured to perform multilateration using the RSTD measurements and known positions of base stations, e.g., received from a network entity, to estimate a position of the UE. The UE may report the estimated position to the location server, via the transceiver 515. For UTDOA, the one or more processors 510 may be configured to transmit SRS to the reference base station and neighboring base station. The one or more processors 510 may be configured to provide a transmission delay for the SRS transmissions to a location server. The one or more processors 510 may be configured to receive reception times or a difference in reception times between the SRS and a PRS received by the reference base station. The one or more processors 510 may generate RSTD measurements for UTDOA based on the difference between the times of reception of SRS and PRS signals as received from the reference base station, and further based on delay information received from the neighboring base station as described herein. The one or more processors 510 may be configured to perform multilateration using the RSTD measurements and known positions of base stations, e.g., received from a network entity, to estimate a position of the UE.

Figure 6:
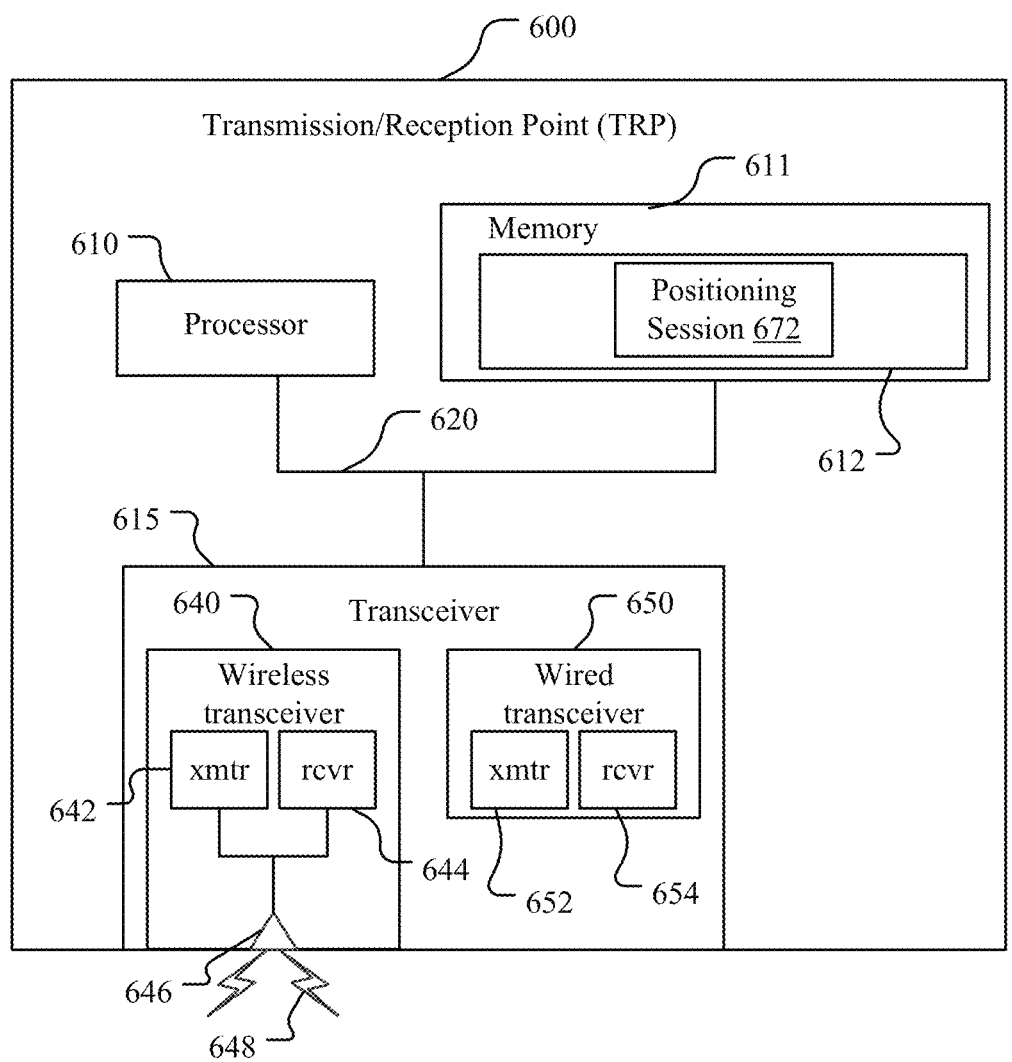
FIG. 6 shows an example of a base station capable of TDOA positioning for a UE using RSTD determined based on the delayed transmission of PRS by the neighboring gNBs.

FIG. 6 shows an example of a TRP 600 of the BSs 102, 180, capable of TDOA positioning using RSTD determined based on the delayed transmission of PRS by the neighboring gNBs to mitigate effects of network synchronization error. The TRP 600 includes a computing platform including at least one processor 610, memory 611 including software (SW) 612, and a transceiver 615. The at least one processor 610, the memory 611, and the transceiver 615 may be communicatively coupled to each other by a bus 620 (which may be configured, e.g., for optical and/or electrical communication). One or more of the shown apparatus (e.g., a wireless interface) may be omitted from the TRP 600. The at least one processor 610 may include one or more intelligent hardware devices, e.g., a central processing unit (CPU), a microcontroller, an application specific integrated circuit (ASIC), etc. The at least one processor 610 may comprise multiple processors (e.g., including one or more of an application processor, a DSP, a modem processor, a video processor, and/or a sensor processor, similar to that shown in FIG. 5). The memory 611 is a non-transitory storage medium that may include random access memory (RAM)), flash memory, disc memory, and/or read-only memory (ROM), etc. The memory 611 stores the software 612 which may be processor-readable, processor-executable software code containing instructions that are configured to, when executed, cause the at least one processor 610 to operate as a special purpose computer programmed to perform the various functions described herein. Alternatively, the software 612 may not be directly executable by the at least one processor 610 but may be configured to cause the at least one processor 610, e.g., when compiled and executed, to operate as a special purpose computer to perform the various functions described herein. The description may refer only to the at least one processor 610 performing a function, but this includes other implementations such as where the at least one processor 610 executes software and/or firmware. The description may refer to the at least one processor 610 performing a function as shorthand for one or more of the processors contained in the at least one processor 610 performing the function. The description may refer to the TRP 600 performing a function as shorthand for one or more appropriate components of the TRP 600 (and thus of one of the BSs 102, 180) performing the function. The at least one processor 610 may include a memory with stored instructions in addition to and/or instead of the memory 611. Functionality of the at least one processor 610 is discussed more fully below.

The transceiver 615 may include a wireless transceiver 640 and a wired transceiver 650 configured to communicate with other devices through wireless connections and wired connections, respectively. For example, the wireless transceiver 640 may include a transmitter 642 and receiver 644 coupled to one or more antennas 646 for transmitting (e.g., on one or more uplink channels and/or one or more downlink channels) and/or receiving (e.g., on one or more downlink channels and/or one or more uplink channels) wireless signals 648 and transducing signals from the wireless signals 648 to wired (e.g., electrical and/or optical) signals and from wired (e.g., electrical and/or optical) signals to the wireless signals 648. The antenna 646 is one or more antenna array capable of beam forming and transmitting beams, including PRS beams in a specific direction with a beam width. The transmitter 642 may include multiple transmitters that may be discrete components or combined/integrated components, and/or the receiver 644 may include multiple receivers that may be discrete components or combined/integrated components. The wireless transceiver 640 may be configured to communicate signals (e.g., with the UE 500, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 650 may include a transmitter 652 and a receiver 654 configured for wired communication, e.g., with the network 135 to send communications to, and receive communications from, the location server 172, for example. The transmitter 652 may include multiple transmitters that may be discrete components or combined/integrated components, and/or the receiver 654 may include multiple receivers that may be discrete components or combined/integrated components. The wired transceiver 650 may be configured, e.g., for optical communication and/or electrical communication.

The configuration of the TRP 600 shown in FIG. 6 is an example and not limiting of the invention, including the claims, and other configurations may be used. For example, the description herein discusses that the TRP 600 is configured to perform or performs several functions, but one or more of these functions may be performed by the location server 172 and/or the UE 500 (i.e., the location server 172 and/or the UE 500 may be configured to perform one or more of these functions).

The memory 611 may store software 612 that contains executable program code or software instructions that when executed by the at least one processor 610 may cause the at least one processor 610 to operate as a special purpose computer programmed to perform the functions disclosed herein. As illustrated, the memory 611 may include one or more components or modules that may be implemented by the at least one processor 610 to perform the disclosed functions. While the components or modules are illustrated as software 612 in memory 611 that is executable by the at least one processor 610, it should be understood that the components or modules may be stored in another computer readable medium or may be dedicated hardware either in the at least one processor 610 or off the processor. A number of software modules and data tables may reside in the memory 611 and be utilized by the at least one processor 610 in order to manage both communications and the functionality described herein. It should be appreciated that the organization of the contents of the memory 611 as shown is merely exemplary, and as such the functionality of the modules and/or data structures may be combined, separated, and/or be structured in different ways depending upon the implementation.

The memory 611, for example, may include positioning session module 672 that when implemented by the at least one processor 610 configures the at least one processor 610 to engage in a positioning session for the UE as described herein. For example, the one or more processors 610 may be configured to operate as a reference base station or a neighboring base station. The one or more processors 610 may be configured to operate as a reference base station for OTDOA by transmitting PRS to the UE and a neighboring base station and to store and provide any transmission delay to the location server or the UE. The one or more processors 610 may be configured to operate as a reference base station for UTDOA by receiving SRS from the UE and PRS from a neighboring base station and to provide an indication of the reception times, as a difference of reception times or both reception times to the location server or the UE. The one or more processors 610 may be configured to operate as a neighboring base station for OTDOA by being configured to receive PRS from the reference base station and in response transmit PRS to the UE. The one or more processors 610 may be configured to store and transmit to the location server or the UE one or both of the propagation time for the PRS from the reference base station to the neighboring base station and the processing delay from receiving the PRS from the reference base station to transmitting the PRS to the UE. The one or more processors 610 may be configured to operate as a neighboring base station for UTDOA by being configured to receive SRS from the UE and in response transmit PRS to the reference base station. The one or more processors 610 may be configured to store and transmit to the location server or the UE one or both of the propagation time for the PRS from the neighboring base station to the reference base station and the processing delay from receiving the SRS from the US to transmitting the PRS to the reference base station.

Figure 7:
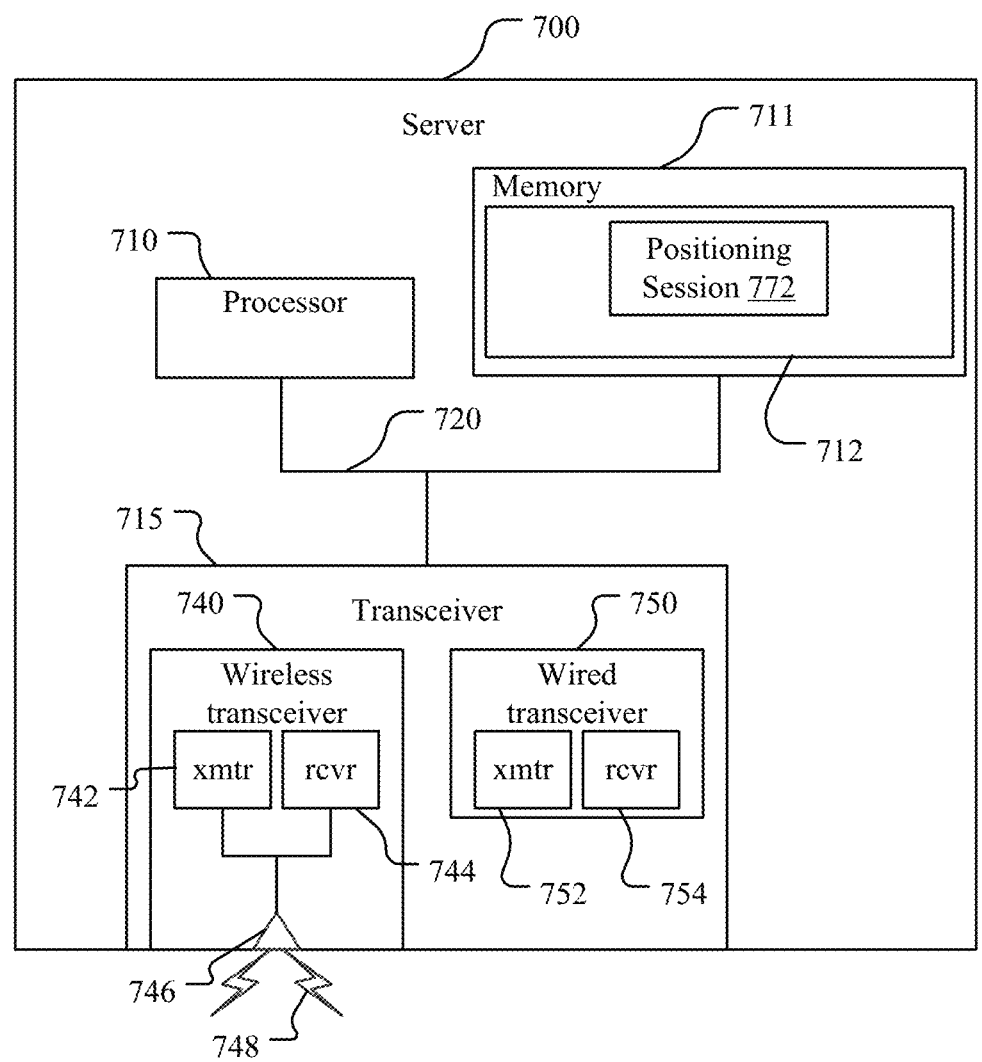
FIG. 7 shows a server capable of TDOA positioning using RSTD determined based on the delayed transmission of PRS by the neighboring gNBs.

FIG. 7 shows a server 700, which is an example of the location server 172, such as LMF 270, capable of TDOA positioning using RSTD determined based on the delayed transmission of PRS by the neighboring gNBs to mitigate effects of network synchronization error. The server 700 includes a computing platform including at least one processor 710, memory 711 including software (SW) 712, and a transceiver 715. The at least one processor 710, the memory 711, and the transceiver 715 may be communicatively coupled to each other by a bus 720 (which may be configured, e.g., for optical and/or electrical communication). One or more of the shown apparatus (e.g., a wireless interface) may be omitted from the server 700. The at least one processor 710 may include one or more intelligent hardware devices, e.g., a central processing unit (CPU), a microcontroller, an application specific integrated circuit (ASIC), etc. The at least one processor 710 may comprise multiple processors (e.g., including at least one of an application processor, a DSP, a modem processor, a video processor, and/or a sensor processor, similar to that shown in FIG. 5). The memory 711 is a non-transitory storage medium that may include random access memory (RAM)), flash memory, disc memory, and/or read-only memory (ROM), etc. The memory 711 stores the software 712 which may be processor-readable, processor-executable software code containing instructions that are configured to, when executed, cause the at least one processor 710 to operate as a special purpose computer programmed to perform the various functions described herein. Alternatively, the software 712 may not be directly executable by the at least one processor 710 but may be configured to cause the at least one processor 710, e.g., when compiled and executed, to operate as a special purpose computer to perform the various functions described herein. The description may refer only to the at least one processor 710 performing a function, but this includes other implementations such as where the at least one processor 710 executes software and/or firmware. The description may refer to the at least one processor 710 performing a function as shorthand for one or more of the processors contained in the at least one processor 710 performing the function. The description may refer to the server 700 performing a function as shorthand for one or more appropriate components of the server 700 performing the function. The at least one processor 710 may include a memory with stored instructions in addition to and/or instead of the memory 711. Functionality of the at least one processor 710 is discussed more fully below.

The transceiver 715 may include a wireless transceiver 740 and a wired transceiver 750 configured to communicate with other devices through wireless connections and wired connections, respectively. For example, the wireless transceiver 740 may include a transmitter 742 and receiver 744 coupled to one or more antennas 746 for transmitting (e.g., on one or more downlink channels) and/or receiving (e.g., on one or more uplink channels) wireless signals 748 and transducing signals from the wireless signals 748 to wired (e.g., electrical and/or optical) signals and from wired (e.g., electrical and/or optical) signals to the wireless signals 748. Thus, the transmitter 742 may include multiple transmitters that may be discrete components or combined/integrated components, and/or the receiver 744 may include multiple receivers that may be discrete components or combined/integrated components. The wireless transceiver 740 may be configured to communicate signals (e.g., with the UE 500, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 750 may include a transmitter 752 and a receiver 754 configured for wired communication, e.g., with the network 135 to send communications to, and receive communications from, the TRP 600, for example. The transmitter 752 may include multiple transmitters that may be discrete components or combined/integrated components, and/or the receiver 754 may include multiple receivers that may be discrete components or combined/integrated components. The wired transceiver 750 may be configured, e.g., for optical communication and/or electrical communication.

The configuration of the server 700 shown in FIG. 7 is an example and not limiting of the invention, including the claims, and other configurations may be used. For example, the wireless transceiver 740 may be omitted. Also or alternatively, the description herein discusses that the server 700 is configured to perform or performs several functions, but one or more of these functions may be performed by the TRP 600 and/or the UE 500 (i.e., the TRP 600 and/or the UE 500 may be configured to perform one or more of these functions).

The memory 711 may store software 712 that contains executable program code or software instructions that when executed by the at least one processor 710 may cause the at least one processor 710 to operate as a special purpose computer programmed to perform the functions disclosed herein. As illustrated, the memory 711 may include one or more components or modules that may be implemented by the at least one processor 710 to perform the disclosed functions. While the components or modules are illustrated as software 712 in memory 711 that is executable by the at least one processor 710, it should be understood that the components or modules may be stored in another computer readable medium or may be dedicated hardware either in the at least one processor 710 or off the processor. A number of software modules and data tables may reside in the memory 711 and be utilized by the at least one processor 710 in order to manage both communications and the functionality described herein. It should be appreciated that the organization of the contents of the memory 711 as shown is merely exemplary, and as such the functionality of the modules and/or data structures may be combined, separated, and/or be structured in different ways depending upon the implementation.

The memory 711, for example, may include an positioning session module 772 that when implemented by the at least one processor 710 configures the at least one processor 710 to engage in a positioning session for the UE, as discussed herein. For example, the one or more processors 710 may be configured to engage in a positioning session by providing assistance data to the UE, via the transceiver 715. For OTDOA, the one or more processors 710 may be configured to receive reception times or a difference in reception times between PRS signals received by the UE from the reference base station and neighboring base station. The one or more processors 710 may generate RSTD measurements for OTDOA based on the difference between the times of reception of PRS signals from the reference base station and neighboring base station, and further based on delay information received from the neighboring base station and the reference base station as described herein. The one or more processors 710 may be configured to perform multilateration using the RSTD measurements and known positions of base stations to estimate a position of the UE. For UTDOA, the one or more processors 710 may be configured to receive reception times or a difference in reception times between the SRS and a PRS received by the reference base station. The one or more processors 710 may generate RSTD measurements for UTDOA based on the difference between the times of reception of SRS and PRS signals as received from the reference base station, and further based on delay information received from the neighboring base station as described herein. The one or more processors 710 may be configured to perform multilateration using the RSTD measurements and known positions of base stations to estimate a position of the UE.

Figure 8:
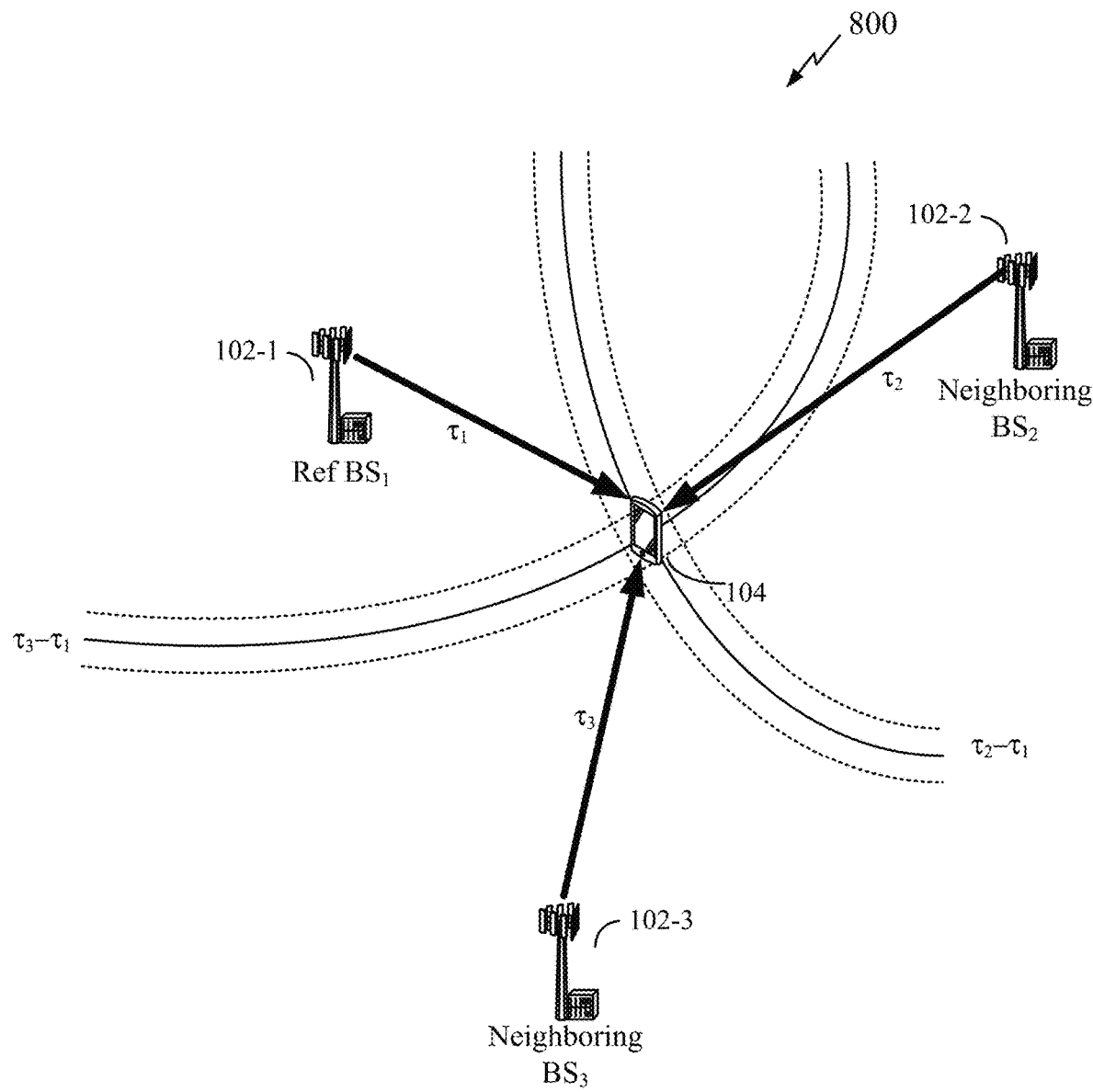
FIG. 8 is a diagram illustrating an exemplary technique for determining a position of a mobile device using information obtained from a plurality of base stations.

FIG. 8 illustrates an exemplary wireless communications system 800 implementing positioning using a Time Difference of Arrival (TDOA) technique. In the example of FIG. 8, a UE 104 determines an estimate of its position, or assists another entity (e.g., a base station or core network component, another UE, a location server, a third party application, etc.) to determine an estimate of its position. The UE 104 may communicate wirelessly with a plurality of base stations 102-1, 102-2, and 102-3 (collectively, base stations 102), which may correspond to any combination of base stations 102 in FIG. 1A, using RF signals and standardized protocols for the modulation of the RF signals and the exchange of information packets. By extracting different types of information from the exchanged RF signals, and utilising the layout of the wireless communications system 800 (i.e., the base stations locations, geometry, etc.), the UE 104 may determine its position, or assist in the determination of its position, in a predefined reference coordinate system. In an aspect, the UE 104 may specify its position using a two-dimensional coordinate system; however, the aspects disclosed herein are not so limited, and may also be applicable to determining positions using a three-dimensional coordinate system, if the extra dimension is desired. Additionally, while FIG. 8 illustrates one UE 104 and three base stations 102, as will be appreciated, there may be more UEs 104 and more or fewer base stations 102.

To support position estimates, the base stations 102 may be configured to broadcast reference RF signals (e.g., PRS, CRS, CSI-RS, synchronization signals, etc.) to UEs 104 in their coverage area to enable a UE 104 to measure characteristics of such reference RF signals. For example, the UE 104 may use the OTDOA positioning method, which is a multilateration method in which the UE conventionally measures the time of arrival (TOA) of specific reference RF signals (e.g., PRS, CRS, CSI-RS, etc.) transmitted by different pairs of network nodes (e.g., base stations 102, antennas of base stations 102, etc.). The TOA from several neighbor base stations may be subtracted from a TOA from a reference base station to determine the RSTDs for the base station pairs.

Generally, RSTDs are measured between a reference network node and one or more neighbor network nodes. In the example illustrated in FIG. 8, base station 102-1 may be the serving base station for UE 104 and may further serve as the reference base station, while base stations 102-2 and 102-3 serve as neighboring base stations. The reference network node remains the same for all RSTDs measured by the UE 104 for any single positioning use of OTDOA and would typically correspond to the serving cell for the UE 104 or another nearby cell with good signal strength at the UE 104. In an aspect, where a measured network node is a cell supported by a base station, the neighbor network nodes would normally be cells supported by base stations different from the base station for the reference cell and may have good or poor signal strength at the UE 104. The RSTD is conventionally the relative timing difference between two cells, e.g., the reference cell and the neighboring cell, which is determined based on the smallest time difference between two subframe boundaries from the two different cells.

The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server 172 shown in FIG. 1A (e.g., LMF 270 shown in FIG. 2B) may provide OTDOA assistance data to the UE 104 for the reference network node (e.g., base station 102-1 in the example of FIG. 8) and the neighbor network nodes (e.g., base stations 102-2 and 102-3 in the example of FIG. 8) relative to the reference network node. For example, the assistance data may provide the center channel frequency of each network node, various reference RF signal configuration parameters (e.g., the number of consecutive positioning subframes, periodicity of positioning subframes, muting sequence, frequency hopping sequence, reference RF signal ID, reference RF signal bandwidth), a network node global ID, and/or other cell related parameters applicable to OTDOA, as described above. The OTDOA assistance data may also indicate the serving cell for the UE 104 as the reference network node.

In an aspect, while the location server 172 (e.g., LMF 270) may send the assistance data to the UE 104, alternatively, the assistance data can originate directly from the network nodes (e.g., base stations 102) themselves (e.g., in periodically broadcasted overhead messages, etc.). Alternatively, the UE 104 can detect neighbor network nodes itself without the use of assistance data.

In the example of FIG. 8, the measured time differences between the reference cell of base station 102-1 and the neighboring cells of base stations 102-2 and 102-3 are represented as $\tau_2-\tau_1$ and $\tau_3-\tau_1$, where $\tau_1$, $\tau_2$, and $\tau_3$ represent the reception time of a reference RF signal from the transmitting antenna(s) of base station 102-1, 102-2, and 102-3, respectively, by the UE 104, and includes any measurement noise at the UE 104. The UE 104 may then convert the ToA measurements for different network nodes to RSTD measurements (e.g., as defined in 3GPP TS 36.214 entitled "Physical layer; Measurements") and (optionally) send them to the location server 172. Using (i) the RSTD measurements, (ii) the known absolute or relative transmission timing of each network node, (iii) the known position(s) of physical transmitting antennas for the reference and neighboring network nodes, and/or (iv) directional reference RF signal characteristics such as a direction of transmission, the UE's 104 position may be determined (either by the UE 104 or the location server 172 (e.g., LMF 270)).

The ToA $T_i$ at the UE 104 for the shortest path from base station i is $$T_i = \tau_i + \frac{D_i}{c},$$

where $D_i$ is the Euclidean distance between the base stations i with location ($q_i$) and the UE 104 with location (p), c is the speed of light in the air (299700 km/s), and $q_i$ is known through the cell information database. The Euclidean distance (i.e., the line distance between two points) is given by:

$$c(T_i-\tau_i)=\sqrt{2}R \overline{\sqrt{1-\sin(\varphi_1)\sin(\varphi_2)-\cos(\varphi_1)\cos(\varphi_2)\cos(\beta_1-\beta_2)}}, \quad \text{eq. 1}$$

where D is the distance between two points on the surface of the earth, R is the radius of the earth (6371 km), $\varphi_1$, $\varphi_2$ is the latitude (in radians) of the first point and the latitude (in radians) of the second point, respectively, and $\beta_1$, $\beta_2$ is the longitude (in radians) of the first point and the latitude (in radians) of the second point, respectively.

In order to identify the ToA of a reference RF signal transmitted by a given network node, the UE 104 first jointly processes all the resource elements (REs) on the channel on which that network node (e.g., base station 102) is transmitting the reference RF signal, and performs an inverse Fourier transform to convert the received RF signals to the time domain. The conversion of the received RF signals to the time domain is referred to as estimation of the Channel Energy Response (CER). The CER shows the peaks on the channel over time, and the earliest "significant" peak should therefore correspond to the ToA of the reference RF signal. Generally, a UE will use a noise-related quality threshold to filter out spurious local peaks, thereby presumably correctly identifying significant peaks on the channel. For example, a UE 104 may choose a ToA estimate that is the earliest local maximum of the CER that is at least X dB higher than the median of the CER and a maximum Y dB lower than the main peak on the channel. The UE 104 determines the CER for each reference RF signal from each network node in order to determine the ToA of each reference RF signal from the different network nodes.

The TOA measurements performed by the UE 104 are related to the geometric distance between the UE and the base station 102. In a 2-D Cartesian coordinate system, the (known) coordinates of a base station may be denoted as $x_i=[x_i, y_i]^T$ and the (unknown) coordinates of the UE 104 may be denoted as $x_t=[x_t, y_t]^T$. The RSTD measurements may be defined as the time difference between two base stations (modulo 1-subframe (1-ms)), and therefore, correspond to the range differences between a neighbour base station 102-$i$ and the reference base station 102-1.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{eq. 2}$$

In equation 2, $RSTD_{i,1}$ is the time difference between the neighboring base station 102-$i$ and reference base station 102-1 measured at the UE 104, $(T_i-T_1)$ is the transmit time offset between the base stations, referred to as a "Real Time Differences" (RTDs); $n_i$ and $n_1$ are the UE TOA measurement errors, and c is the speed of light.

At least two neighbour base station measurements i are needed, but more than two neighbour base station measurements are desirable, and the system of equations may be solved in the least-squares, or weighted-least-squares sense. The transmit time offsets (Ti–T1) should (ideally) be zero in a synchronized network, and the equation above defines the time-difference-of-arrival (TDOA). Geometrically, each TDOA defines a hyperbola, where the width of the hyperbola is determined by the TDOA errors (ni–n1) as shown in FIG. 8. If the coordinates of the base stations 102 and the transmit time offsets (Ti–T1) are known at the location server 172 (e.g., LMF 270) or at the UE 104, the position of the UE 104 may be determined. Uncertainty in the base station 102 coordinates or transmit time offsets will directly impact the accuracy of the UE location estimate.

Thus, for conventional OTDOA measurements, very accurate and reliable network synchronization is important for accuracy. At the speed of light, each nsec of error in timing translates into about a foot (~0.3 m) of error in position. As inter-base station synchronization degrades, the OTDOA measurements become less accurate, e.g., the hyperbolas shown in FIG. 8 and the position error increases proportionally. The synchronization requirements for OTDOA, however, are much more stringent compared to the synchronization requirements for communication purposes.

Uplink Time Difference of Arrival (UTDOA) is a similar positioning method to OTDOA, but is based on uplink reference RF signals, e.g., UL PRS or SRS transmitted by the UE (e.g., UE 104). Further, transmission and/or reception beamforming at the network node and/or UE 104 can enable wideband bandwidth at the cell edge for increased precision. Beam refinements may also leverage channel reciprocity procedures in 5G NR. As with OTDOA, a lack of synchronization during UTDOA positioning results in a degradation of accuracy.

Figure 9:
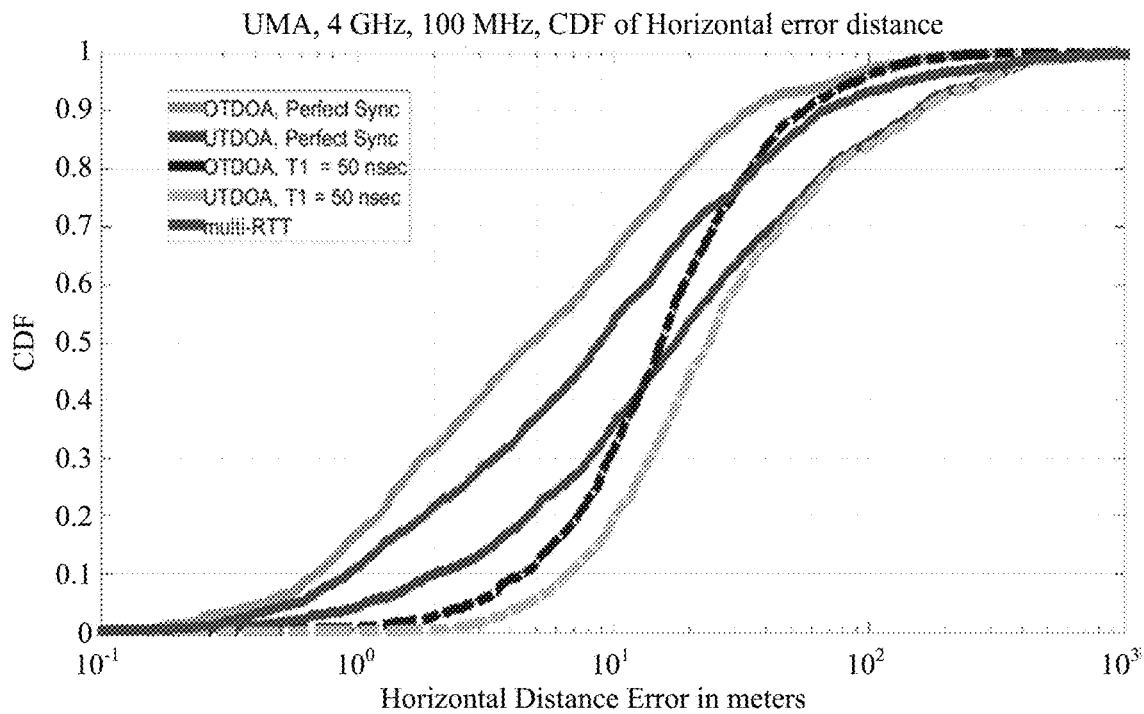
FIGS. 9 and 10 graphically illustrates the cumulative distribution function (CDF) for the horizontal distance error in meters for OTDOA and UTDOA with synchronization errors for urban macrocells (UMA) and urban microcells (UMI), respectively.
Figure 10:
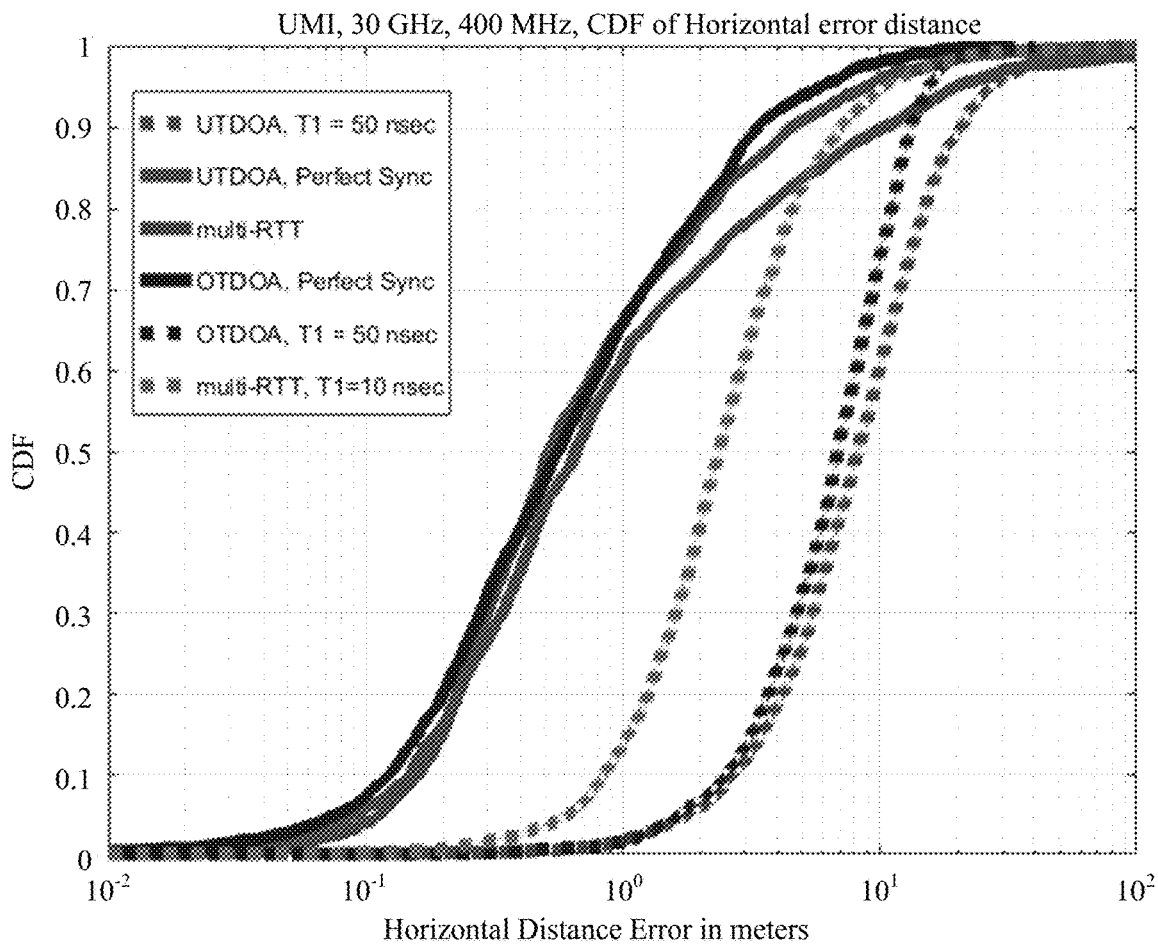

FIGS. 9 and 10, by way of example, graphically illustrates the cumulative distribution function (CDF) for the horizontal distance error in meters for OTDOA and UTDOA with perfect synchronization and synchronization errors, as well as multi-RTT, for urban macrocells (UMA) and urban microcells (UMI), respectively. As can be seen, a 50 nsec synchronization error may result in significant horizontal distance errors in both OTDOA and UTDOA.

Figure 11:
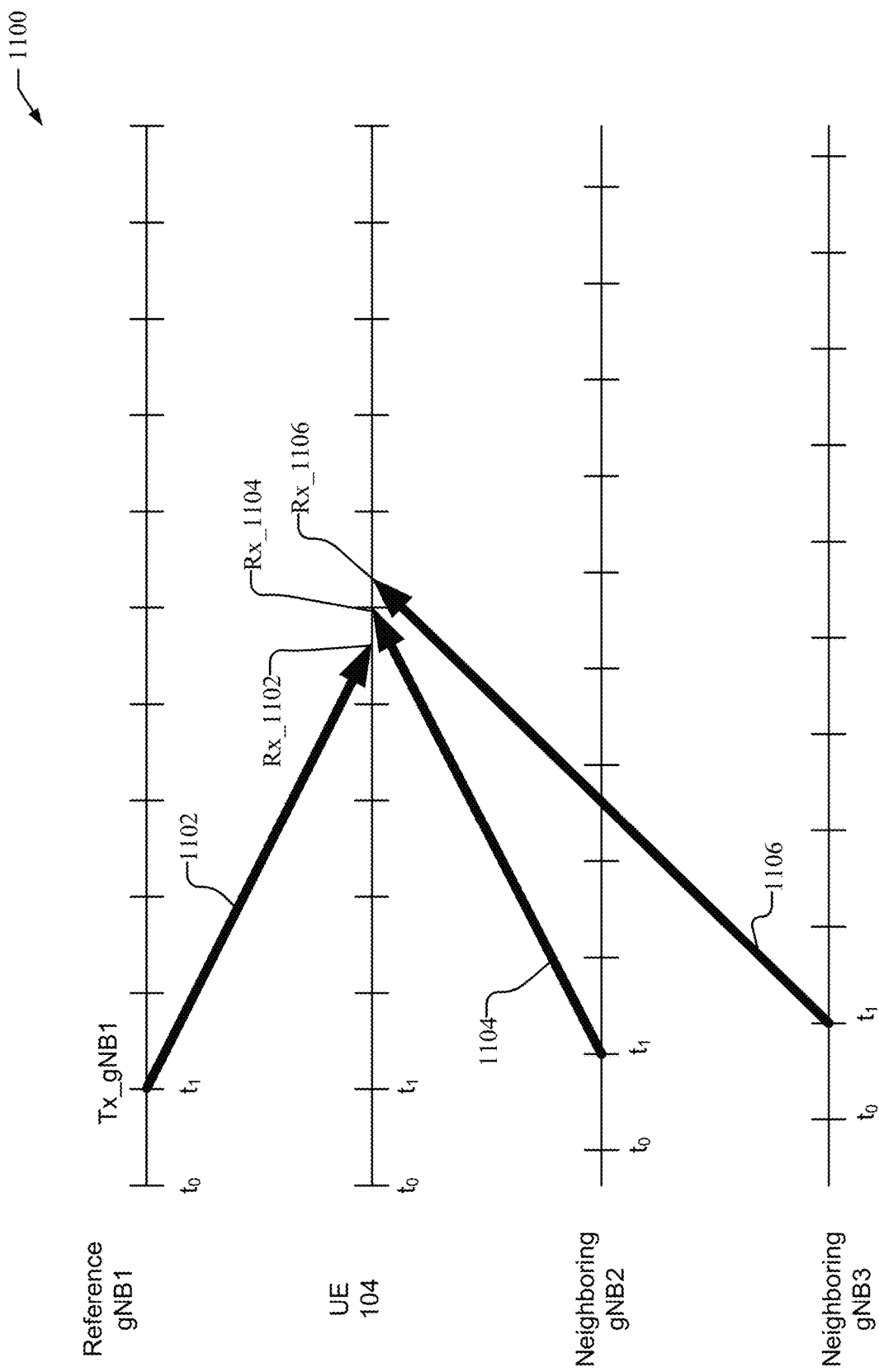
FIG. 11 illustrates a timing diagram and transmission of PRS for OTDOA positioning in which network synchronization error is present.

FIG. 11 illustrates a timing diagram 1100 and transmission of PRS by a reference gNB1, neighboring gNB2, and neighboring gNB3, and reception of the PRS by the UE 104 for conventional OTDOA positioning in which network synchronization error is present. As illustrated by alignment of the time stamps in FIG. 11, the reference gNB1 and the UE 104 are synchronized, while neighboring gNB2, and neighboring gNB3 are not synchronized with reference gNB1. In FIG. 11, for the sake of example, the UE 104 is equidistant to each of the reference gNB1, neighboring gNB2, and neighboring gNB3, and thus, the time of flight of the PRS from each transmitting gNB to the UE 104 is the same.

In FIG. 11, each of reference gNB1, neighboring gNB2, and neighboring gNB3 transmit their respective PRSs 1102, 1104, and 1106, at their local times $t_1$. If the reference gNB1, neighboring gNB2, and neighboring gNB3 were properly synchronized, each PRS would be transmitted at the same moment and because the UE 104 is equidistant to each of the gNBs, the PRS would arrive at the UE 104 at the same time (e.g., at reception time Rx_1102). The reference gNB1, neighboring gNB2, and neighboring gNB3, however, are not synchronized, and accordingly, as illustrated in FIG. 11, the UE 104 will receive the PRS from each respective gNB at a different time, e.g., reception times Rx_1102, Rx_1104, and Rx_1106. Accordingly, the UE 104 will measure a non-zero RSTD for the reference gNB1 and neighboring gNB2 pair and will similarly measure a non-zero RSTD for the reference gNB1 and neighboring gNB3 pair. The RSTDs measured by UE 104 are in error due to the synchronization error of the gNB s.

To reduce or mitigation the impact to network synchronization error, the TDOA process may be enhanced, which will lead to higher accuracy of positioning. In one implementation, the transmission of PRS from the neighboring base stations to the UE for the RSTD measurements is triggered based on reception by the neighboring base station of the PRS from the reference base station. Once the neighboring base station receives the PRS from the reference base station (which may be the same PRS that is transmitted to the UE by the reference base station or may be a different PRS where the time between transmission of the two PRS is known), the neighboring base station transmits PRS to the UE. Thus, the PRS from the neighboring base station is received by the UE 104 after a total time that includes a propagation delay, i.e., the propagation time (time of flight) for the PRS from the reference base station to the neighboring base station, a processing delay, i.e., the time between the neighboring base station's reception of the PRS from the reference base station and transmission of the PRS to the UE, and the propagation time (time of flight) for the PRS from the neighboring base station to the UE. The DL RSTD may then be determined based on the difference in the reception times of the PRS from the reference and neighboring base stations minus the total delay time, i.e., the time of flight between the reference and neighboring base station and the processing delay at the neighboring station, which may be reported by the neighboring base station to a location server (for UE assisted positioning) or to the UE (for UE based positioning).

Figure 12:
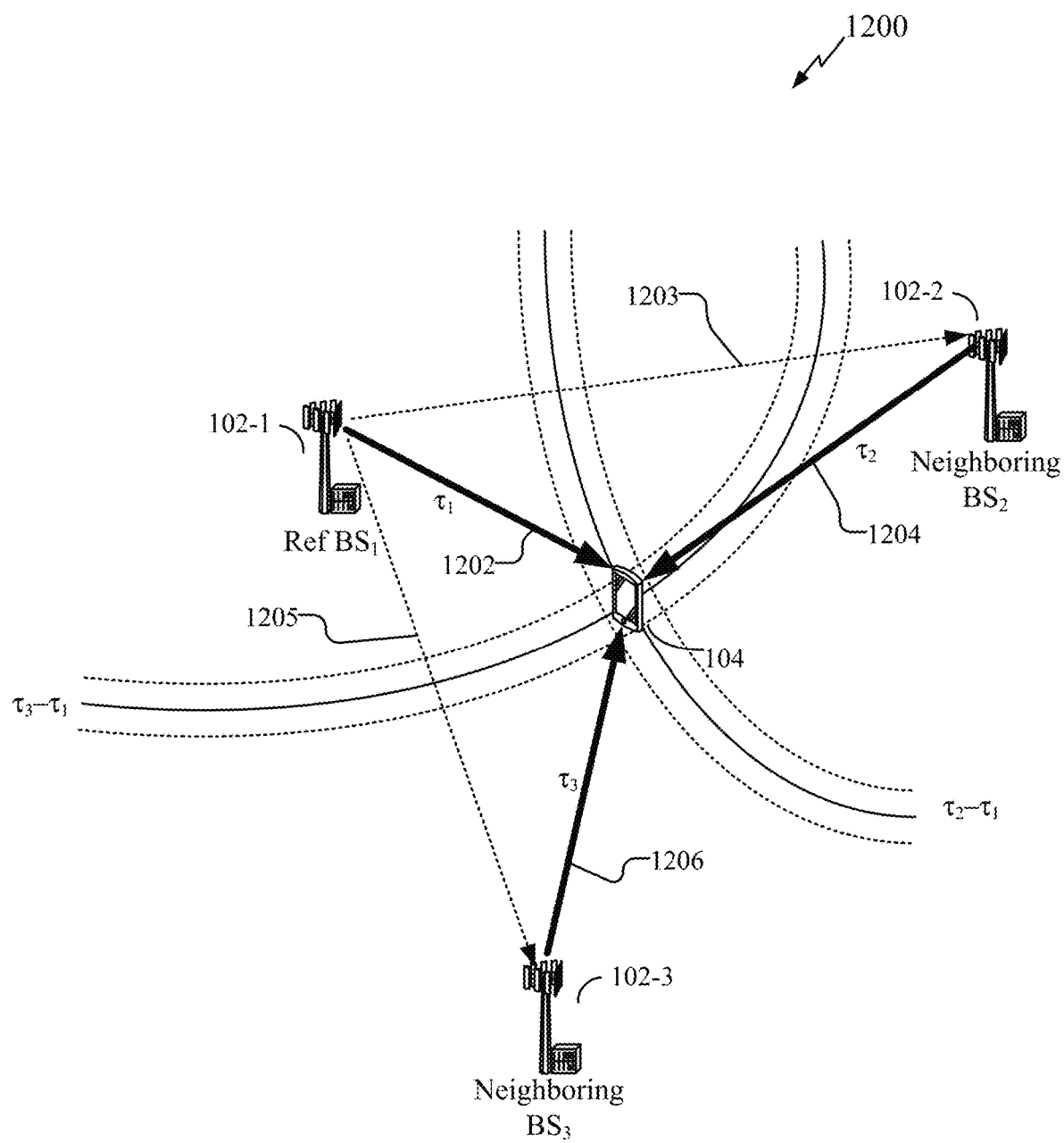
FIG. 12 illustrates an exemplary wireless communications system implementing OTDOA positioning with delayed transmissions of PRS by the neighboring gNBs.

FIG. 12 illustrates an exemplary wireless communications system 1200 implementing positioning using a Time Difference of Arrival (TDOA) technique with delayed transmissions of PRS by the neighboring gNBs. FIG. 12 is similar to FIG. 8 discussed above. In FIG. 12, however, the reference base station 102-1 transmits PRS 1202 to the UE 104 and at the same time transmits PRS 1203 and 1205 to the neighboring base stations 102-2 and 102-3, respectively. In some implementations, the PRS 1202, PRS 1203, and PRS 1205 may be the same transmission. In other implementations, PRS 1202, PRS 1203, and PRS 1205 may be separate transmissions, where the reference base station 102-1 measures and stores the time between transmissions PRS 1202 and 1203, and between transmissions PRS 1202 and 1205.

The neighboring base station 102-2 transmits PRS 1204 to the UE 104 in response to receiving PRS 1203 from the reference base station 102-1. Assuming the PRS 1202 and 1203 are aligned in time, the time for PRS 1204 to be received by UE 104 will include the time of flight of PRS 1203 (referred to herein as the propagation delay), the time between the reception of the PRS 1203 and transmission of the PRS 1204 by the neighboring base station 102-2 (referred to herein as the processing delay), and the time of flight of PRS 1204 between neighboring base station 102-2 and the UE 104. The RSTD for PRS 1202 and 1204 may then be determined based on the difference between the time of reception of the PRS 1202 and 1204 minus the propagation delay and the processing delay. The RSTD for PRS 1202 and 1206 from the second neighboring base station 102-3 may be similarly determined based on the propagation delay for PRS 1205 and the processing delay at the second neighboring base station 102-3.

The resulting RSTD measurements are determined with little or no influence from the network synchronization errors. The position of the UE 104 may thus be determined, e.g., by a location server 172 (e.g., LMF 270) in a UE assisted positioning, or by the UE 104 in UE based positioning, using OTDOA with high accuracy.

Figure 13:
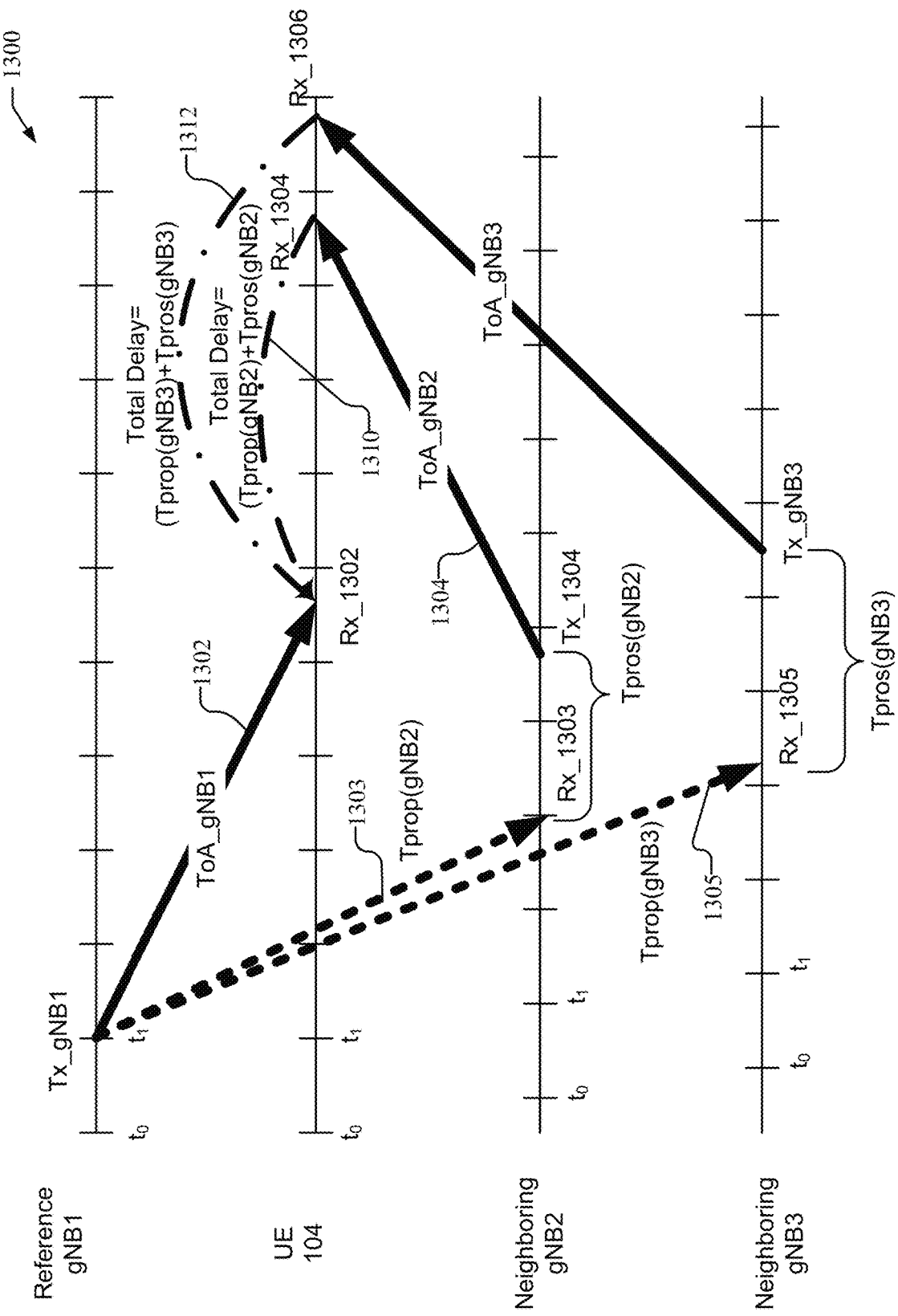
FIG. 13 illustrates a timing diagram and transmission of PRS for OTDOA that includes delayed transmission by the neighboring gNBs.

FIG. 13 illustrates a timing diagram 1300 and transmission of PRS by a reference gNB1, neighboring gNB2, and neighboring gNB3 for OTDOA that includes delayed transmission by the neighboring gNBs to mitigate effects of network synchronization error. Similar to FIG. 11, the reference gNB1 and the UE 104 are synchronized, while neighboring gNB2, and neighboring gNB3 are not synchronized with reference gNB1. The reference gNB1 may be the serving base station for the UE 104, as the UE 104 is synchronized with the serving base station, but in practice, the reference gNB1 may be any gNB configured by the location server. Additionally, similar to FIG. 11, for the sake of example, the UE 104 is assumed to be equidistant to each of the reference gNB1, neighboring gNB2, and neighboring gNB3, and thus, the time of flight of the PRS from each transmitting gNB to the UE 104 is the same.

As illustrated, the reference gNB1 transmits PRS 1302 to the UE 104 at time $t_1$, which is received by UE 104 at time Rx_1302. The reference gNB1, additionally transmits PRS 1303 and PRS 1305 to neighboring gNB2 and neighboring gNB3, respectively, at the same time (time $t_1$) as the transmission of PRS 1302. In some implementations, the reference gNB1 may transmit PRS 1303 and PRS 1305 to neighboring gNB2 and neighboring gNB3 at different times, e.g., earlier or later than time $t_1$, and reference gNB1 will record the time difference in transmissions and provide the time difference to the location server 172 (e.g., LMF 270) or the UE 104 for inclusion in the RSTD determination. As illustrated, the PRS 1303 has a propagation time Tprop (gNB2), which is the difference between the time of transmission (Tx_gNB1) from the reference gNB1 and the time of reception (Rx_1303) at the neighboring gNB2. Similarly, the PRS 1305 has a propagation time Tprop(gNB3), which is the difference between the time of transmission (Tx_gNB1) from the reference gNB1 and the time of reception (Rx_1305) at the neighboring gNB3.

The neighboring gNB2 receives the PRS 1303 at time Rx_1303 and, in response, transmits PRS 1304 to the UE 104 at time Tx_1304, which is received by the UE 104 at time Rx_1304. The time between receipt of the PRS 1303 and time of transmission of the PRS 1304 by the neighboring gNB2, e.g., Tx_1304−Rx_1303, is referred to herein as the processing delay time (Tpros(gNB2)). The processing delay Tpros(gNB2) by the neighboring base station may include, e.g. the group delay in receiving PRS 1303 and transmitting PRS 1304 as well as the processing latency in the neighboring gNB2. Further the processing delay Tpros(gNB2) may include restrictions in the transmission of the PRS 1304, such as delays due to restrictions including alignment of the second PRS transmission with a System Frame Number, a slot, or a symbol; or any combination thereof. For example, the processing delay Tpros(gNB2) may further include delays induced by the slot format or network scheduling. The neighboring gNB2, for example, may be prepared to transmit the PRS 1304, but may need to wait until the next DL slot for the transmission. Further, the processing delay Tpros(gNB2) may include delays that are due to restrictions from the location server 172 (e.g., LMF 270). For example, the location server 172 may require that the neighboring gNB2 transmit PRS 1304 on a specific System Frame Number (SFN), slot or symbol, and accordingly, the neighboring gNB2 may be prepared to transmit the PRS 1304 but may be required to wait until the required SFN, slot, or system for the PRS 1304 transmission.

If the PRS 1304 were transmitted by the neighboring gNB2 at the same instant as the transmissions of PRS 1302 by the reference gNB1, the UE 104 would receive PRS 1304 at the same time as PRS 1302 because, in the present example, the UE 104 is equidistant to reference gNB1 and neighboring gNB2. As illustrated in FIG. 13, however, the UE 104 receives the PRS 1304 from the neighboring gNB2 at time Rx_1304, which is delayed relative to the reception of the PRS 1302 from the reference gNB1 at time Rx_1302. The total delay in receiving PRS 1304 from the neighboring gNB2 is due to a propagation delay of the PRS 1303 (Tprop(gNB2)) from reference gNB1 to the neighboring gNB2 and the processing delay (Tpros(gNB2)) at the neighboring gNB2 (along with any delay between the transmission of PRS 1302 and PRS 1303 by the reference gNB1). In the present example, with the UE 104 equidistant to reference gNB1 and neighboring gNB2 and with PRS 1303 being transmitted at the same time as PRS 1302, subtracting the total delay (i.e., Tprop(gNB2)+Tpros(gNB2)) from the reception time Rx_1304, would move the reception time for PRS 1304 back to the reception time Rx_1302 of PRS 1302 from the reference gNB1, as illustrated by arrow 1310 in the timing diagram 1300 of FIG. 13. Of course, if the UE 104 were not equidistant to reference gNB1 and neighboring gNB2, then any variation between the reception time Rx_1304 and Rx_1302, after subtracting the total delay 1310, would be proportional to the difference in the distances to the reference gNB1 and neighboring gNB2. Moreover, if the PRS 1303 was not transmitted at the same time as PRS 1302, then the total delay would need to include that delay as well, which may be reported by the reference gNB1.

Thus, the RSTD between the reference gNB1 and the neighboring gNB2 may be determined as follows:

$$\text{RSTD} = \text{TOA\_1302} - \text{TOA\_1304} = Rx\_1302 - Rx\_1304 - (\text{TotalDelay}) \quad \text{eq. 3}$$

Where TOA_1302 is the time of arrival of PRS 1302 and TOA 1304 is the time of arrival of PRS 1304. The Total Delay may be determined as follows:

$$\text{Total Delay} = T\text{prop}(\text{gNB2}) + T\text{pros}(\text{gNB2}) + T\text{xdelay} \quad \text{eq. 4}$$
(1303)

Where Txdelay (1303) is the delay between the transmission of PRS 1302 and PRS 1303, if any. For example, in some implementations, the Txdelay (1303) may be 0, e.g., where PRS 1302 is the same as PRS 1303, in other words, the reference gNB1 broadcasts a single PRS that is received by the UE 104 and neighboring gNB2 (and neighboring gNB3). The use of a single PRS from the reference gNB1 may be advantageous for network efficiency. An example where separate PRS are transmitted by the reference gNB1, e.g., Txdelay (1303)>0, may be, for example, where PRS 1302 is beamformed and directed towards the UE 104 and PRS 1303 is beamformed and directed towards the neighboring gNB2.

In a similar manner, neighboring gNB3 would transmit PRS 1306 to the UE 104, which would be received by the UE 104 at a time Rx_1306. The total delay 1312 in receiving PRS 1306 from the neighboring gNB3 is due to a propagation delay of the PRS 1305 (Tprop(gNB3)) from reference gNB1 to the neighboring gNB3 and the processing delay (Tpros(gNB3)) at the neighboring gNB3 (along with any delay between the transmission of PRS 1302 and PRS 1305 by the reference gNB1). Further, in the present example, with the UE 104 equidistant to reference gNB1 and neighboring gNB3 and with PRS 1305 being transmitted at the same time as PRS 1302, subtracting the total delay (i.e., Tprop(gNB3)+Tpros(gNB3)) from the reception time Rx_1306, would move the reception time for PRS 1306 back to the reception time Rx_1302 of PRS 1302 from the reference gNB1, as illustrated by arrow 1312 in the timing diagram 1300 of FIG. 13. The RSTD between the reference gNB1 and the neighboring gNB3 may be determined in the same manner as for the reference gNB1 and the neighboring gNB2 discussed above.

Thus, the UE 104 only needs to measure the reception time of the PRS received from the reference and neighboring gNBs. There is no requirement for a tight synchronization across the gNBs. The UE 104 may report an indication of the reception times, e.g., by reporting the difference in reception times or by reporting both reception times to a location server 172 (e.g., LMF 270) for a UE assisted positioning.

The neighboring gNBs may report at least a portion of the Total Delay to the location server 172 (e.g., LMF 270) for a UE assisted positioning or to the UE 104 for UE based positioning. For example, the processing delay Tpros(gNB) may include parameters, such as group delay and processing latency, that are well calibrated by the neighboring gNBs. Further, the neighboring gNB2 is aware of any delays due to restrictions in the transmission of the PRS, such as delays due to restrictions including alignment of the second PRS transmission with a System Frame Number, a slot, or a symbol; or any combination thereof, and may include the delays in the processing delay. The neighboring gNB may reporting the processing delay to the location server 172 or the UE 104.

Further, the propagation delay Tprop(gNB) is the propagation time (i.e., time of flight) for the PRS from the reference gNB to the neighboring gNB. The propagation delay Tprop(gNB), thus, may be determined based on the distance between the reference gNB and the neighboring gNB, e.g., distance/c=propagation delay. The propagation time (or equivalently, the distance), for example, may be a known parameter that may be stored in a look up table in the location server 172 and may be provided to the UE 104 via assistance data. The distance may be determined based on accurate positions of the gNBs, which may be previously established by the network and stored in the location server 172 or may be provided to the location server 172 by the neighboring gNB and the reference gNB. In some implementations, the position of the gNB may be determined based on a GPS or other position measurement (e.g., cellular based positioning) report from the gNB. In some implementations, the distance between gNBs may be determined based on a ranging measurement performed by the gNBs, such as a round trip time measurement performed by the gNBs.

Thus, the neighboring gNB may include information related to the propagation delay in the Total Delay to the location server 172 or the UE 104. The information includes the propagation delay, a distance between the gNBs, a position of the neighboring gNB (and the position of the reference gNB is independently provided by the reference gNB). Alternatively, the neighboring gNB may provide no information related to propagation delay to the location server 172 or the UE 104, as that may be stored at the location server 172 (or provided to the UE 104 via assistance data).

The reference gNB may provide the transmission delay Txdelay, if any, between the transmission of PRS to the UE 104 and the PRS to the neighboring gNBs, to the location server 172 or the UE 104. The reference gNB may further report information that may be used to determine the propagation delay, such as the position of the reference gNB.

The location server 172 (e.g., LMF 270) or the UE 104, may use the received reports to determine the RSTD for multiple gNB pairs, e.g. based on equation 3. Using known positions of the gNBs, the location server 172 (e.g., LMF 270) or the UE 104 may use OTDOA to determine a position estimate of the UE 104 using multilateration and the determined RSTDs. As there is no requirement for tight synchronization between the gNBs, the accuracy of the OTDOA positioning of the UE may be improved.

The use of delayed transmissions by the neighboring gNBs triggered from a reference signal to mitigate effects of network synchronization error may also be used in uplink TDOA (UTDOA) positioning.

Figure 14:
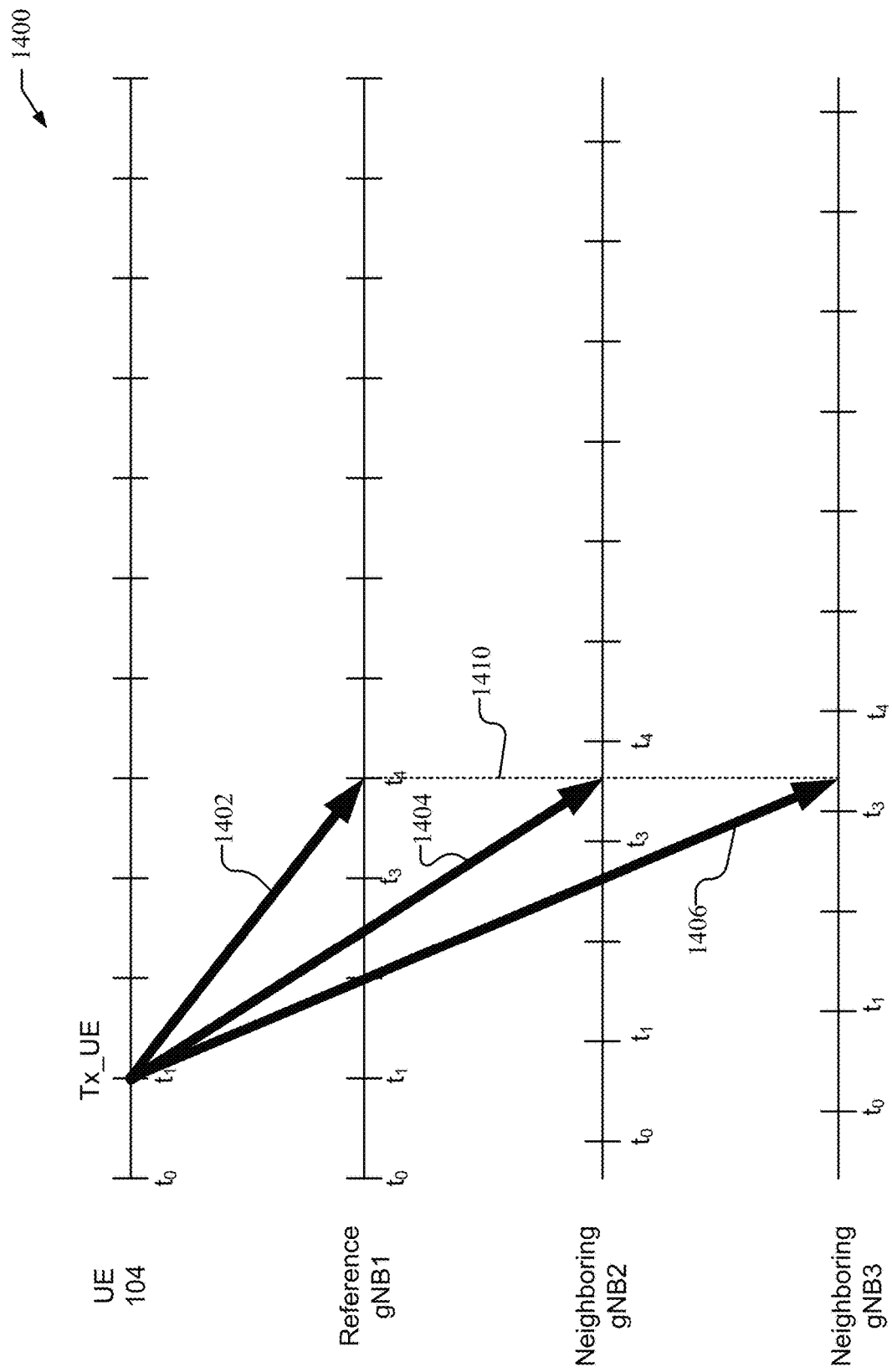
FIG. 14 illustrates a timing diagram and transmission of SRS for UTDOA positioning in which network synchronization error is present.

FIG. 14 illustrates a timing diagram 1400 and transmission of SRS for positioning by the UE 104 for UTDOA positioning in which network synchronization error is present. As illustrated by alignment of the time stamps in FIG. 14, the reference gNB1 and the UE 104 are synchronized, while neighboring gNB2, and neighboring gNB3 are not synchronized with reference gNB1. In FIG. 14, for the sake of example, the UE 104 is equidistant to each of the reference gNB1, neighboring gNB2, and neighboring gNB3, and thus, the time of flight of the SRS from the UE 104 to each of the gNBs is the same.

As illustrated in FIG. 14, the UE 104 transmits SRS 1402, 1404, and 1406 to each of the reference gNB1, neighboring gNB2, and neighboring gNB3 at time Tx UE. The UE 104 is equidistant to the reference gNB1, neighboring gNB2, and neighboring gNB3 and thus, the SRS will be received by the gNBs at the same time as indicated by line 1410. However, as illustrated in FIG. 14, because the gNBs are not synchronized, the gNBs will measure the reception time of the SRS at different times. For example, reference gNB1 measures the reception of the SRS 1402 at its time $t_4$, while neighboring gNB2 measures the reception of SRS 1404 at a time between $t_3$ and $t_4$, and neighboring gNB2 measures the reception of SRS 1406 at nearly time $t_3$.

If the reference gNB1, neighboring gNB2, and neighboring gNB3 were properly synchronized, the time of reception of the SRS at each of the gNBs would be the same because the UE 104 is equidistant to each of the gNBs. The reference gNB1, neighboring gNB2, and neighboring gNB3, however, are not synchronized, and accordingly, as illustrated in FIG. 14, the neighboring gNB1 and neighboring gNB2 measure the reception of the SRS at a different time than is measured by the reference gNB1. Accordingly, there is a non-zero RSTD for the reference gNB1 and neighboring gNB2 pair and similarly a non-zero RSTD for the reference gNB1 and neighboring gNB3 pair. Thus, the RSTDs measured by gNBs are in error due to the synchronization error of the gNBs.

To reduce or mitigation the impact to network synchronization error, the UTDOA process may be enhanced, which will lead to higher accuracy of positioning. In one implementation, transmission of PRS from the neighboring base stations to the reference base station may be triggered based on reception by the neighboring base station of SRS from the UE. Once the neighboring base station receives the SRS from the UE (which may be the same SRS that is transmitted to the UE to the reference base station or may be a different SRS where the time between transmission of the two SRS is known), the neighboring base station transmits PRS to the reference base station. Thus, the PRS from the neighboring base station is received by the reference base station after a total time that includes the propagation time (time of flight) for the SRS from the UE to the neighboring base station, a processing delay at the neighboring base station, i.e., the time between the neighboring base station's reception of the SRS from the UE and transmission of the PRS to the reference base station, and the propagation delay, i.e., the propagation time (time of flight) for the PRS from the neighboring base station to the reference base station. The UL RSTD may then be determined based on the difference in the reception times at the reference base station of the SRS from the UE and the PRS from the neighboring base station minus the total delay time, i.e., the processing delay at the neighboring station and the time of flight between the neighboring and reference base stations, which may be reported by the neighboring base station to a location server (for UE assisted positioning) or to the UE (for UE based positioning).

Figure 15:
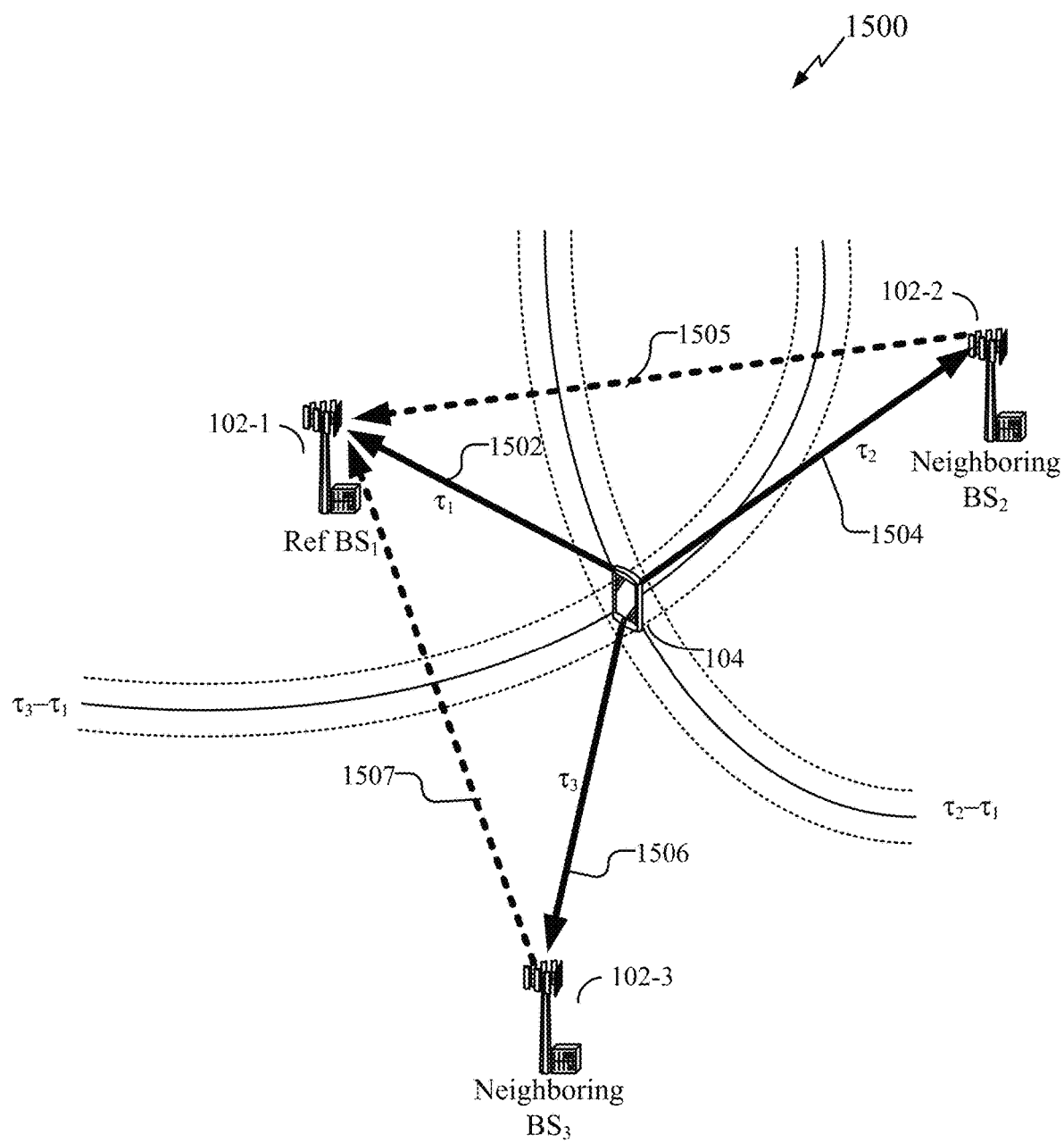
FIG. 15 illustrates an exemplary wireless communications system 1500 implementing UTDOA positioning with delayed transmissions of PRS by the neighboring gNBs.

FIG. 15 illustrates an exemplary wireless communications system 1500 implementing positioning using a Time Difference of Arrival (TDOA) technique with delayed transmissions of PRS by the neighboring gNBs. FIG. 15 is similar to FIG. 12 discussed above but illustrates UTDOA, as opposed to OTDOA. As illustrated, the UE 104 transmits SRS 1502 to the reference base station 102-1, and at the same time transmits SRS 1504 and 1506 to the neighboring base stations 102-2 and 102-3, respectively. In some implementations, the SRS 1502, SRS 1504, and SRS 1506 may be the same transmission. In other implementations, SRS 1502, SRS 1504, and SRS 1506 may be separate transmissions, where the UE 104 measures and stores the time between transmissions SRS 1502 and SRS 1504 and between transmissions SRS 1502 and SRS 1506.

The neighboring base station 102-2 transmits PRS 1505 to the reference base station 102-1 in response to receiving SRS 1504 from the UE 104. Assuming the SRS 1502 and 1504 are aligned in time, the time for PRS 1505 to be received by reference base station 102-1 will include the time of flight of SRS 1504 between the UE 104 and the neighboring base station 102-2, the time between the reception of the SRS 1504 and transmission of the PRS 1505 by the neighboring base station 102-2 (referred to herein as the processing delay), and the time of flight of PRS 1505 (referred to herein as the propagation delay). The RSTD for SRS 1502 and 1504 may then be determined based on the difference between the time of reception of the SRS 1502 and PRS 1505 minus the propagation delay and the processing delay. The RSTD for SRS 1502 and 1506 to the second neighboring base station 102-3 may be similarly determined based on the processing delay at the second neighboring base station 102-3 and the propagation delay for the PRS 1507.

The resulting RSTD measurements are determined with little or no influence from the network synchronization errors. The position of the UE 104 may thus be determined, e.g., by a location server 172 (e.g., LMF 270) in a UE assisted positioning, or by the UE 104 in UE based positioning, using UTDOA with high accuracy.

Figure 16:
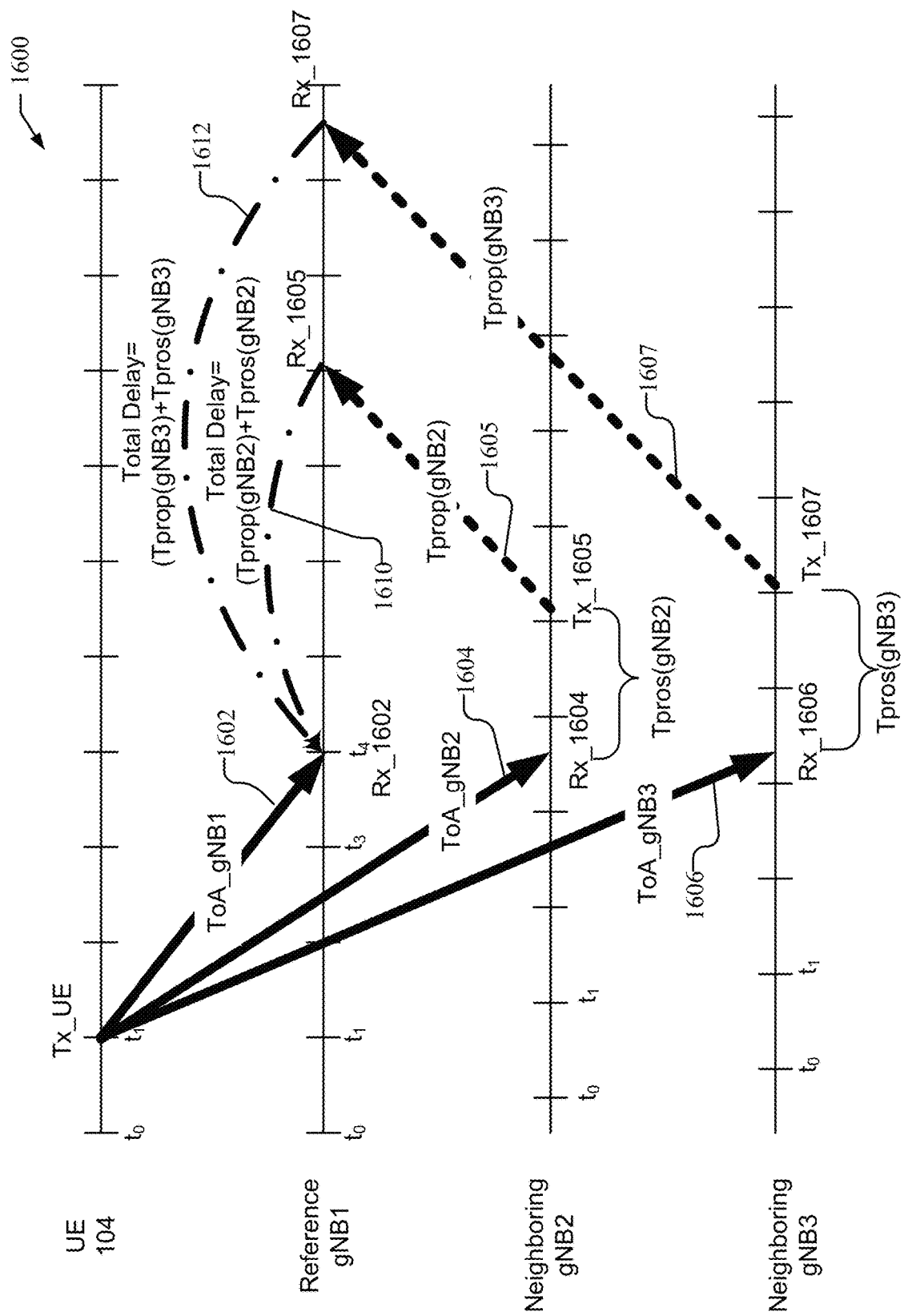
FIG. 16 illustrates a timing diagram and transmission of PRS for UTDOA that includes delayed transmission by the neighboring gNBs.

FIG. 16 illustrates a timing diagram 1600 and transmission of SRS by a the UE 104 to reference gNB1, neighboring gNB2, and neighboring gNB3 for UTDOA with a delayed transmission of PRS from the neighboring gNBs to the reference gNB1 to mitigate effects of network synchronization error. Similar to FIG. 14, the reference gNB1 and the UE 104 are synchronized, while neighboring gNB2, and neighboring gNB3 are not synchronized with reference gNB1. The reference gNB1 may be the serving base station for the UE 104, as the UE 104 is synchronized with the serving base station, but in practice, the reference gNB1 may be any gNB configured by the location server. Additionally, similar to FIG. 14, for the sake of example, the UE 104 is assumed to be equidistant to each of the reference gNB1, neighboring gNB2, and neighboring gNB3, and thus, the time of flight of the SRS from the UE 104 to each gNB is the same.

As illustrated, the UE 104 transmits SRS 1602 to the reference gNB1 at time $t_1$, which is received by reference gNB1 at time Rx_1602. The UE 104 additionally transmits SRS 1604 and SRS 1606 to neighboring gNB2 and neighboring gNB3, respectively, at the same time (time $t_1$) as the transmission of SRS 1602. In some implementations, the UE 104 may transmit SRS 1604 and SRS 1606 to neighboring gNB2 and neighboring gNB3 at different times, e.g., earlier or later than time $t_1$, and UE 104 will record the time difference in transmissions and may provide the time difference to the location server 172 (e.g., LMF 270) for inclusion in the RSTD determination.

The neighboring gNB2 receives the SRS 1604 at time Rx_1604 and, in response, transmits PRS 1605 to the reference gNB1 at time Tx_1605, which is received by the reference gNB1 at time Rx_1605. The time between receipt of the SRS 1604 and time of transmission of the PRS 1605 by the neighboring gNB2, e.g., Tx_1605–Rx_1604, is referred to herein as the processing delay time (Tpros (gNB2)). The processing delay Tpros(gNB2) by the neighboring gNB2 may include, e.g. the group delay in receiving SRS 1604 and transmitting PRS 1605 as well as the processing latency in the neighboring gNB2. Further the processing delay Tpros(gNB2) may include restrictions in the transmission of the PRS 1605, such as delays due to restrictions including alignment of the second PRS transmission with a System Frame Number, a slot, or a symbol; or any combination thereof. For example, the processing delay Tpros(gNB2) may further include delays induced by the slot format or network scheduling. The neighboring gNB2, for example, may be prepared to transmit the PRS 1605, but may need to wait until the next DL slot for the transmission. Further, the processing delay Tpros(gNB2) may include delays that are due to restrictions from the location server 172 (e.g., LMF 270). For example, the location server 172 may require that the neighboring gNB2 transmit PRS 1605 on a specific System Frame Number (SFN), slot or symbol, and accordingly, the neighboring gNB2 may be prepared to transmit the PRS 1605 but may be required to wait until the required SFN, slot, or system for the PRS 1605 transmission.

As illustrated, the PRS 1605 has a propagation time Tprop(gNB2), which is the difference between the time of transmission (Tx_1605) from the neighboring gNB2 and the time of reception (Rx 1603) at the reference gNB1. Similarly, the PRS 1607 has a propagation time Tprop(gNB3), which is the difference between the time of transmission (Tx_1607) from the neighboring gNB3 and the time of reception (Rx_1607) at the reference gNB1.

As illustrated in FIG. 16, the reference gNB1 receives the PRS 1605 from the neighboring gNB2 at time Rx_1605, which is delayed relative to the reception of the SRS 1602 from the UE 104 at time Rx_1602. The total delay in receiving PRS 1605 from the neighboring gNB2 is due to the processing delay (Tpros(gNB2)) at the neighboring gNB2 and the propagation delay of the PRS 1605 (Tprop(gNB2)) (along with any delay between the transmission of SRS 1602 and SRS 1604 by the UE 104). In the present example, with the UE 104 equidistant to reference gNB1 and neighboring gNB2 and with SRS 1604 being transmitted at the same time as SRS 1602, subtracting the total delay (i.e., Tprop(gNB2)+ Tpros(gNB2)) from the reception time Rx_1605, would move the reception time for PRS 1605 back to the reception time Rx_1602 of SRS 1602 from the UE 104, as illustrated by arrow 1610 in the timing diagram 1600 of FIG. 16. Of course, if the UE 104 were not equidistant to reference gNB1 and neighboring gNB2, then any variation between the reception time Rx_1605 and Rx_1602, after subtracting the total delay 1610, would be proportional to the difference in the distances to the reference gNB1 and neighboring gNB2. Moreover, if the SRS 1604 was not transmitted at the same time as SRS 1602, then the total delay would need to include that delay as well, which may be reported by the UE 104.

Thus, the RSTD between the reference gNB1 and the neighboring gNB2 may be determined as follows:

$$\text{RSTD}=\text{TOA}\_1602-\text{TOA}\_1604=Rx\_1602-Rx\_1605-\text{(Total Delay)} \qquad \text{eq. 5}$$

Where TOA_1602 is the time of arrival of SRS 1602 and TOA_1605 is the time of arrival of PRS 1605. The Total Delay may be determined as follows:

$$\text{Total Delay}=T\text{prop}(gNB2)+T\text{pros}(gNB2)+T\text{xdelay}(1604) \qquad \text{eq. 6}$$

Where Txdelay (1604) is the delay between the transmission of SRS 1602 and SRS 1604, if any. For example, in some implementations, the Txdelay (1604) may be 0, e.g., where SRS 1602 is the same as SRS 1604, in other words, the UE 104 broadcasts a single SRS that is received by the reference gNB1 and neighboring gNB2 (and neighboring gNB3). The use of a single SRS from the UE may be advantageous for low latency and power savings. An example where separate SRS are transmitted by the UE 104, e.g., Txdelay (1604)>0, may be, for example, where beamforming is used.

In a similar manner, neighboring gNB3 would transmit PRS 1607 to the reference gNB1, which would be received by the reference gNB1 at a time Rx_1607. The total delay 1612 in receiving PRS 1607 from the neighboring gNB3 is due to the processing delay (Tpros(gNB3)) at the neighboring gNB3 and the propagation delay of the PRS 1607 (Tprop(gNB3)) (along with any delay between the transmission of SRS 1602 and SRS 1606 by the UE 104). Further, in the present example, with the UE 104 equidistant to reference gNB1 and neighboring gNB3 and with SRS 1606 being transmitted at the same time as SRS 1602, subtracting the total delay (i.e., Tprop(gNB3)+Tpros(gNB3)) from the reception time Rx_1607, would move the reception time for PRS 1607 back to the reception time Rx_1602 of SRS 1602 from the UE 104, as illustrated by arrow 1612 in the timing diagram 1600 of FIG. 16. The RSTD between the reference gNB1 and the neighboring gNB3 may be determined in the same manner as for the reference gNB1 and the neighboring gNB2 discussed above.

Thus, the reference gNB1 only needs to measure the reception time of the SRS and the PRS received from the neighboring gNB. There is no requirement for a tight synchronization across the gNBs. The reference gNB1 may report an indication of the reception times, e.g., by reporting the difference in reception times or by reporting both reception times to a location server 172 (e.g., LMF 270) for a UE assisted positioning or to the UE 104 for UE based positioning.

Similar to the OTDOA implementation, the neighboring gNBs may report at least a portion of the Total Delay to the location server 172 (e.g., LMF 270) for a UE assisted positioning or to the UE 104 for UE based positioning. For example, the processing delay Tpros(gNB) may include parameters, such as group delay and processing latency, that are well calibrated by the neighboring gNBs. Further, the neighboring gNB2 is aware of any delays due to restrictions in the transmission of the PRS, such as delays due to restrictions including alignment of the second PRS transmission with a System Frame Number, a slot, or a symbol; or any combination thereof, and may include the delays in the processing delay. The neighboring gNB may reporting the processing delay to the location server 172 or the UE 104.

Further, the propagation delay Tprop(gNB) is the propagation time (i.e., time of flight) for the PRS from the neighboring gNB to the reference gNB. The propagation delay Tprop(gNB), thus, may be determined based on the distance between the reference gNB and the neighboring gNB, e.g., distance/c=propagation delay. The propagation time (or equivalently, the distance), for example, may be a known parameter that may be stored in a look up table in the location server 172 and may be provided to the UE 104 via assistance data. The distance may be determined based on accurate positions of the gNBs, which may be previously established by the network and stored in the location server 172 or may be provided to the location server 172 by the neighboring gNB and the reference gNB. In some implementations, the position of the gNB may be determined based on a GPS or other position measurement (e.g., cellular based positioning) report from the gNB. In some implementations, the distance between gNBs may be determined based on a ranging measurement performed by the gNBs, such as a round trip time measurement performed by the gNBs.

Thus, the neighboring gNB may include information related to the propagation delay in the Total Delay to the location server 172 or the UE 104. The information include the propagation delay, a distance between the gNBs, a position of the neighboring gNB (and the position of the reference gNB is independently provided by the reference gNB). Alternatively, the neighboring gNB may provide no information related to propagation delay to the location server 172 or the UE 104, as that may be stored at the location server 172 (or provided to the UE 104 via assistance data).

The UE 104 may measure the transmission delay Txdelay, if any, between the transmission of SRS 1602 to the reference gNB1 and the SRS 1604 and 1606 to the neighboring gNBs, and may provide the transmission delay to the location server 172 for UE assisted positioning.

The location server 172 (e.g., LMF 270) or the UE 104, may use the received reports to determine the RSTD for multiple gNB pairs, e.g. based on equation 5. Using known positions of the gNBs, the location server 172 (e.g., LMF 270) or the UE 104 may use UTDOA to determine a position estimate of the UE 104 using multilateration and the determined RSTDs. As there is no requirement for tight synchronization between the gNBs, the accuracy of the OTDOA positioning of the UE may be improved.

Figure 17:
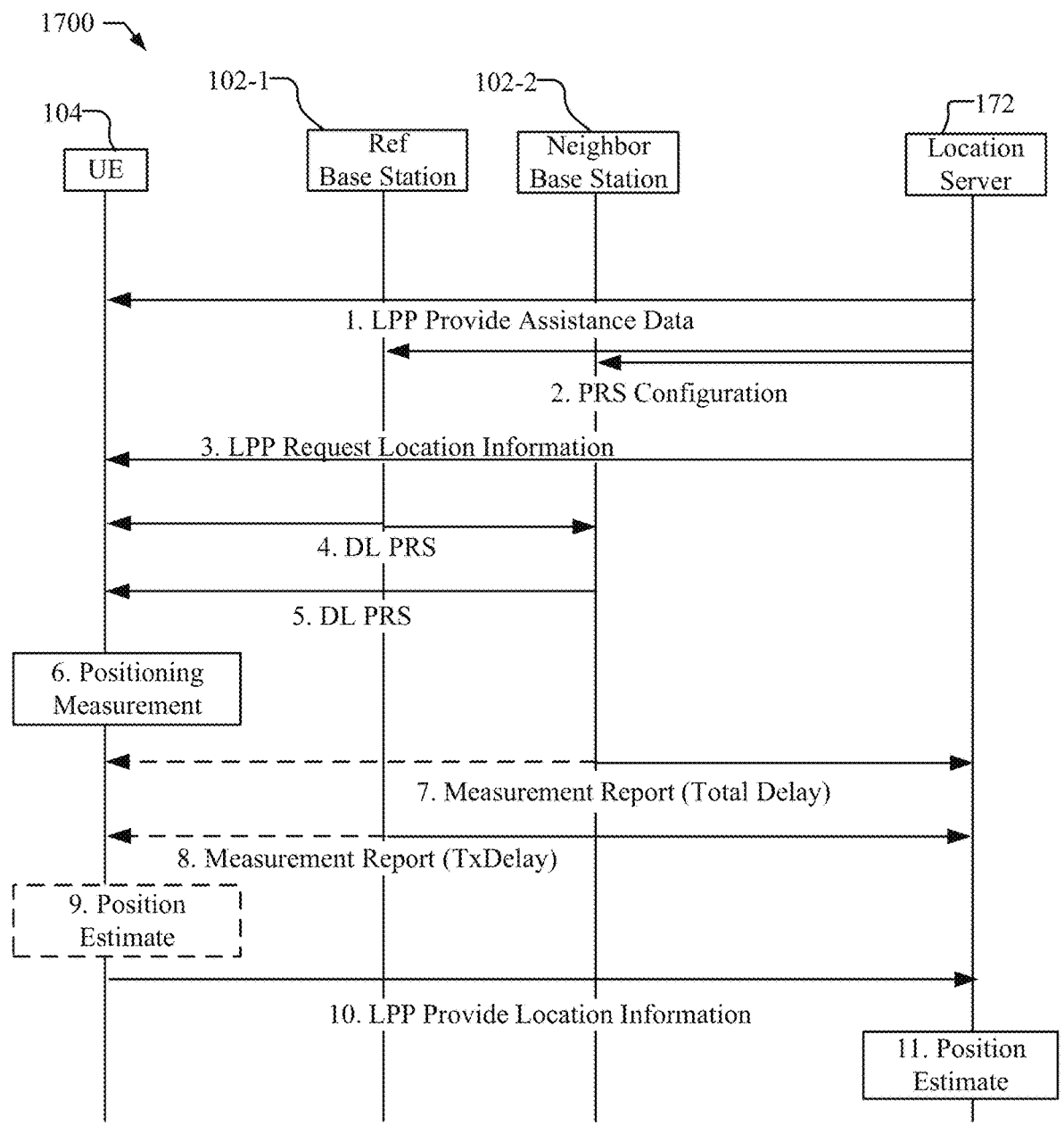
FIG. 17 is a message flow illustrating the messaging for supporting OTDOA positioning that includes delayed transmission by the neighboring gNBs.

FIG. 17 is a message flow 1700 illustrating the messaging between the location server 172, base stations 102-1 and 102-2, and the UE 104 for supporting OTDOA positioning of the UE using RSTD measurements that includes delayed transmission by the neighboring gNBs to mitigate effects of network synchronization error, as discuss herein, e.g., with respect to FIGS. 12 and 13. The location server 172, for example, may be an LMF 270, and the base stations 102-1, 102-2 may be gNBs. Base stations 102-1 and 102-2 are sometimes referred to collectively as base stations 102. Base station 102-1 may be the serving base station for the UE 104 and may additionally serve as the reference base station for the RSTD measurements, while base station 102-2 serves as a neighboring base station. In some implementations, the reference base station may not be the serving base station for the UE 104. While two base stations are illustrated, it should be understood that additional base stations, e.g., additional neighboring base stations, may be used. It should be understood that FIG. 17 illustrates messages that are related to the OTDOA positioning of the UE using a delayed transmission of PRS by the neighboring base station for RSTD measurements but that additional messages, including conventional LPP messages, or fewer messages may be included in the message flow 1700. For example, messaging to establish the positioning session and to determine capabilities of the UE 104 may be exchanged or assistance data may not be included.

At stage 1, the location server 172 may send assistance data, e.g., in an LPP assistance data message, to the UE 104. The assistance data may include PRS configuration information for the base stations 102 and may identify the reference base station 102-1 and neighboring base station 102-2. The assistance data may further include locations of the base stations 102, e.g., for a UE based positioning process. In some implementations, for UE based positioning, the assistance data may further include information related to the total delay, and in particular information related to the propagation time between the reference base station 102-1 and the neighboring base station 102-2. For example, the location server 172 may send the UE 104 the propagation time or equivalently the distance between the base stations 102, or positions of one or both of the base stations.

At stage 2, the location server 172 may send the PRS configuration information to the base stations 102. The location server 172 may further provide to the neighboring base station 102-2 the PRS configuration to be transmitted by the reference base station 102-1 to assist the neighboring base station 102-2 to detect of the PRS transmission from the reference base station 102-1.

At stage 3, the location server 172 may send a location information request to the UE 104, e.g., in an LPP request location information message. The request for example, may be for RSTD measurements for UE assisted positioning or for a location estimate (and optionally the RSTD measurements) for UE based positioning.

At stage 4, the reference base station 102-1 transmits DL PRS to the UE 104 and the neighboring base stations 102-2, which may occur simultaneously or may occur after a transmission delay (Txdelay) that is measured and retained by the reference base station 102-1. The PRS from the reference base station 102-1 to the neighboring base station 102-2 includes a propagation time (Tprop), which is a function of the distance between the base stations 102.

At stage 5, the neighboring base station 102-2 transmits DL PRS to the UE 104. The transmission of the PRS from the neighboring base station 102-2 is triggered based on reception of the PRS from the reference base station 102-1 in stage 4. The transmission of the PRS from the neighboring base station 102-2, for example, occurs after a processing delay (Tpros) after reception of the PRS from the reference base station 102-1 in stage 4. The processing delay is the time between the time of reception of the PRS by the neighboring base station at stage 4 and the time or transmission of the PRS by the neighboring base station in stage 5. The processing delay may include, e.g., the group delay for receiving and transmitting PRS as well as the processing latency in the neighboring base station 102-2. The processing delay may further include restrictions in the transmission of the PRS, such as delays due to restrictions including alignment of the second PRS transmission with a System Frame Number, a slot, or a symbol; or any combination thereof, as discussed in FIG. 13.

At stage 6, the UE 104 performs position measurements with the DL PRS received at stages 4 and 5. The position measurements, for example, include the measurement of the reception time of the PRS from the reference base station 102-1 in stage 4 and the measurement of the reception time of the PRS from the neighboring base station 102-2 in stage 5. In some implementations, the UE 104 may determine a difference in the reception times, while in other implementations, the UE 104 may retain both reception times.

At stage 7, the neighboring base station 102-2 transmit a measurement report that includes at least a portion of the total delay for the transmission of the PRS by the neighboring base station 102-2 for determination of the RSTD for the base stations 102. As illustrated with a solid arrow in FIG. 7, the measurement report in stage 7 may be sent to the location server 172, e.g., for UE assisted positioning. In another implementation, as illustrated with the dotted arrow in FIG. 7, the measurement report in stage 7 may be sent to the UE 104, e.g., for UE based positioning. The at least a portion of the total delay, in one implementation, may include both the propagation delay (Tprop) and the processing delay (Tpros). The propagation delay (Tprop), for example, may be provided in terms of the propagation time or, equivalently, the distance between the base stations 102, which may be parameters stored, e.g., in a look up table, in the base stations 102. The distance, for example, may be based on known or measured positions of the base stations. For example, the network may be aware of the positions of the base stations or the positions may be measured by each base station 102, e.g., using GPS or other wireless, e.g., cellular, positioning methods. In some implementations, the distance may be determined by the base stations using ranging techniques, such as Round Trip Time (RTT). The processing delay (Tpros) may be measured parameters based on the time of reception of the PRS received by the neighboring base station 102-1 in stage 4 and the time of transmission of the PRS transmitted by the neighboring base station 102-2 in stage 5, and may include well calibrated parameters, such as group delay, and any delays to alignment restrictions of the PRS transmission with SFM, slot, or symbol, or a combination thereof. In some implementations, the neighboring base station 102-2 may send only a portion of the total delay, such as only the processing delay (Tpros), as the location server 172 be independently aware of the propagation time, i.e., the propagation delay (Tprop) between the base stations, e.g., based on ranging information or position information for the base stations (the location server 172 may provide the propagation delay (Tprop) to the UE 104 in assistance data in stage 1 for UE based positioning). In some implementations, the neighboring base station 102-2 may further include a portion of the propagation delay (Tprop), such as a measured position of the neighboring base station 102-2, where the location server 172 (or the UE 104) obtains independently the position of the reference base station 102-1.

At stage 8, the reference base station 102-1 may transmit a measurement report that includes the transmission delay, if any, between sending PRS to the UE 104 and sending PRS to the neighboring base station 102-2 in stage 4. The measurement report may further include any information necessary to determine the propagation delay (Tprop), such as a measured position of the reference base station 102-1. As illustrated with a solid arrow in FIG. 8, the measurement report in stage 8 may be sent to the location server 172, e.g., for UE assisted positioning. In another implementation, as illustrated with the dotted arrow in FIG. 8, the measurement report in stage 8 may be sent to the UE 104, e.g., for UE based positioning.

At station 9 as illustrated with a dotted box, for UE based positioning, the UE 104 may generate a position estimate using OTDOA. The UE 104, for example, may determine the RSTD for the base stations 102 based on a difference in the reception times of the PRS from the reference base station 102-1 and the neighboring base station 102-2 received in stages 4 and 5, respectively, and may subtract the total delay, as determined from propagation delay (Tprop), processing delay (Tpros), and transmission delay (TxDelay) information in the measurement reports received in stages 7 and 8 (and optionally from the assistance data), e.g., as discussed in reference to equation 3 above. The UE 104 may determine RSTD for additional base station pairs (not shown in FIG. 17) in the same manner. Using the known locations of the base stations, e.g., as received in the assistance data in stage 1, and the RSTD measurements, the position of the UE 104 may be estimated using multilateration.

At stage 10, the UE 104 sends the location information to the location server 172 in an LPP provide location information message. The location information, for example, may include the determined position estimate from stage 9 and/or position measurements determined at stage 6, e.g., an indication of the time of reception of the PRS from the reference base station 102-1 and the time of reception of the PRS from the neighboring base station 102-2. For example, the location information may include the difference in the reception times of the PRS received at stage 4 stage 5, or both reception times.

At stage 11, the location server 172 may determine a position estimate or verify the position estimate from the UE 104 based on the location information received in the messages in stages 7, 8, and 10. The location server 172, for example, may determine the RSTD for the base stations 102 based on a difference in the reception times of the PRS from the reference base station 102-1 and the neighboring base station 102-2, and may subtract the total delay, as determined from propagation delay (Tprop), processing delay (Tpros), and transmission delay (TxDelay) information in the measurement reports received in stages 7 and 8, e.g., as discussed in reference to equation 3 above. The location server 172 may determine RSTD for additional base station pairs (not shown in FIG. 17) in the same manner. Using the known locations of the base stations and the RSTD measurements, the position of the UE 104 may be estimated using multilateration.

Figure 18:
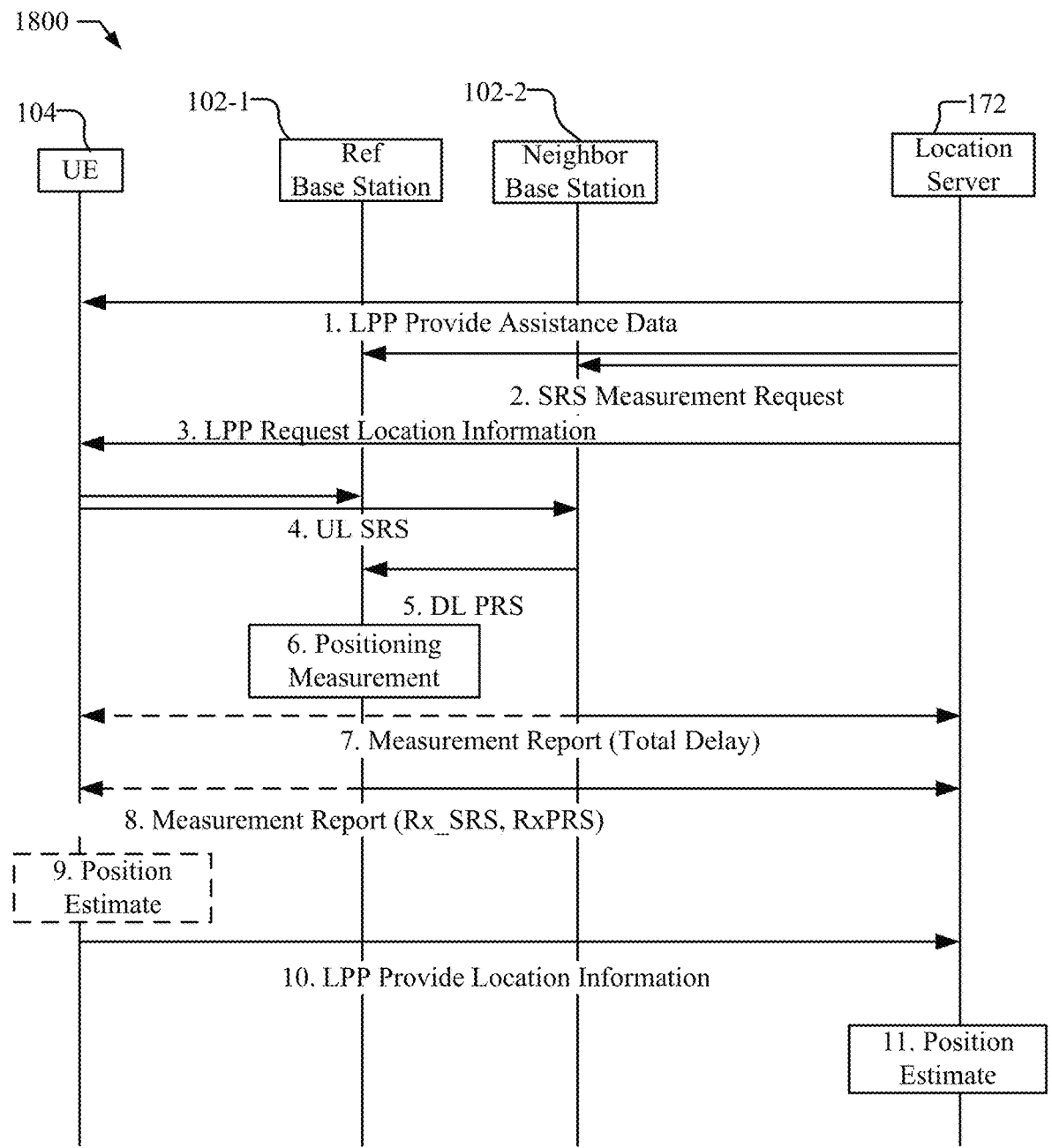
FIG. 18 is a message flow illustrating the messaging for supporting UTDOA positioning that includes delayed transmission by the neighboring gNBs.

FIG. 18 is a message flow 1800 illustrating the messaging between the location server 172, base stations 102-1 and 102-2, and the UE 104 for supporting UTDOA positioning of the UE using RSTD measurements that includes a delayed transmission of PRS by the neighboring gNBs to mitigate effects of network synchronization error, as discuss herein, e.g., with respect to FIGS. 15 and 16. The location server 172, for example, may be an LMF 270, and the base stations 102-1, 102-2 may be gNBs. Base stations 102-1 and 102-2 are sometimes referred to collectively as base stations 102. Base station 102-1 may be the serving base station for the UE 104 and may additionally serve as the reference base station for the RSTD measurements, while base station 102-2 serves as a neighboring base station. In some implementations, the reference base station may not be the serving base station for the UE 104. While two base stations are illustrated, it should be understood that additional base stations, e.g., additional neighboring base stations, may be used. It should be understood that FIG. 18 illustrates messages that are related to the UTDOA positioning of the UE using a delayed transmission of PRS by the neighboring base station for RSTD measurements but that additional messages, including conventional LPP messages, or fewer messages may be included may be included in the message flow 1800. For example, messaging to establish the positioning session and to determine capabilities of the UE 104 may be exchanged or assistance data may not be included.

At stage 1, the location server 172 may send assistance data, e.g., in an LPP assistance data message, to the UE 104. The assistance data may include configuration information for SRS transmissions to the base stations 102, for example, identification of the reference base station 102-1 and neighboring base station 102-2. If UTDOA is UE based positioning, the assistance data may further include locations of the base stations 102. In some implementations, for UE based positioning, the assistance data may further include information related to the total delay, and in particular information related to the propagation time between the neighboring base station 102-2 and the reference base station 102-1. For example, the location server 172 may send the UE 104 the propagation time or equivalently the distance between the base stations 102, or positions of one or both of the base stations.

At stage 2, the location server 172 may send an SRS measurement request to the base stations 102. The location server 172 may further provide to the reference base station 102-1 and neighboring base station 102-2, the PRS configuration to be transmitted by the neighboring base station 102-2 in response to receipt of SRS from the UE 104 to assist the reference base station 102-1 in detecting the PRS transmission from the neighboring base station 102-2. The request may instruct the base stations 102 to provide measurement reports to the location server 172 for UE assisted positioning or to the UE 104 for UE based positioning.

At stage 3, the location server 172 may send a location information request to the UE 104, e.g., in an LPP request location information message. The request for example, instruct the UE 104 to transmit SRS to the base stations 102. In some implementations, the request may request any transmission delay (TxDelay) in transmitting the SRS to the base stations 102, e.g., for UE assisted positioning. In some implementations, the request may instruct the UE 104 to perform UE based positioning.

At stage 4, the UE 104 transmits UL SRS for positioning to the reference base station 102-1 and the neighboring base stations 102-2, which may occur simultaneously or may occur after a transmission delay (Txdelay) that is measured and retained by the UE 104.

At stage 5, the neighboring base station 102-2 transmits PRS to the reference base station 102-1. The transmission of the PRS from the neighboring base station 102-2 is triggered based on reception of the SRS from the UE 104 in stage 4. The transmission of the PRS from the neighboring base station 102-2, for example, occurs after a processing delay (Tpros) after reception of the SRS from the UE 104 in stage 4. The processing delay is the time between the time of reception of the SRS by the neighboring base station at stage 4 and the time or transmission of the PRS by the neighboring base station in stage 5. The processing delay may include, e.g., the group delay for receiving the SRS and transmitting the PRS as well as the processing latency in the neighboring base station 102-2. The processing delay may further include restrictions in the transmission of the PRS, such as delays due to restrictions including alignment of the second PRS transmission with a System Frame Number, a slot, or a symbol; or any combination thereof, as discussed in FIG. 16. The PRS from the neighboring base station 102-2 to the reference base station 102-1 includes a propagation time (Tprop), which is a function of the distance between the base stations 102.

At stage 6, the reference base station 102-1 performs position measurements with the SRS received at stage 4 and the PRS received at stage 5. The position measurements, for example, include the measurement of the reception time of the SRS from the UE 104 in stage 4 and the measurement of the reception time of the PRS from the neighboring base station 102-2 in stage 5. In some implementations, the reference base station 102-1 may determine a difference in the reception times, while in other implementations, the reference base station 102-1 may retain both reception times.

At stage 7, the neighboring base station 102-2 transmit a measurement report that includes at least a portion of the total delay for the transmission of the PRS by the neighboring base station 102-2 for determination of the RSTD for the base stations 102. As illustrated with a solid arrow in FIG. 7, the measurement report in stage 7 may be sent to the location server 172, e.g., for UE assisted positioning. In another implementation, as illustrated with the dotted arrow in FIG. 7, the measurement report in stage 7 may be sent to the UE 104, e.g., for UE based positioning. The at least a portion of the total delay, in one implementation, may include both the propagation delay (Tprop) and the processing delay (Tpros). The propagation delay (Tprop), for example, may be provided in terms of the propagation time or, equivalently, the distance between the base stations 102, which may be parameters stored, e.g., in a look up table, in the base stations 102. The distance, for example, may be based on known or measured positions of the base stations. For example, the network may be aware of the positions of the base stations or the positions may be measured by each base station 102, e.g., using GPS or other wireless, e.g., cellular, positioning methods. In some implementations, the distance may be determined by the base stations using ranging techniques, such as Round Trip Time (RTT). The processing delay (Tpros) may be measured parameters based on the time of reception of the SRS received by the neighboring base station 102-1 in stage 4 and the time of transmission of the PRS transmitted by the neighboring base station 102-2 in stage 5, and may include well calibrated parameters, such as group delay, and any delays to alignment restrictions of the PRS transmission with SFM, slot, or symbol, or a combination thereof. In some implementations, the neighboring base station 102-2 may send only a portion of the total delay, such as only the processing delay (Tpros), as the location server 172 be independently aware of the propagation time, i.e., the propagation delay (Tprop) between the base stations, e.g., based on ranging information or position information for the base stations (the location server 172 may provide the propagation delay (Tprop) to the UE 104 in assistance data in stage 1 for UE based positioning). In some implementations, the neighboring base station 102-2 may further include a portion of the propagation delay (Tprop), such as a measured position of the neighboring base station 102-2, where the location server 172 (or the UE 104) obtains independently the position of the reference base station 102-1.

At stage 8, the reference base station 102-1 may transmit a measurement report that includes the position measurements determined at stage 6, e.g., an indication of the time of reception of the SRS from the UE 104 and the time of reception of the PRS from the neighboring base station 102-2. For example, the measurement report may include the difference in the reception times of the SRS and PRS received at stage 4 stage 5, or both reception times. The measurement report may further include any information necessary to determine the propagation delay (Tprop), such as a measured position of the reference base station 102-1. As illustrated with a solid arrow in FIG. 8, the measurement report in stage 8 may be sent to the location server 172, e.g., for UE assisted positioning. In another implementation, as illustrated with the dotted arrow in FIG. 8, the measurement report in stage 8 may be sent to the UE 104, e.g., for UE based positioning.

At station 9 as illustrated with a dotted box, for UE based positioning, the UE 104 may generate a position estimate using UTDOA. The UE 104, for example, may determine the RSTD for the base stations 102 based on a difference in the reception times of the SRS and PRS received from the reference base station 102-1 at stage 8, and may subtract the total delay, as determined from propagation delay (Tprop) and processing delay (Tpros) received in stages 7 and 8 (and optionally from the assistance data), as well as the transmission delay (TxDelay), if any, as measured by the UE 104, e.g., as discussed in reference to equation 5 above. The UE 104 may determine RSTD for additional base station pairs (not shown in FIG. 18) in the same manner. Using the known locations of the base stations, e.g., as received in the assistance data in stage 1, and the RSTD measurements, the position of the UE 104 may be estimated using multilateration.

At stage 10, the UE 104 may send the requested location information to the location server 172 in an LPP provide location information message. The location information, for example, may include the determined position estimate from stage 9 and/or the transmission delay (TxDelay), if any, as measured by the UE 104 at stage 4.

At stage 11, the location server 172 may determine a position estimate or verify the position estimate from the UE 104 based on the location information received in the messages in stages 7, 8, and 10. The location server 172, for example, may determine the RSTD for the base stations 102 based on a difference in the reception times of the SRS and PRS received from the reference base station 102-1, and may subtract the total delay, as determined from propagation delay (Tprop) and processing delay (Tpros) received in stages 7 and 8, as well as transmission delay (TxDelay), if any, received from the UE 104 at stage 10, e.g., as discussed in reference to equation 5 above. The location server 172 may determine RSTD for additional base station pairs (not shown in FIG. 18) in the same manner. Using the known locations of the base stations and the RSTD measurements, the position of the UE 104 may be estimated using multilateration.

Figure 19:
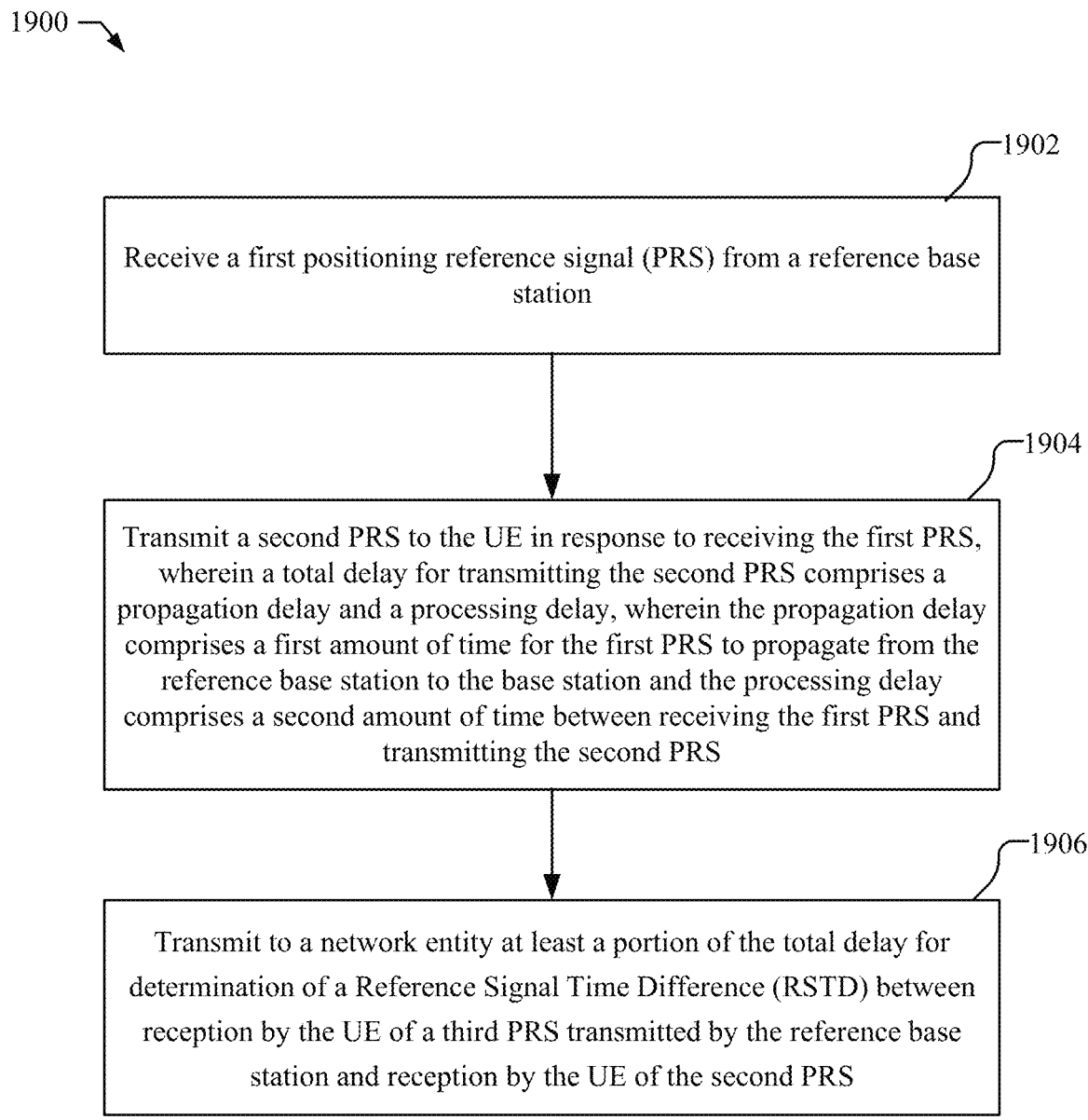
FIG. 19 shows a flowchart for an exemplary method for supporting OTDOA positioning of a UE performed by a neighboring base station.

FIG. 19 shows a flowchart for an exemplary method 1900 for supporting Observed Time Difference of Arrival (OTDOA) positioning of a user equipment (UE) in a wireless network performed by a base station, such as base station 102 or 600 shown in FIGS. 1 and 6, and base station 102-2 shown in FIG. 17, in a manner consistent with disclosed implementations.

At block 1902, the base station receives a first positioning reference signal (PRS) from a reference base station, e.g., as illustrated at stage 4 of FIG. 17. A means for receiving a first positioning reference signal (PRS) from a reference base station may include the transceiver 615 and one or more processors 610 with dedicated hardware or implementing executable code or software instructions 612 in memory 611, such as the positioning session module 672 in base station 600 shown in FIG. 6.

At block 1904, the base station transmits a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS, e.g., as illustrated at stage 5 of FIG. 17. A means for transmitting a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS may include the transceiver 615 and one or more processors 610 with dedicated hardware or implementing executable code or software instructions 612 in memory 611, such as the positioning session module 672 in base station 600 shown in FIG. 6.

At block 1906, the base station transmits to a network entity at least a portion of the total delay for determination of a Reference Signal Time Difference (RSTD) between reception by the UE of a third PRS transmitted by the reference base station and reception by the UE of the second PRS, e.g., as illustrated at stage 8 of FIG. 17. In one implementation, the network entity may be a location server and the RSTD and position of the UE is determined using OTDOA by the location server. In one implementation, the network entity is the UE and the RSTD and position of the UE is determined using OTDOA by the UE. In one implementation, the first PRS may be the third PRS that is transmitted by the reference base station and received by the UE. A means for transmitting to a network entity at least a portion of the total delay for determination of a Reference Signal Time Difference (RSTD) between reception by the UE of a third PRS transmitted by the reference base station and reception by the UE of the second PRS may include the transceiver 615 and one or more processors 610 with dedicated hardware or implementing executable code or software instructions 612 in memory 611, such as the positioning session module 672 in base station 600 shown in FIG. 6.

In some implementations, the propagation delay may be determined based on a known distance between the base station and the reference base station. For example, the known distance between the base station and the reference base station may be determined based on known positions of the base station and the reference base station. In another example, the base station may further perform a wireless ranging procedure with the reference base station, and wherein the known distance between the base station and the reference base station is determined based on the wireless ranging procedure.

In some implementations, the at least the portion of the total delay transmitted to the network entity may include only the processing delay, wherein the network entity independently obtains the propagation delay. In some implementations, the at least the portion of the total delay transmitted to the network entity may include the processing delay and position information for the base station. In some implementations, the at least the portion of the total delay transmitted to the network entity may include the processing delay and the propagation delay.

In one implementation, the processing delay may be one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

Figure 20:
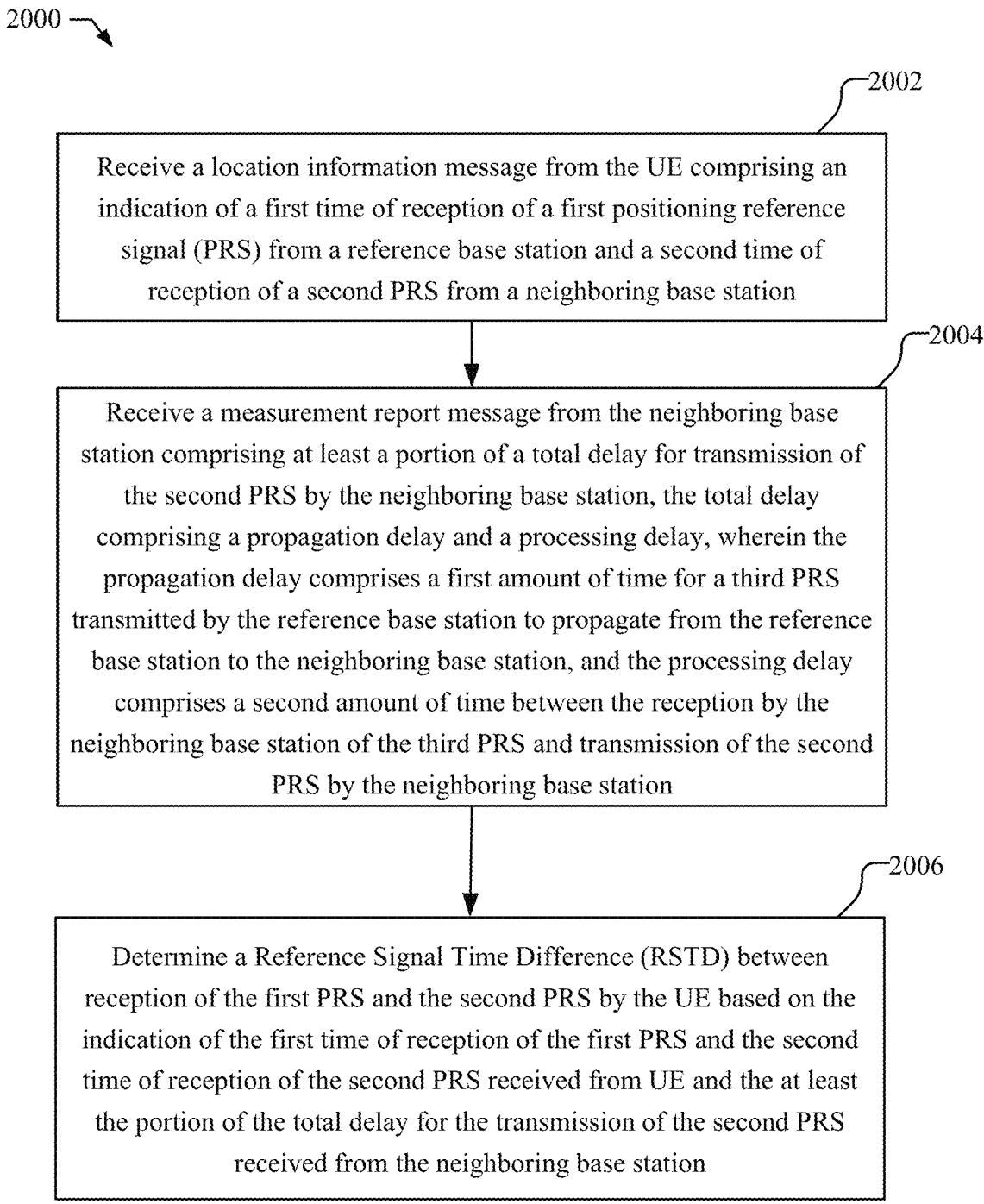
FIG. 20 shows a flowchart for an exemplary method for supporting OTDOA positioning of a UE performed by a location server.

FIG. 20 shows a flowchart for an exemplary method 2000 for supporting Observed Time Difference of Arrival (OTDOA) positioning of a user equipment (UE) in a wireless network performed by a location server, such as location server 172, 700 or LMF 270 shown in FIGS. 1, 2B, 7, and 17, in a manner consistent with disclosed implementations.

At block 2002, the location server receives a location information message from the UE comprising an indication of a first time of reception of a first positioning reference signal (PRS) from a reference base station and a second time of reception of a second PRS from a neighboring base station, e.g., as illustrated at stage 10 of FIG. 17. In some implementations, the indication of the first time of reception of the first PRS and the second time of reception of the second PRS may include a difference between the first time of reception of the first PRS and the second time of reception of the second PRS. In some implementations, the indication of the first time of reception of the first PRS and the second time of reception of the second PRS may include both of the first time of reception of the first PRS and the second time of reception of the second PRS. A means for receiving a location information message from the UE comprising an indication of a first time of reception of a first positioning reference signal (PRS) from a reference base station and a second time of reception of a second PRS from a neighboring base station may include the transceiver 715 and one or more processors 710 with dedicated hardware or implementing executable code or software instructions 712 in memory 711, such as the positioning session module 772 in location server 700 shown in FIG. 7.

At block 2004, the location server receives a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station, e.g., as illustrated at stage 17 of FIG. 17. A means for receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station may include the transceiver 715 and one or more processors 710 with dedicated hardware or implementing executable code or software instructions 712 in memory 711, such as the positioning session module 772 in location server 700 shown in FIG. 7.

At block 2006, the location server determining a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station, e.g., as illustrated at stage 11 of FIG. 17. A means for determining a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station may include the one or more processors 710 with dedicated hardware or implementing executable code or software instructions 712 in memory 711, such as the positioning session module 772 in location server 700 shown in FIG. 7.

In one implementation, the first PRS is the third PRS. In another implementation, the location server may further receive a message from the reference base station indicating a time delay between transmission of the first PRS and transmission of the third PRS, wherein determining the RSTD is further based on the time delay between the transmission of the first PRS and the transmission of the third PRS, e.g., as illustrated at stage 18 of FIG. 17. A means for receiving a message from the reference base station indicating a time delay between transmission of the first PRS and transmission of the third PRS, wherein determining the RSTD is further based on the time delay between the transmission of the first PRS and the transmission of the third PRS may include the transceiver 715 and one or more processors 710 with dedicated hardware or implementing executable code or software instructions 712 in memory 711, such as the positioning session module 772 in location server 700 shown in FIG. 7.

In one implementation, the at least the portion of the total delay received from the neighboring base station may include only the processing delay and the location server may further obtain the propagation delay. For example, the propagation delay may be determined based on a known distance between the reference base station and the neighboring base station. The known distance between the neighboring base station and the reference base station may be determined based on known positions of the neighboring base station and the reference base station. In another example, the location server may obtain the propagation delay by receiving from the reference base station a position of the reference base station; receiving from the neighboring base station a position of the neighboring base station; and determining a distance between the reference base station and the neighboring base station, wherein the propagation delay is determined based on the distance. A means for obtaining the propagation delay may include the transceiver 715 and one or more processors 710 with dedicated hardware or implementing executable code or software instructions 712 in memory 711, such as the positioning session module 772 in location server 700 shown in FIG. 7. In some implementations, the at least the portion of the total delay received from the neighboring base station includes the processing delay and the propagation delay.

In some implementations, the processing delay may include one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof, e.g., as discussed at stage 5 of FIG. 17.

Figure 21:
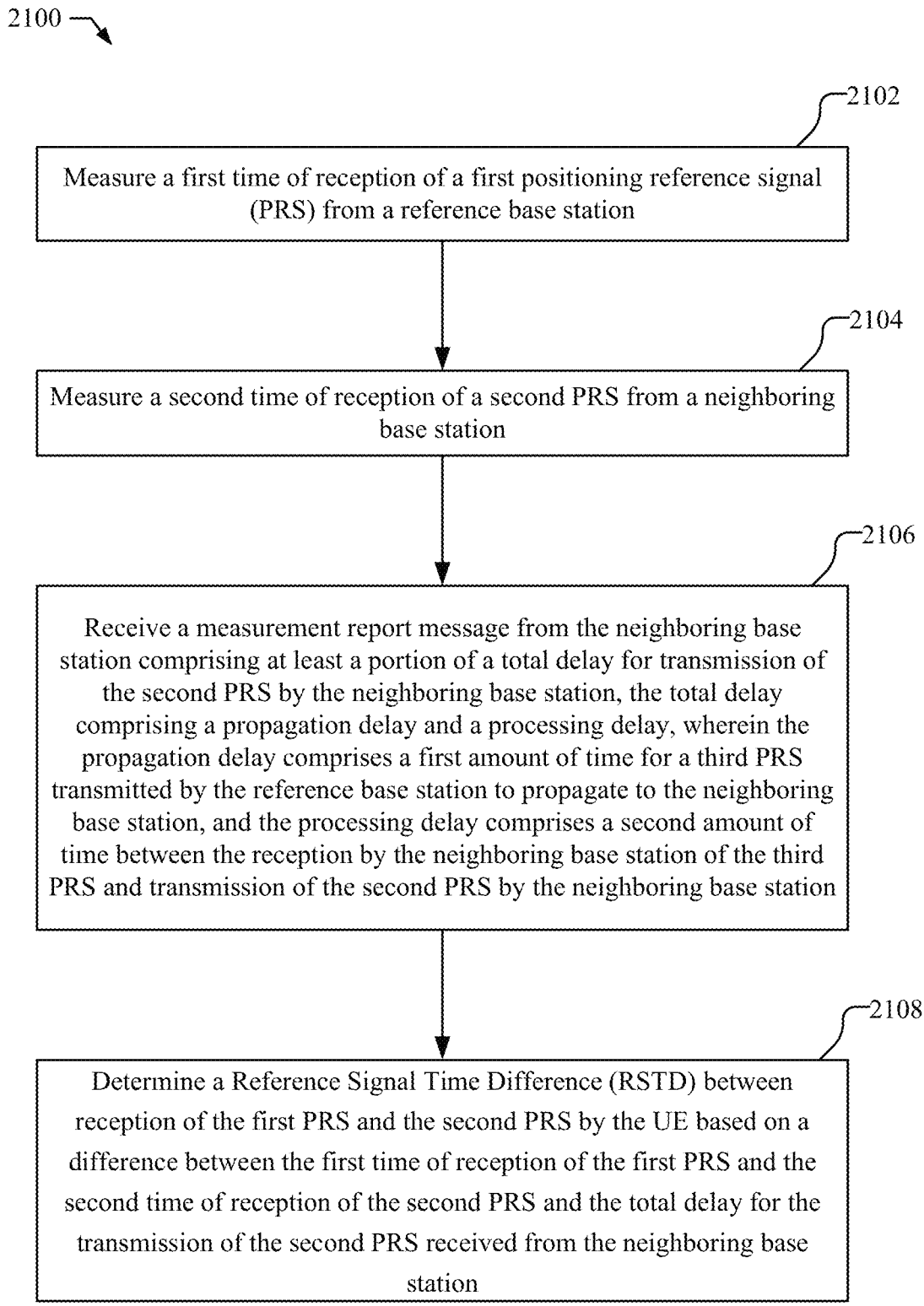
FIG. 21 shows a flowchart for an exemplary method for supporting OTDOA positioning of a UE performed by the UE.

FIG. 21 shows a flowchart for an exemplary method 2100 for supporting Observed Time Difference of Arrival (OT-DOA) positioning of a user equipment (UE) in a wireless network performed by the UE, such as UE 104 or 500 shown in FIGS. 1, 5, and 17, in a manner consistent with disclosed implementations.

At block 2102, the UE measures a first time of reception of a first positioning reference signal (PRS) from a reference base station, e.g., as illustrated at stages 4 and 6 of FIG. 17. A means for measuring a first time of reception of a first positioning reference signal (PRS) from a reference base station may include the transceiver 515 and one or more processors 510 with dedicated hardware or implementing executable code or software instructions 512 in memory 511, such as the positioning session module 572, in UE 500 shown in FIG. 5.

At block 2104, the UE measures measuring a second time of reception of a second PRS from a neighboring base station, e.g., as illustrated at stages 5 and 6 of FIG. 17. A means for measuring a second time of reception of a second PRS from a neighboring base station may include the transceiver 515 and one or more processors 510 with dedicated hardware or implementing executable code or software instructions 512 in memory 511, such as the positioning session module 572, in UE 500 shown in FIG. 5.

At block 2106, the UE receives a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station, e.g., as illustrated at stage 7 of FIG. 17. A means for receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station may include the transceiver 515 and one or more processors 510 with dedicated hardware or implementing executable code or software instructions 512 in memory 511, such as the positioning session module 572, in UE 500 shown in FIG. 5.

At block 2108, the UE determines a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station, e.g., as illustrated at stage 9 of FIG. 17. A means for determining a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station may include the transceiver 515 and one or more processors 510 with dedicated hardware or implementing executable code or software instructions 512 in memory 511, such as the positioning session module 572, in UE 500 shown in FIG. 5.

In one implementation, the first PRS is the third PRS. In another implementation, the UE may further receive a message from the reference base station indicating a time delay between transmission of the first PRS and transmission of the third PRS, wherein determining the RSTD is further based on the time delay between the transmission of the first PRS and the transmission of the third PRS, e.g., as illustrated at stage 8 of FIG. 17. A means for receiving a message from the reference base station indicating a time delay between transmission of the first PRS and transmission of the third PRS, wherein determining the RSTD is further based on the time delay between the transmission of the first PRS and the transmission of the third PRS may include the transceiver 515 and one or more processors 510 with dedicated hardware or implementing executable code or software instructions 512 in memory 511, such as the positioning session module 572, in UE 500 shown in FIG. 5.

In one implementation, the at least the portion of the total delay received from the neighboring base station may include only the processing delay and the UE may further determine the propagation delay. For example, the UE may determine the propagation delay by receiving from the reference base station a position of the reference base station; receiving from the neighboring base station a position of the neighboring base station; and determining a distance between the reference base station and the neighboring base station, wherein the propagation delay is determined based on the distance. A means for determining the propagation delay may include the transceiver 515 and one or more processors 510 with dedicated hardware or implementing executable code or software instructions 512 in memory 511, such as the positioning session module 572, in UE 500 shown in FIG. 5. In one implementation, the at least the portion of the total delay received from the neighboring base station may include the processing delay and the propagation delay.

In one implementation, the processing delay may include one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof, e.g., as discussed at stage 5 of FIG. 17.

Figure 22:
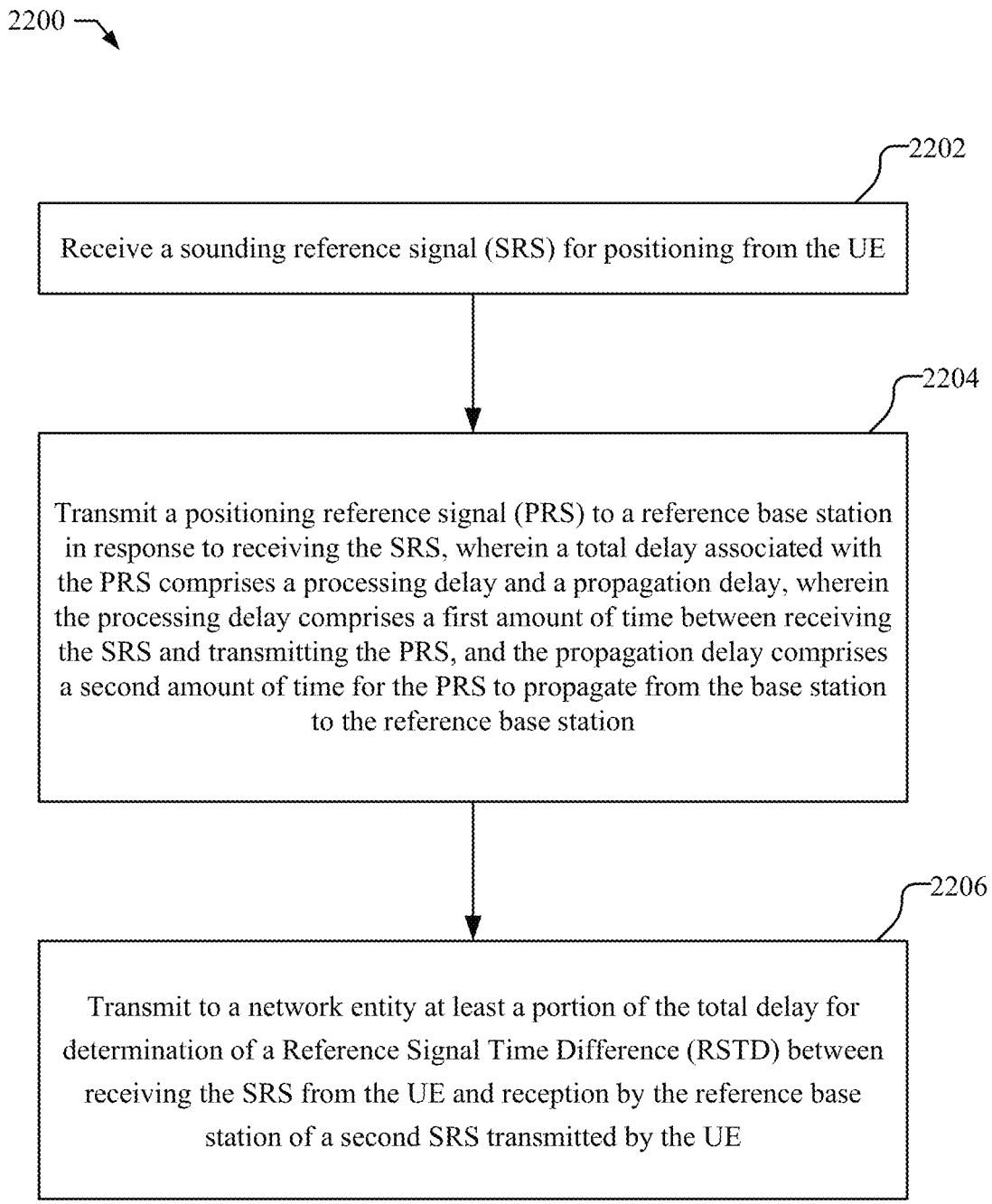
FIG. 22 shows a flowchart for an exemplary method for supporting UTDOA positioning of a UE performed by a neighboring base station.

FIG. 22 shows a flowchart for an exemplary method 2200 for supporting Uplink Time Difference of Arrival (UTDOA) positioning of a user equipment (UE) in a wireless network performed by a base station, such as base station 102 or 600 shown in FIGS. 1 and 6, and base station 102-2 shown in FIG. 18, in a manner consistent with disclosed implementations.

At block 2202, the base station receives a sounding reference signal (SRS) for positioning from the UE, e.g., as illustrated at stage 4 of FIG. 18. A means for receiving a sounding reference signal (SRS) for positioning from the UE may include the transceiver 615 and one or more processors 610 with dedicated hardware or implementing executable code or software instructions 612 in memory 611, such as the positioning session module 672 in base station 600 shown in FIG. 6.

At block 2204, the base station transmits a positioning reference signal (PRS) to a reference base station in response to receiving the SRS, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station, e.g., as illustrated at stage 5 of FIG. 18. A means for transmitting a positioning reference signal (PRS) to a reference base station in response to receiving the SRS, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station may include the transceiver 615 and one or more processors 610 with dedicated hardware or implementing executable code or software instructions 612 in memory 611, such as the positioning session module 672 in base station 600 shown in FIG. 6.

At block 2206, the base station transmits to a network entity at least a portion of the total delay for determination of a Reference Signal Time Difference (RSTD) between receiving the SRS from the UE and reception by the reference base station of a second SRS transmitted by the UE, e.g., as illustrated at stage 4 of FIG. 18. In one implementation, the network entity may be a location server and the RSTD and position of the UE is determined using UTDOA by the location server. In one implementation, the network entity may be the UE and the RSTD and position of the UE is determined using UTDOA by the UE. A means for transmitting to a network entity at least a portion of the total delay for determination of a Reference Signal Time Difference (RSTD) between receiving the SRS from the UE and reception by the reference base station of a second SRS transmitted by the UE may include the transceiver 615 and one or more processors 610 with dedicated hardware or implementing executable code or software instructions 612 in memory 611, such as the positioning session module 672 in base station 600 shown in FIG. 6.

In one implementation, the SRS is the second SRS transmitted by the reference base station and received by the UE.

In one implementation, the propagation delay may be determined based on a known distance between the base station and the reference base station. For example, the known distance between the base station and the reference base station may be determined based on known positions of the base station and the reference base station. In another example, the base station may perform a wireless ranging procedure with the reference base station, and the known distance between the base station and the reference base station is determined based on the wireless ranging procedure.

In one implementation, the at least the portion of the total delay transmitted to the network entity may be only the processing delay, wherein the network entity independently obtains the propagation delay. In one implementation, the at least the portion of the total delay transmitted to the network entity may be the processing delay and position information for the base station. In one implementation, the at least the portion of the total delay transmitted to the network entity may be the processing delay and the propagation delay.

In one implementation, the processing delay may include one or more of a group delay in receiving the SRS; a group delay in transmitting the PRS; processing latency; delays in the base station due to transmission restrictions including alignment of the second PRS transmission with a System Frame Number, a slot, or a symbol; or any combination thereof, e.g., as discussed at stage 5 of FIG. 18.

Figure 23:
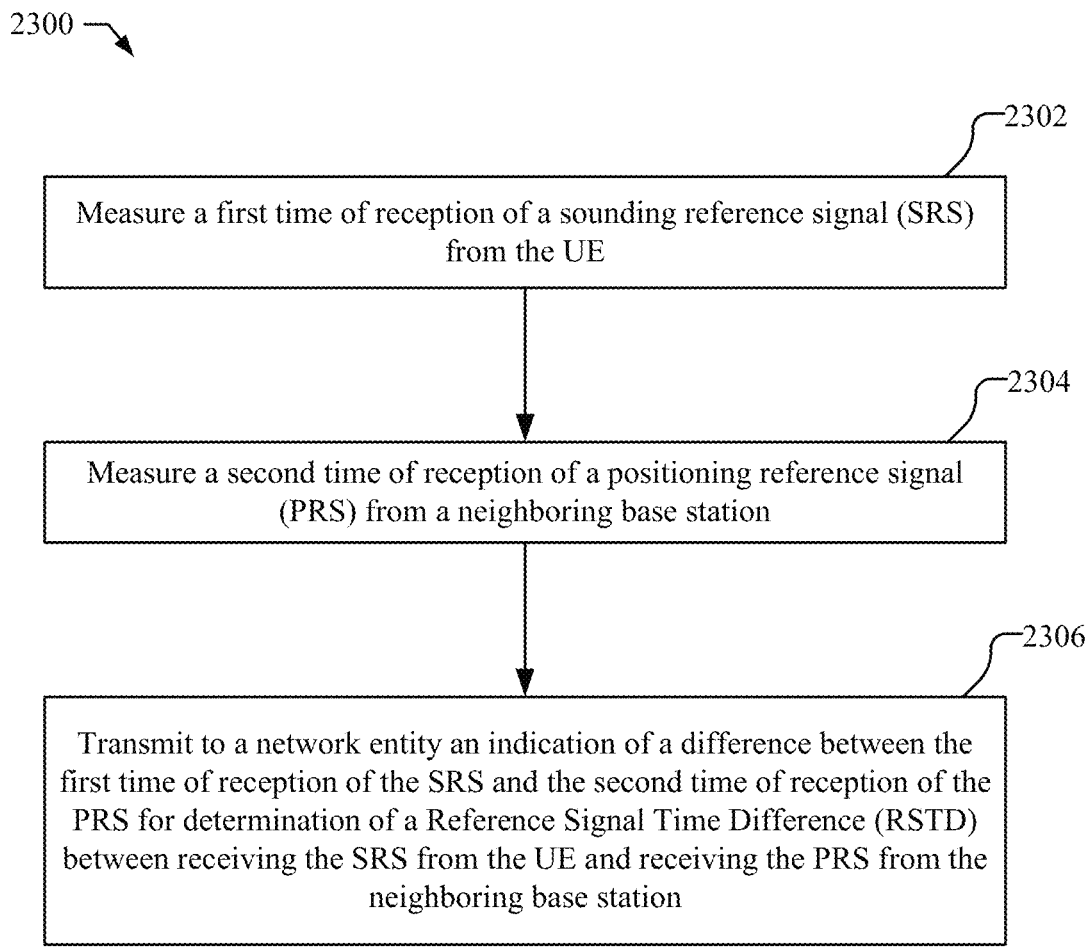
FIG. 23 shows a flowchart for an exemplary method for supporting UTDOA positioning of a UE performed by a reference base station.

FIG. 23 shows a flowchart for an exemplary method 2300 for supporting Uplink Time Difference of Arrival (UTDOA) positioning of a user equipment (UE) in a wireless network performed by a base station, such as base station 102 or 600 shown in FIGS. 1 and 6, and base station 102-2 shown in FIG. 18, in a manner consistent with disclosed implementations.

At block 2302, the base station measures a first time of reception of a sounding reference signal (SRS) from the UE, e.g., as illustrated at stages 4 and 6 of FIG. 18. A means for measuring a first time of reception of a sounding reference signal (SRS) from the UE may include the transceiver 615 and one or more processors 610 with dedicated hardware or implementing executable code or software instructions 612 in memory 611, such as the positioning session module 672 in base station 600 shown in FIG. 6.

At block 2304, the base station measuring a second time of reception of a positioning reference signal (PRS) from a neighboring base station, e.g., as illustrated at stages 5 and 6 of FIG. 18. A means for measuring a second time of reception of a positioning reference signal (PRS) from a neighboring base station may include the transceiver 615 and one or more processors 610 with dedicated hardware or implementing executable code or software instructions 612 in memory 611, such as the positioning session module 672 in base station 600 shown in FIG. 6.

At block 2306, the base station transmit to a network entity an indication of a difference between the first time of reception of the SRS and the second time of reception of the PRS for determination of a Reference Signal Time Difference (RSTD) between receiving the SRS from the UE and receiving the PRS from the neighboring base station, e.g., as illustrated at stage 8 of FIG. 18. In one implementation, the network entity is a location server and the RSTD and position of the UE is determined using UTDOA by the location server. In one implementation, the network entity is the UE and the RSTD and position of the UE is determined using UTDOA by the UE. A means for transmitting to a network entity an indication of a difference between the first time of reception of the SRS and the second time of reception of the PRS for determination of a Reference Signal Time Difference (RSTD) between receiving the SRS from the UE and receiving the PRS from the neighboring base station may include the transceiver 615 and one or more processors 610 with dedicated hardware or implementing executable code or software instructions 612 in memory 611, such as the positioning session module 672 in base station 600 shown in FIG. 6.

Figure 24:
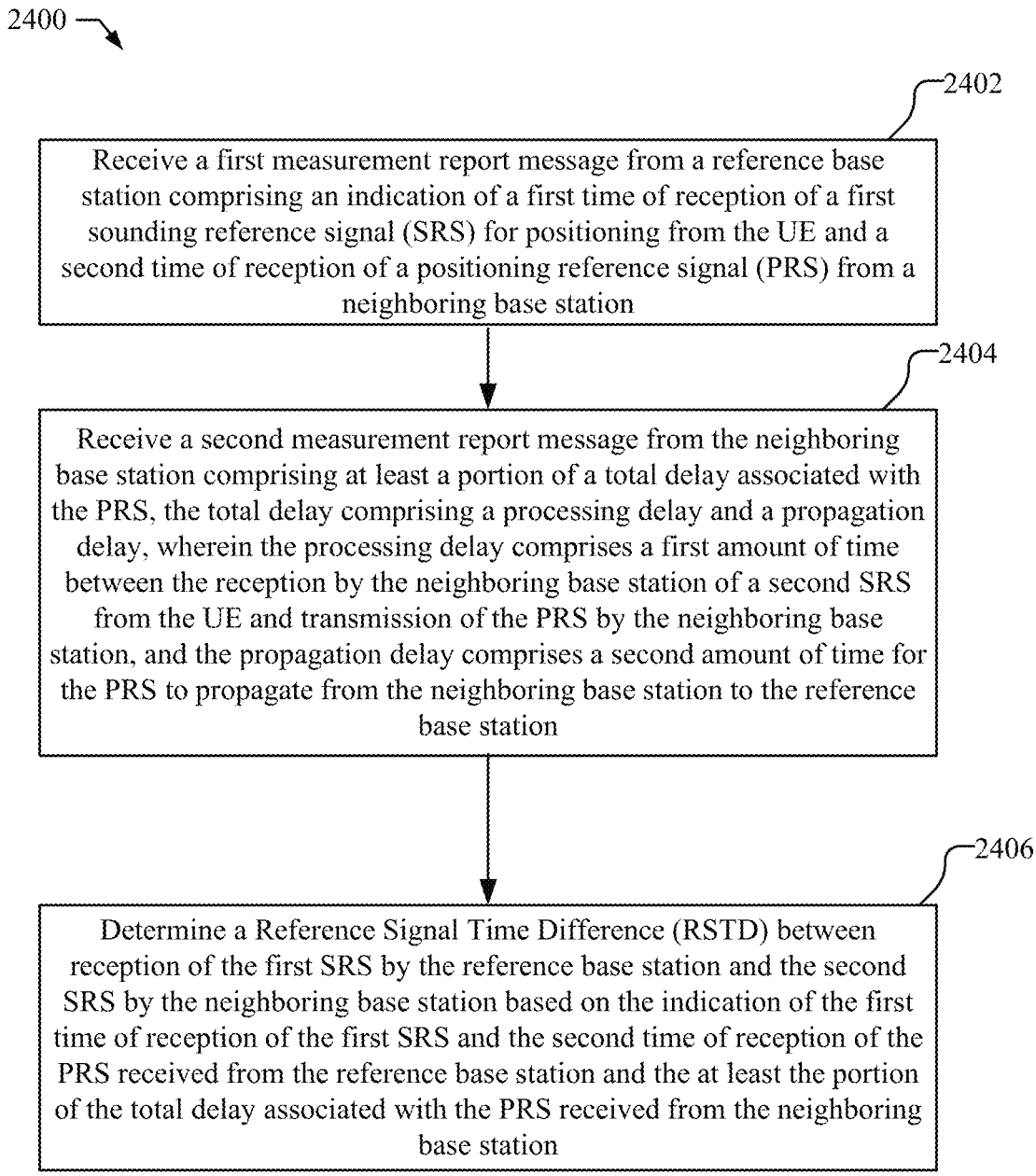
FIG. 24 shows a flowchart for an exemplary method for supporting UTDOA positioning of a UE performed by a location server.

FIG. 24 shows a flowchart for an exemplary method 2400 for supporting Uplink Time Difference of Arrival (UTDOA) positioning of a user equipment (UE) in a wireless network performed by a location server, such as location server 172, 700 or LMF 270 shown in FIGS. 1, 2B, 7, and 18, in a manner consistent with disclosed implementations.

At block 2402, the location server receives a first measurement report message from a reference base station comprising an indication of a first time of reception of a first sounding reference signal (SRS) for positioning from the UE and a second time of reception of a positioning reference signal (PRS) from a neighboring base station, e.g., as illustrated at stage 8 of FIG. 18. In one implementation, the indication of the first time of reception of the first SRS and the second time of reception of the PRS may include a difference between the first time of reception of the first SRS and the second time of reception of the PRS. In one implementation, the indication of the first time of reception of the first SRS and the second time of reception of the PRS may include both of the first time of reception of the first SRS and the second time of reception of the PRS. A means for receiving a first measurement report message from a reference base station comprising an indication of a first time of reception of a first sounding reference signal (SRS) for positioning from the UE and a second time of reception of a positioning reference signal (PRS) from a neighboring base station may include the transceiver 715 and one or more processors 710 with dedicated hardware or implementing executable code or software instructions 712 in memory 711, such as the positioning session module 772 in location server 700 shown in FIG. 7.

At block 2404, the location server receives a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station, e.g., as illustrated at stage 7 of FIG. 18. A means for receiving a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station may include the transceiver 715 and one or more processors 710 with dedicated hardware or implementing executable code or software instructions 712 in memory 711, such as the positioning session module 772 in location server 700 shown in FIG. 7.

At block 2406, the location server determines a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station, e.g., as illustrated at stage 11 of FIG. 18. A means for determining a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station may include the one or more processors 710 with dedicated hardware or implementing executable code or software instructions 712 in memory 711, such as the positioning session module 772 in location server 700 shown in FIG. 7.

In one implementation, the first SRS is the second SRS. In another implementation, the location server may receive a message from the UE indicating a time delay between transmission of the first SRS and transmission of the second SRS, wherein determining the RSTD is further based on the time delay between the transmission of the first SRS and the transmission of the second SRS, e.g., as discussed at stage 10 of FIG. 18. A means for receiving a message from the UE indicating a time delay between transmission of the first SRS and transmission of the second SRS, wherein determining the RSTD is further based on the time delay between the transmission of the first SRS and the transmission of the second SRS may include the transceiver 715 and one or more processors 710 with dedicated hardware or implementing executable code or software instructions 712 in memory 711, such as the positioning session module 772 in location server 700 shown in FIG. 7.

In one implementation, the at least the portion of the total delay received from the neighboring base station may include only the processing delay and the location server further obtains the propagation delay. For example, the propagation delay is determined based on a known distance between the reference base station and the neighboring base station. The known distance between the neighboring base station and the reference base station may be determined based on known positions of the neighboring base station and the reference base station. In one implementation, the location server may obtain by receiving from the reference base station a position of the reference base station; receiving from the neighboring base station a position of the neighboring base station; and determining a distance between the reference base station and the neighboring base station, wherein the propagation delay is determined based on the distance. A means for obtaining the propagation delay may include the transceiver 715 and one or more processors 710 with dedicated hardware or implementing executable code or software instructions 712 in memory 711, such as the positioning session module 772 in location server 700 shown in FIG. 7. In one implementation, the at least the portion of the total delay received from the neighboring base station comprises the processing delay and the propagation delay.

In one implementation, the processing delay may include one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof, e.g., as discussed at stage 5 of FIG. 18.

Figure 25:
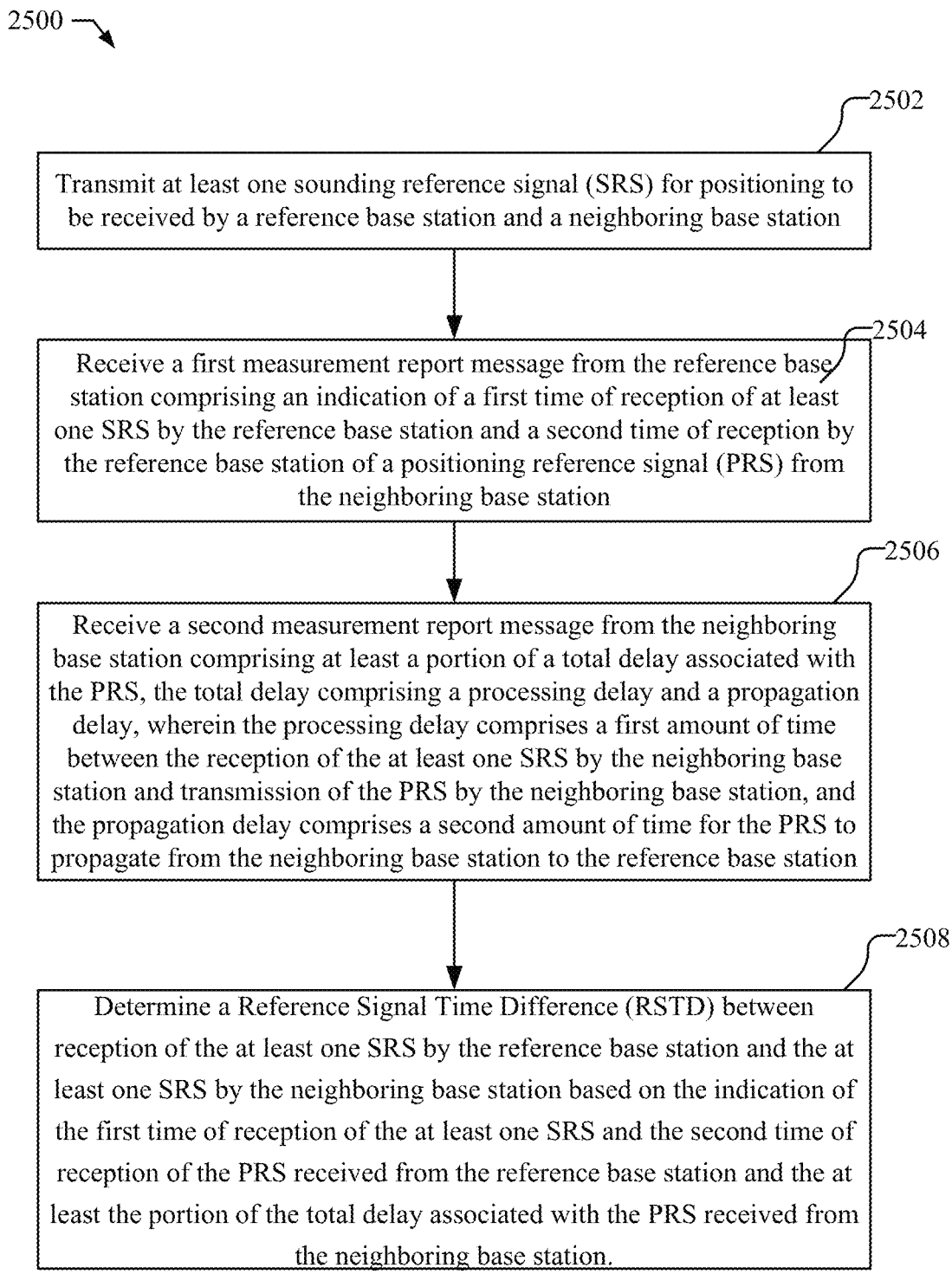
FIG. 25 shows a flowchart for an exemplary method for supporting UTDOA positioning of a UE performed by the UE.

FIG. 25 shows a flowchart for an exemplary method 2500 for supporting Uplink Time Difference of Arrival (UTDOA) positioning of a user equipment (UE) in a wireless network performed by the UE, such as UE 104 or 500 shown in FIGS. 1, 5, and 18, in a manner consistent with disclosed implementations.

At block 2502, the UE transmits at least one sounding reference signal (SRS) for positioning to be received by a reference base station and a neighboring base station, e.g., as illustrated at stage 4 of FIG. 18. A means for transmitting at least one sounding reference signal (SRS) for positioning to be received by a reference base station and a neighboring base station may include the transceiver 515 and one or more processors 510 with dedicated hardware or implementing executable code or software instructions 512 in memory 511, such as the positioning session module 572, in UE 500 shown in FIG. 5.

At block 2504, the UE receives a first measurement report message from the reference base station comprising an indication of a first time of reception of at least one SRS by the reference base station and a second time of reception by the reference base station of a positioning reference signal (PRS) from the neighboring base station, e.g., as illustrated at stage 8 of FIG. 18. A means for receiving a first measurement report message from the reference base station comprising an indication of a first time of reception of at least one SRS by the reference base station and a second time of reception by the reference base station of a positioning reference signal (PRS) from the neighboring base station may include the transceiver 515 and one or more processors 510 with dedicated hardware or implementing executable code or software instructions 512 in memory 511, such as the positioning session module 572, in UE 500 shown in FIG. 5.

At block 2506, the UE receives a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station, e.g., as illustrated at stage 7 of FIG. 18. A means for receiving a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station may include the transceiver 515 and one or more processors 510 with dedicated hardware or implementing executable code or software instructions 512 in memory 511, such as the positioning session module 572, in UE 500 shown in FIG. 5.

At block 2508, the UE determines a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station, e.g., as illustrated at stage 9 of FIG. 18. A means for determining a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station may include the one or more processors 510 with dedicated hardware or implementing executable code or software instructions 512 in memory 511, such as the positioning session module 572, in UE 500 shown in FIG. 5.

In one implementation, a same SRS is received by the reference base station and the neighboring base station. In one implementation, the reference base station receives a first SRS and the neighboring base station receives a second SRS, wherein there is a time delay between transmission of the first SRS and transmission of the second SRS, wherein determining the RSTD is further based on the time delay between the transmission of the first SRS and the transmission of the second SRS, e.g., as discussed in stage 9 of FIG. 18.

In one implementation, the at least the portion of the total delay received from the neighboring base station may include only the processing delay and the UE may further determine the propagation delay. The propagation delay may be determined by receiving from the reference base station a position of the reference base station; receiving from the neighboring base station a position of the neighboring base station; and determining a distance between the reference base station and the neighboring base station, wherein the propagation delay is determined based on the distance. A means for determining the propagation delay may include the transceiver 515 and one or more processors 510 with dedicated hardware or implementing executable code or software instructions 512 in memory 511, such as the positioning session module 572, in UE 500 shown in FIG. 5. In one implementation, the at least the portion of the total delay received from the neighboring base station may include the processing delay and the propagation delay.

In one implementation, the processing delay may include one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof, e.g., as discussed at stage 5 of FIG. 18.

Reference throughout this specification to "one example", "an example", "certain examples", or "exemplary implementation" means that a particular feature, structure, or characteristic described in connection with the feature and/ or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilising terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a base station for supporting Observed Time Difference of Arrival (OTDOA) positioning of a user equipment (UE) in a wireless network, the method comprising: receiving a first positioning reference signal (PRS) from a reference base station; transmitting a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmitting to a network entity at least a portion of the total delay for determination of a Reference Signal Time Difference (RSTD) between reception by the UE of a third PRS transmitted by the reference base station and reception by the UE of the second PRS.

Clause 2. The method of claim 1, wherein the network entity is a location server and the RSTD and position of the UE is determined using OTDOA by the location server.

Clause 3. The method of claim 1, wherein the network entity is the UE and the RSTD and position of the UE is determined using OTDOA by the UE.

Clause 4. The method of any of claims 1-3, wherein the first PRS is the third PRS transmitted by the reference base station and received by the UE.

Clause 5. The method of any of claims 1-4, wherein propagation delay is determined based on a known distance between the base station and the reference base station.

Clause 6. The method of claim 5, wherein the known distance between the base station and the reference base station is determined based on known positions of the base station and the reference base station.

Clause 7. The method of claim 5, wherein the known distance between the base station and the reference base station is determined based on a wireless ranging procedure between the base station and the reference base station.

Clause 8. The method of any of claims 1-7, wherein the at least the portion of the total delay transmitted to the network entity comprises only the processing delay, wherein the network entity independently obtains the propagation delay.

Clause 9. The method of any of claims 1-7, wherein the at least the portion of the total delay transmitted to the network entity comprises the processing delay and position information for the base station.

Clause 10. The method of any of claims 1-7, wherein the at least the portion of the total delay transmitted to the network entity comprises the processing delay and the propagation delay.

Clause 11. The method of any of claims 1-10, wherein the processing delay comprises one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

Clause 12. A base station configured for supporting Observed Time Difference of Arrival (OTDOA) positioning of a user equipment (UE) in a wireless network comprising: an external interface configured to communicate with entities in the wireless network; at least one memory; at least one processor coupled to the external interface and the at least one memory, wherein the at least one processor is configured to: receive a first positioning reference signal (PRS) from a reference base station; transmit a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmit to a network entity at least a portion of the total delay for determination of a Reference Signal Time Difference (RSTD) between reception by the UE of a third PRS transmitted by the reference base station and reception by the UE of the second PRS.

Clause 13. The base station of claim 12, wherein the network entity is a location server and the RSTD and position of the UE is determined using OTDOA by the location server.

Clause 14. The base station of claim 12, wherein the network entity is the UE and the RSTD and position of the UE is determined using OTDOA by the UE.

Clause 15. The base station of any of claims 12-14, wherein the first PRS is the third PRS transmitted by the reference base station and received by the UE.

Clause 16. The base station of any of claims 12-15, wherein the propagation delay is determined based on a known distance between the base station and the reference base station.

Clause 17. The base station of claim 16, wherein the known distance between the base station and the reference base station is determined based on known positions of the base station and the reference base station.

Clause 18. The base station of claim 16, wherein the known distance between the base station and the reference base station is determined based on a wireless ranging procedure between the base station and the reference base station.

Clause 19. The base station of any of claims 12-18, wherein the at least the portion of the total delay transmitted to the network entity comprises only the processing delay, wherein the network entity independently obtains the propagation delay.

Clause 20. The base station of any of claims 12-18, wherein the at least the portion of the total delay transmitted to the network entity comprises the processing delay and position information for the base station.

Clause 21. The base station of any of claims 12-18, wherein the at least the portion of the total delay transmitted to the network entity comprises the processing delay and the propagation delay.

Clause 22. The base station of any of claims 12-21, wherein the processing delay comprises one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

Clause 23. A base station configured for supporting Observed Time Difference of Arrival (OTDOA) positioning of a user equipment (UE) in a wireless network, comprising: means for receiving a first positioning reference signal (PRS) from a reference base station; means for transmitting a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and means for transmitting to a network entity at least a portion of the total delay for determination of a Reference Signal Time Difference (RSTD) between reception by the UE of a third PRS transmitted by the reference base station and reception by the UE of the second PRS.

Clause 24. The base station of claim 23, wherein the network entity is a location server and the RSTD and position of the UE is determined using OTDOA by the location server.

Clause 25. The base station of any of claims 23-24, wherein the network entity is the UE and the RSTD and position of the UE is determined using OTDOA by the UE.

Clause 26. The base station of any of claims 23-25, wherein the first PRS is the third PRS transmitted by the reference base station and received by the UE.

Clause 27. The base station of any of claims 23-26, wherein the propagation delay is determined based on a known distance between the base station and the reference base station.

Clause 28. The base station of claim 27, wherein the known distance between the base station and the reference base station is determined based on known positions of the base station and the reference base station.

Clause 29. The base station of claim 27, wherein the known distance between the base station and the reference base station is determined based on a wireless ranging procedure between the base station and the reference base station.

Clause 30. The base station of any of claims 23-29, wherein the at least the portion of the total delay transmitted to the network entity comprises only the processing delay, wherein the network entity independently obtains the propagation delay.

Clause 31. The base station of any of claims 23-29, wherein the at least the portion of the total delay transmitted to the network entity comprises the processing delay and position information for the base station.

Clause 32. The base station of any of claims 23-29, wherein the at least the portion of the total delay transmitted to the network entity comprises the processing delay and the propagation delay.

Clause 33. The base station of any of claims 23-32, wherein the processing delay comprises one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

Clause 34. A non-transitory storage medium including program code stored thereon, the program code is operable to configure at least one processor in a base station for supporting Observed Time Difference of Arrival (OTDOA) positioning of a user equipment (UE) in a wireless network, the program code comprising instructions to: receive a first positioning reference signal (PRS) from a reference base station; transmit a second PRS to the UE in response to receiving the first PRs, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmit to a network entity at least a portion of the total delay for determination of a Reference Signal Time Difference (RSTD) between reception by the UE of a third PRS transmitted by the reference base station and reception by the UE of the second PRS.

Clause 35. The non-transitory storage medium of claim 34, wherein the network entity is a location server and the RSTD and position of the UE is determined using OTDOA by the location server.

Clause 36. The non-transitory storage medium of claim 34, wherein the network entity is the UE and the RSTD and position of the UE is determined using OTDOA by the UE.

Clause 37. The non-transitory storage medium of any of claims 34-36, wherein the first PRS is the third PRS transmitted by the reference base station and received by the UE.

Clause 38. The non-transitory storage medium of any of claims 34-37, wherein the propagation delay is determined based on a known distance between the base station and the reference base station.

Clause 39. The non-transitory storage medium of claim 38, wherein the known distance between the base station and the reference base station is determined based on known positions of the base station and the reference base station.

Clause 40. The non-transitory storage medium of claim 38, wherein the known distance between the base station and the reference base station is determined based on a wireless ranging procedure between the base station and the reference base station.

Clause 41. The non-transitory storage medium of any of claims 34-40, wherein the at least the portion of the total delay transmitted to the network entity comprises only the processing delay, wherein the network entity independently obtains the propagation delay.

Clause 42. The non-transitory storage medium of any of claims 34-40, wherein the at least the portion of the total delay transmitted to the network entity comprises the processing delay and position information for the base station.

Clause 43. The non-transitory storage medium of any of claims 34-40, wherein the at least the portion of the total delay transmitted to the network entity comprises the processing delay and the propagation delay.

Clause 44. The non-transitory storage medium of any of claims 34-43, wherein the processing delay comprises one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

Clause 45. A method performed by a location server for supporting Observed Time Difference of Arrival (OTDOA) positioning of a user equipment (UE) in a wireless network, the method comprising: receiving a location information message from the UE comprising an indication of a first time of reception of a first positioning reference signal (PRS) from a reference base station and a second time of reception of a second PRS from a neighboring base station; receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and determining a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

Clause 46. The method of claim 45, wherein the first PRS is the third PRS.

Clause 47. The method of claim 45, further comprising receiving a message from the reference base station indicating a time delay between transmission of the first PRS and transmission of the third PRs, wherein determining the RSTD is further based on the time delay between the transmission of the first PRS and the transmission of the third PRS.

Clause 48. The method of any of claims 45-47, wherein the at least the portion of the total delay received from the neighboring base station comprises only the processing delay and the method further comprises obtaining the propagation delay.

Clause 49. The method of claim 48, wherein the propagation delay is determined based on a known distance between the reference base station and the neighboring base station.

Clause 50. The method of claim 49, wherein the known distance between the neighboring base station and the reference base station is determined based on known positions of the neighboring base station and the reference base station.

Clause 51. The method of claim 48, wherein obtaining the propagation delay comprises: receiving from the reference base station a position of the reference base station; receiving from the neighboring base station a position of the neighboring base station; and determining a distance between the reference base station and the neighboring base station, wherein the propagation delay is determined based on the distance.

Clause 52. The method of any of claims 45-47, wherein the at least the portion of the total delay received from the neighboring base station comprises the processing delay and the propagation delay.

Clause 53. The method of any of claims 45-52, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 54. The method of any of claims 45-53, wherein the indication of the first time of reception of the first PRS and the second time of reception of the second PRS comprises a difference between the first time of reception of the first PRS and the second time of reception of the second PRS.

Clause 55. The method of any of claims 45-54, wherein the indication of the first time of reception of the first PRS and the second time of reception of the second PRS comprises both of the first time of reception of the first PRS and the second time of reception of the second PRS.

Clause 56. A location server configured for supporting Observed Time Difference of Arrival (OTDOA) positioning of a user equipment (UE) in a wireless network comprising: an external interface configured to communicate with entities in the wireless network; at least one memory; at least one processor coupled to the external interface and the at least one memory, wherein the at least one processor is configured to: receive a location information message from the UE comprising an indication of a first time of reception of a first positioning reference signal (PRS) from a reference base station and a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and determine a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

Clause 57. The location server of claim 56, wherein the first PRS is the third PRS.

Clause 58. The location server of claim 56, wherein the at least one processor is further configured to receive a message from the reference base station indicating a time delay between transmission of the first PRS and transmission of the third PRs, wherein the at least one processor is configured to determine the RSTD further based on the time delay between the transmission of the first PRS and the transmission of the third PRS.

Clause 59. The location server of any of claims 56-58, wherein the at least the portion of the total delay received from the neighboring base station comprises only the processing delay and wherein the at least one processor is further configured to obtain the propagation delay.

Clause 60. The location server of claim 59, wherein the propagation delay is determined based on a known distance between the reference base station and the neighboring base station.

Clause 61. The location server of claim 60, wherein the known distance between the neighboring base station and the reference base station is determined based on known positions of the neighboring base station and the reference base station.

Clause 62. The location server of claim 59, wherein the at least one processor is configured to obtain the propagation delay by being configured to: receive from the reference base station a position of the reference base station; receive from the neighboring base station a position of the neighboring base station; and determine a distance between the reference base station and the neighboring base station, wherein the propagation delay is determined based on the distance.

Clause 63. The location server of any of claims 56-58, wherein the at least the portion of the total delay received from the neighboring base station comprises the processing delay and the propagation delay.

Clause 64. The location server of any of claims 56-63, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 65. The location server of any of claims 56-64, wherein the indication of the first time of reception of the first PRS and the second time of reception of the second PRS comprises a difference between the first time of reception of the first PRS and the second time of reception of the second PRS.

Clause 66. The location server of any of claims 56-65, wherein the indication of the first time of reception of the first PRS and the second time of reception of the second PRS comprises both of the first time of reception of the first PRS and the second time of reception of the second PRS.

Clause 67. A location server configured for supporting Observed Time Difference of Arrival (OTDOA) positioning of a user equipment (UE) in a wireless network, comprising: means for receiving a location information message from the UE comprising an indication of a first time of reception of a first positioning reference signal (PRS) from a reference base station and a second time of reception of a second PRS from a neighboring base station; means for receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and means for determining a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

Clause 68. The location server of claim 67, wherein the first PRS is the third PRS.

Clause 69. The location server of claim 67, further comprising means for receiving a message from the reference base station indicating a time delay between transmission of the first PRS and transmission of the third PRs, wherein the means for determining the RSTD determines the RSTD further based on the time delay between the transmission of the first PRS and the transmission of the third PRS.

Clause 70. The location server of any of claims 67-69, wherein the at least the portion of the total delay received from the neighboring base station comprises only the processing delay and further comprising means for obtaining the propagation delay.

Clause 71. The location server of claim 70, wherein the propagation delay is determined based on a known distance between the reference base station and the neighboring base station.

Clause 72. The location server of claim 71, wherein the known distance between the neighboring base station and the reference base station is determined based on known positions of the neighboring base station and the reference base station.

Clause 73. The location server of claim 70, wherein the means for obtaining the propagation delay comprises: means for receiving from the reference base station a position of the reference base station; means for receiving from the neighboring base station a position of the neighboring base station; and means for determining a distance between the reference base station and the neighboring base station, wherein the propagation delay is determined based on the distance.

Clause 74. The location server of any of claims 67-69, wherein the at least the portion of the total delay received from the neighboring base station comprises the processing delay and the propagation delay.

Clause 75. The location server of any of claims 67-74, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 76. The location server of any of claims 67-75, wherein the indication of the first time of reception of the first PRS and the second time of reception of the second PRS comprises a difference between the first time of reception of the first PRS and the second time of reception of the second PRS.

Clause 77. The location server of any of claims 67-76, wherein the indication of the first time of reception of the first PRS and the second time of reception of the second PRS comprises both of the first time of reception of the first PRS and the second time of reception of the second PRS.

Clause 78. A non-transitory storage medium including program code stored thereon, the program code is operable to configure at least one processor in a location server for supporting Observed Time Difference of Arrival (OTDOA) positioning of a user equipment (UE) in a wireless network, the program code comprising instructions to: receive a location information message from the UE comprising an indication of a first time of reception of a first positioning reference signal (PRS) from a reference base station and a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate from the reference base station to the neighboring base station, and the processing delay comprises a second amount of time between the reception by the neighboring base station of the third PRS and transmission of the second PRS by the neighboring base station; and determine a Reference Signal Time Difference (RSTD) between reception of the first PRS and the second PRS by the UE based on the indication of the first time of reception of the first PRS and the second time of reception of the second PRS received from UE and the at least the portion of the total delay for the transmission of the second PRS received from the neighboring base station.

Clause 79. The non-transitory storage medium of claim 78, wherein the first PRS is the third PRS.

Clause 80. The non-transitory storage medium of claim 78, wherein the program code further comprises instructions to receive a message from the reference base station indicating a time delay between transmission of the first PRS and transmission of the third PRs, wherein the program code further comprises instructions to determine the RSTD further based on the time delay between the transmission of the first PRS and the transmission of the third PRS.

Clause 81. The non-transitory storage medium of any of claims 78-80, wherein the at least the portion of the total delay received from the neighboring base station comprises only the processing delay and wherein the program code further comprises instructions to obtain the propagation delay.

Clause 82. The non-transitory storage medium of claim 81, wherein the propagation delay is determined based on a known distance between the reference base station and the neighboring base station.

Clause 83. The non-transitory storage medium of claim 82, wherein the known distance between the neighboring base station and the reference base station is determined based on known positions of the neighboring base station and the reference base station.

Clause 84. The non-transitory storage medium of claim 81, wherein the program code comprising instructions to obtain the propagation delay further comprises instructions to: receive from the reference base station a position of the reference base station; receive from the neighboring base station a position of the neighboring base station; and determine a distance between the reference base station and the neighboring base station, wherein the propagation delay is determined based on the distance.

Clause 85. The non-transitory storage medium of any of claims 78-80, wherein the at least the portion of the total delay received from the neighboring base station comprises the processing delay and the propagation delay.

Clause 86. The non-transitory storage medium of any of claims 78-85, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 87. The non-transitory storage medium of any of claims 78-86, wherein the indication of the first time of reception of the first PRS and the second time of reception of the second PRS comprises a difference between the first time of reception of the first PRS and the second time of reception of the second PRS.

Clause 88. The non-transitory storage medium of any of claims 78-87, wherein the indication of the first time of reception of the first PRS and the second time of reception of the second PRS comprises both of the first time of reception of the first PRS and the second time of reception of the second PRS.

Clause 89. A method performed by a user equipment (UE) for supporting Observed Time Difference of Arrival (OTDOA) positioning of the UE in a wireless network, the method comprising: measuring a first time of reception of a first positioning reference signal (PRS) from a reference base station; measuring a second time of reception of a second PRS from a neighboring base station; receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; and determining a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

Clause 90. The method of claim 89, wherein the first PRS is the third PRS.

Clause 91. The method of claim 89, further comprising receiving a message from the reference base station indicating a time delay between transmission of the first PRS and transmission of the third PRs, wherein determining the RSTD is further based on the time delay between the transmission of the first PRS and the transmission of the third PRS.

Clause 92. The method of any of claims 89-91, wherein the at least the portion of the total delay received from the neighboring base station comprises only the processing delay and the method further comprises determining the propagation delay.

Clause 93. The method of claim 92, wherein determining the propagation delay comprises: receiving from the reference base station a position of the reference base station; receiving from the neighboring base station a position of the neighboring base station; and determining a distance between the reference base station and the neighboring base station, wherein the propagation delay is determined based on the distance.

Clause 94. The method of any of claims 89-91, wherein the at least the portion of the total delay received from the neighboring base station comprises the processing delay and the propagation delay.

Clause 95. The method of any of claims 89-94, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 96. A user equipment (UE) configured for supporting Observed Time Difference of Arrival (OTDOA) positioning of the UE in a wireless network comprising: a wireless transceiver configured to wirelessly communicate with entities in the wireless network; at least one memory; at least one processor coupled to the wireless transceiver and the at least one memory, wherein the at least one processor is configured to: measure a first time of reception of a first positioning reference signal (PRS) from a reference base station; measure a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; and determine a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

Clause 97. The UE of claim 96, wherein the first PRS is the third PRS.

Clause 98. The UE of claim 96, wherein the at least one processor is further configured to receive a message from the reference base station indicating a time delay between transmission of the first PRS and transmission of the third PRs, wherein the at least one processor is configured to determine the RSTD further based on the time delay between the transmission of the first PRS and the transmission of the third PRS.

Clause 99. The UE of any of claims 96-98, wherein the at least the portion of the total delay received from the neighboring base station comprises only the processing delay and the at least one processor is further configured to determine the propagation delay.

Clause 100. The UE of claim 99, wherein the at least one processor is configured to determine the propagation delay by being configured to: receive from the reference base station a position of the reference base station; receive from the neighboring base station a position of the neighboring base station; and determine a distance between the reference base station and the neighboring base station, wherein the propagation delay is determined based on the distance.

Clause 101. The UE of any of claims 96-98, wherein the at least the portion of the total delay received from the neighboring base station comprises the processing delay and the propagation delay.

Clause 102. The UE of any of claims 96-101, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 103. A user equipment (UE) configured for supporting Observed Time Difference of Arrival (OTDOA) positioning of the UE in a wireless network, comprising: means for measuring a first time of reception of a first positioning reference signal (PRS) from a reference base station; means for measuring a second time of reception of a second PRS from a neighboring base station; means for receiving a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; and means for determining a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

Clause 104. The UE of claim 103, wherein the first PRS is the third PRS.

Clause 105. The UE of claim 103, further comprising means for receiving a message from the reference base station indicating a time delay between transmission of the first PRS and transmission of the third PRs, wherein the means for determining the RSTD determines the RST further based on the time delay between the transmission of the first PRS and the transmission of the third PRS.

Clause 106. The UE of any of claims 103-105, wherein the at least the portion of the total delay received from the neighboring base station comprises only the processing delay and further comprising means for determining the propagation delay.

Clause 107. The UE of claim 106, wherein the means for determining the propagation delay comprises: means for receiving from the reference base station a position of the reference base station; means for receiving from the neighboring base station a position of the neighboring base station; and means for determining a distance between the reference base station and the neighboring base station, wherein the propagation delay is determined based on the distance.

Clause 108. The UE of any of claims 103-105, wherein the at least the portion of the total delay received from the neighboring base station comprises the processing delay and the propagation delay.

Clause 109. The UE of any of claims 103-108, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 110. A non-transitory storage medium including program code stored thereon, the program code is operable to configure at least one processor in a user equipment (UE) for supporting Observed Time Difference of Arrival (OT-DOA) positioning of the UE in a wireless network, the program code comprising instructions to: measure a first time of reception of a first positioning reference signal (PRS) from a reference base station; measure a second time of reception of a second PRS from a neighboring base station; receive a measurement report message from the neighboring base station comprising at least a portion of a total delay for transmission of the second PRS by the neighboring base station, the total delay comprising a propagation delay and a processing delay, wherein the propagation delay comprises a first amount of time for a third PRS transmitted by the reference base station to propagate to the neighboring base station, and the processing delay comprises a second amount of time between the reception by the neighboring base station of the third PRS and transmission of the second PRS by the neighboring base station; determine a Reference Signal Time Difference (RSTD) between reception of the first PRS and the second PRS by the UE based on a difference between the first time of reception of the first PRS and the second time of reception of the second PRS and the total delay for the transmission of the second PRS received from the neighboring base station.

Clause 111. The non-transitory storage medium of claim 110, wherein the first PRS is the third PRS.

Clause 112. The non-transitory storage medium of claim 110, wherein the program code further comprises instructions to receive a message from the reference base station indicating a time delay between transmission of the first PRS and transmission of the third PRs, wherein the program code comprises instructions to determine the RSTD further based on the time delay between the transmission of the first PRS and the transmission of the third PRS.

Clause 113. The non-transitory storage medium of any of claims 110-112, wherein the at least the portion of the total delay received from the neighboring base station comprises only the processing delay and the program code further comprises instructions to determine the propagation delay.

Clause 114. The non-transitory storage medium of claim 113, wherein the program code comprising instructions to determine the propagation delay comprises instructions to: receive from the reference base station a position of the reference base station; receive from the neighboring base station a position of the neighboring base station; and determine a distance between the reference base station and the neighboring base station, wherein the propagation delay is determined based on the distance.

Clause 115. The non-transitory storage medium of any of claims 110-112, wherein the at least the portion of the total delay received from the neighboring base station comprises the processing delay and the propagation delay.

Clause 116. The non-transitory storage medium of any of claims 110-115, wherein the processing delay comprises one or more of a group delay in the neighboring base station in receiving the first PRS; a group delay in the neighboring base station in transmitting the second PRS; processing latency in the neighboring base station; delays in the neighboring base station due to transmission restrictions including alignment of the second PRS transmission with a System Frame Number, a slot, or a symbol; or any combination thereof.

Clause 117. A method performed by a base station for supporting Uplink Time Difference of Arrival (UTDOA) positioning of a user equipment (UE) in a wireless network, the method comprising: receiving a sounding reference signal (SRS) for positioning from the UE; transmitting a positioning reference signal (PRS) to a reference base station in response to receiving the SRs, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and transmitting to a network entity at least a portion of the total delay for determination of a Reference Signal Time Difference (RSTD) between receiving the SRS from the UE and reception by the reference base station of a second SRS transmitted by the UE.

Clause 118. The method of claim 117, wherein the network entity is a location server and the RSTD and position of the UE is determined using UTDOA by the location server.

Clause 119. The method of claim 117, wherein the network entity is the UE and the RSTD and position of the UE is determined using UTDOA by the UE.

Clause 120. The method of any of claims 117-119, wherein the SRS is the second SRS transmitted by the reference base station and received by the UE.

Clause 121. The method of any of claims 117-120, wherein the propagation delay is determined based on a known distance between the base station and the reference base station.

Clause 122. The method of claim 121, wherein the known distance between the base station and the reference base station is determined based on known positions of the base station and the reference base station.

Clause 123. The method of claim 121, wherein the known distance between the base station and the reference base station is determined based on a wireless ranging procedure between the base station and the reference base station.

Clause 124. The method of any of claims 117-123, wherein the at least the portion of the total delay transmitted to the network entity comprises only the processing delay, wherein the network entity independently obtains the propagation delay.

Clause 125. The method of any of claims 117-123, wherein the at least the portion of the total delay transmitted to the network entity comprises the processing delay and position information for the base station.

Clause 126. The method of any of claims 117-123, wherein the at least the portion of the total delay transmitted to the network entity comprises the processing delay and the propagation delay.

Clause 127. The method of any of claims 117-126, wherein the processing delay comprises one or more of a group delay in receiving the SRS; a group delay in transmitting the PRS; processing latency; delays in the base station due to transmission restrictions including alignment of the second PRS transmission with a System Frame Number, a slot, or a symbol; or any combination thereof.

Clause 128. A base station configured for supporting Uplink Time Difference of Arrival (UTDOA) positioning of a user equipment (UE) in a wireless network comprising: an external interface configured to communicate with entities in the wireless network; at least one memory; at least one processor coupled to the external interface and the at least one memory, wherein the at least one processor is configured to: receive a sounding reference signal (SRS) for positioning from the UE; transmit a positioning reference signal (PRS) to a reference base station in response to receiving the SRs, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and transmit to a network entity at least a portion of the total delay for determination of a Reference Signal Time Difference (RSTD) between receiving the SRS from the UE and reception by the reference base station of a second SRS transmitted by the UE.

Clause 129. The base station of claim 128, wherein the network entity is a location server and the RSTD and position of the UE is determined using UTDOA by the location server.

Clause 130. The base station of claim 128, wherein the network entity is the UE and the RSTD and position of the UE is determined using UTDOA by the UE.

Clause 131. The base station of any of claims 128-130, wherein the SRS is the second SRS transmitted by the reference base station and received by the UE.

Clause 132. The base station of any of claims 128-131, wherein the propagation delay is determined based on a known distance between the base station and the reference base station.

Clause 133. The base station of claim 132, wherein the known distance between the base station and the reference base station is determined based on known positions of the base station and the reference base station.

Clause 134. The base station of claim 132, wherein the known distance between the base station and the reference base station is determined based on a wireless ranging procedure between the base station and the reference base station.

Clause 135. The base station of any of claims 128-134, wherein the at least the portion of the total delay transmitted to the network entity comprises only the processing delay, wherein the network entity independently obtains the propagation delay.

Clause 136. The base station of any of claims 128-134, wherein the at least the portion of the total delay transmitted to the network entity comprises the processing delay and position information for the base station.

Clause 137. The base station of any of claims 128-134, wherein the at least the portion of the total delay transmitted to the network entity comprises the processing delay and the propagation delay.

Clause 138. The base station of any of claims 128-137, wherein the processing delay comprises one or more of a group delay in receiving the SRS; a group delay in transmitting the PRS; processing latency; delays in the base station due to transmission restrictions including alignment of the second PRS transmission with a System Frame Number, a slot, or a symbol; or any combination thereof.

Clause 139. A base station configured for supporting Uplink Time Difference of Arrival (UTDOA) positioning of a user equipment (UE) in a wireless network, comprising: means for receiving a sounding reference signal (SRS) for positioning from the UE; means for transmitting a positioning reference signal (PRS) to a reference base station in response to receiving the SRs, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and means for transmitting to a network entity at least a portion of the total delay for determination of a Reference Signal Time Difference (RSTD) between receiving the SRS from the UE and reception by the reference base station of a second SRS transmitted by the UE.

Clause 140. The base station of claim 139, wherein the network entity is a location server and the RSTD and position of the UE is determined using UTDOA by the location server.

Clause 141. The base station of claim 139, wherein the network entity is the UE and the RSTD and position of the UE is determined using UTDOA by the UE.

Clause 142. The base station of any of claims 128-141, wherein the SRS is the second SRS transmitted by the reference base station and received by the UE.

Clause 143. The base station of any of claims 128-142, wherein the propagation delay is determined based on a known distance between the base station and the reference base station.

Clause 144. The base station of claim 143, wherein the known distance between the base station and the reference base station is determined based on known positions of the base station and the reference base station.

Clause 145. The base station of claim 143, wherein the known distance between the base station and the reference base station is determined based on a wireless ranging procedure between the base station and the reference base station.

Clause 146. The base station of any of claims 128-145, wherein the at least the portion of the total delay transmitted to the network entity comprises only the processing delay, wherein the network entity independently obtains the propagation delay.

Clause 147. The base station of any of claims 128-145, wherein the at least the portion of the total delay transmitted to the network entity comprises the processing delay and position information for the base station.

Clause 148. The base station of any of claims 128-145, wherein the at least the portion of the total delay transmitted to the network entity comprises the processing delay and the propagation delay.

Clause 149. The base station of any of claims 128-147, wherein the processing delay comprises one or more of a group delay in receiving the SRS; a group delay in transmitting the PRS; processing latency; delays in the base station due to transmission restrictions including alignment of the second PRS transmission with a System Frame Number, a slot, or a symbol; or any combination thereof.

Clause 150. A non-transitory storage medium including program code stored thereon, the program code is operable to configure at least one processor in a base station for supporting Uplink Time Difference of Arrival (UTDOA) positioning of a user equipment (UE) in a wireless network, the program code comprising instructions to: receive a sounding reference signal (SRS) for positioning from the UE; transmit a positioning reference signal (PRS) to a reference base station in response to receiving the SRs, wherein a total delay associated with the PRS comprises a processing delay and a propagation delay, wherein the processing delay comprises a first amount of time between receiving the SRS and transmitting the PRS, and the propagation delay comprises a second amount of time for the PRS to propagate from the base station to the reference base station; and transmit to a network entity at least a portion of the total delay for determination of a Reference Signal Time Difference (RSTD) between receiving the SRS from the UE and reception by the reference base station of a second SRS transmitted by the UE.

Clause 151. The non-transitory storage medium of claim 150, wherein the network entity is a location server and the RSTD and position of the UE is determined using UTDOA by the location server.

Clause 152. The non-transitory storage medium of claim 150, wherein the network entity is the UE and the RSTD and position of the UE is determined using UTDOA by the UE.

Clause 153. The non-transitory storage medium of any of claims 128-152, wherein the SRS is the second SRS transmitted by the reference base station and received by the UE.

Clause 154. The non-transitory storage medium of any of claims 128-153, wherein the propagation delay is determined based on a known distance between the base station and the reference base station.

Clause 155. The non-transitory storage medium of claim 154, wherein the known distance between the base station and the reference base station is determined based on known positions of the base station and the reference base station.

Clause 156. The non-transitory storage medium of claim 154, wherein the known distance between the base station and the reference base station is determined based on a wireless ranging procedure between the base station and the reference base station.

Clause 157. The non-transitory storage medium of any of claims 128-156, wherein the at least the portion of the total delay transmitted to the network entity comprises only the processing delay, wherein the network entity independently obtains the propagation delay.

Clause 158. The non-transitory storage medium of any of claims 128-156, wherein the at least the portion of the total delay transmitted to the network entity comprises the processing delay and position information for the base station.

Clause 159. The non-transitory storage medium of any of claims 128-156, wherein the at least the portion of the total delay transmitted to the network entity comprises the processing delay and the propagation delay.

Clause 160. The non-transitory storage medium of any of claims 128-159, wherein the processing delay comprises one or more of a group delay in receiving the SRS; a group delay in transmitting the PRS; processing latency; delays in the base station due to transmission restrictions including alignment of the second PRS transmission with a System Frame Number, a slot, or a symbol; or any combination thereof.

Clause 161. A method performed by a base station for supporting Uplink Time Difference of Arrival (UTDOA) positioning of a user equipment (UE) in a wireless network, the method comprising: measuring a first time of reception of a sounding reference signal (SRS) from the UE; measuring a second time of reception of a positioning reference signal (PRS) from a neighboring base station; and transmitting to a network entity an indication of a difference between the first time of reception of the SRS and the second time of reception of the PRS for determination of a Reference Signal Time Difference (RSTD) between receiving the SRS from the UE and receiving the PRS from the neighboring base station.

Clause 162. The method of claim 161, wherein the network entity is a location server and the RSTD and position of the UE is determined using UTDOA by the location server.

Clause 163. The method of claim 161, wherein the network entity is the UE and the RSTD and position of the UE is determined using UTDOA by the UE.

Clause 164. A base station configured for supporting Uplink Time Difference of Arrival (UTDOA) positioning of a user equipment (UE) in a wireless network comprising: an external interface configured to communicate with entities in the wireless network; at least one memory; at least one processor coupled to the external interface and the at least one memory, wherein the at least one processor is configured to: measure a first time of reception of a sounding reference signal (SRS) from the UE; measure a second time of reception of a positioning reference signal (PRS) from a neighboring base station; and transmit to a network entity an indication of a difference between the first time of reception of the SRS and the second time of reception of the PRS for determination of a Reference Signal Time Difference (RSTD) between receiving the SRS from the UE and receiving the PRS from the neighboring base station.

Clause 165. The base station of claim 164, wherein the network entity is a location server and the RSTD and position of the UE is determined using UTDOA by the location server.

Clause 166. The base station of claim 164, wherein the network entity is the UE and the RSTD and position of the UE is determined using UTDOA by the UE.

Clause 167. A base station configured for supporting Uplink Time Difference of Arrival (UTDOA) positioning of a user equipment (UE) in a wireless network, comprising: means for measuring a first time of reception of a sounding reference signal (SRS) from the UE; means for measuring a second time of reception of a positioning reference signal (PRS) from a neighboring base station; and means for transmitting to a network entity an indication of a difference between the first time of reception of the SRS and the second time of reception of the PRS for determination of a Reference Signal Time Difference (RSTD) between receiving the SRS from the UE and receiving the PRS from the neighboring base station.

Clause 168. The base station of claim 167, wherein the network entity is a location server and the RSTD and position of the UE is determined using UTDOA by the location server.

Clause 169. The base station of claim 167, wherein the network entity is the UE and the RSTD and position of the UE is determined using UTDOA by the UE.

Clause 170. A non-transitory storage medium including program code stored thereon, the program code is operable to configure at least one processor in a base station for supporting Uplink Time Difference of Arrival (UTDOA) positioning of a user equipment (UE) in a wireless network, the program code comprising instructions to: measure a first time of reception of a sounding reference signal (SRS) from the UE; measure a second time of reception of a positioning reference signal (PRS) from a neighboring base station; and transmit to a network entity an indication of a difference between the first time of reception of the SRS and the second time of reception of the PRS for determination of a Reference Signal Time Difference (RSTD) between receiving the SRS from the UE and receiving the PRS from the neighboring base station.

Clause 171. The non-transitory storage medium of claim 170, wherein the network entity is a location server and the RSTD and position of the UE is determined using UTDOA by the location server.

Clause 172. The non-transitory storage medium of claim 170, wherein the network entity is the UE and the RSTD and position of the UE is determined using UTDOA by the UE.

Clause 173. A method performed by a location server for supporting Uplink Time Difference of Arrival (UTDOA) positioning of a user equipment (UE) in a wireless network, the method comprising: receiving a first measurement report message from a reference base station comprising an indication of a first time of reception of a first sounding reference signal (SRS) for positioning from the UE and a second time of reception of a positioning reference signal (PRS) from a neighboring base station; receiving a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and determining a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

Clause 174. The method of claim 173, wherein the first SRS is the second SRS.

Clause 175. The method of claim 173, further comprising receiving a message from the UE indicating a time delay between transmission of the first SRS and transmission of the second SRs, wherein determining the RSTD is further based on the time delay between the transmission of the first SRS and the transmission of the second SRS.

Clause 176. The method of any of claims 173-175, wherein the at least the portion of the total delay received from the neighboring base station comprises only the processing delay and the method further comprises obtaining the propagation delay.

Clause 177. The method of claim 176, wherein the propagation delay is determined based on a known distance between the reference base station and the neighboring base station.

Clause 178. The method of claim 177, wherein the known distance between the neighboring base station and the reference base station is determined based on known positions of the neighboring base station and the reference base station.

Clause 179. The method of claim 176, wherein obtaining the propagation delay comprises: receiving from the reference base station a position of the reference base station; receiving from the neighboring base station a position of the neighboring base station; and determining a distance between the reference base station and the neighboring base station, wherein the propagation delay is determined based on the distance.

Clause 180. The method of any of claims 173-175, wherein the at least the portion of the total delay received from the neighboring base station comprises the processing delay and the propagation delay.

Clause 181. The method of any of claims 173-180, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 182. The method of any of claims 173-181, wherein the indication of the first time of reception of the first SRS and the second time of reception of the PRS comprises a difference between the first time of reception of the first SRS and the second time of reception of the PRS.

Clause 183. The method of any of claims 173-181, wherein the indication of the first time of reception of the first SRS and the second time of reception of the PRS comprises both of the first time of reception of the first SRS and the second time of reception of the PRS.

Clause 184. A location server configured for supporting Uplink Time Difference of Arrival (UTDOA) positioning of a user equipment (UE) in a wireless network comprising: an external interface configured to communicate with entities in the wireless network; at least one memory; at least one processor coupled to the external interface and the at least one memory, wherein the at least one processor is configured to: receive a first measurement report message from a reference base station comprising an indication of a first time of reception of a first sounding reference signal (SRS) for positioning from the UE and a second time of reception of a positioning reference signal (PRS) from a neighboring base station; receive a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and determine a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

Clause 185. The location server of claim 184, wherein the first SRS is the second SRS.

Clause 186. The location server of claim 184, wherein the at least one processor is further configured to receive a message from the UE indicating a time delay between transmission of the first SRS and transmission of the second SRs, wherein the at least one processor is configured to determine the RSTD further based on the time delay between the transmission of the first SRS and the transmission of the second SRS.

Clause 187. The location server of any of claims 184-186, wherein the at least the portion of the total delay received from the neighboring base station comprises only the processing delay and the at least one processor is further configured to obtain the propagation delay.

Clause 188. The location server of claim 187, wherein the propagation delay is determined based on a known distance between the reference base station and the neighboring base station.

Clause 189. The location server of claim 188, wherein the known distance between the neighboring base station and the reference base station is determined based on known positions of the neighboring base station and the reference base station.

Clause 190. The location server of claim 187, wherein the at least one processor is configured to obtain the propagation delay by being configured to: receive from the reference base station a position of the reference base station; receive from the neighboring base station a position of the neighboring base station; and determine a distance between the reference base station and the neighboring base station, wherein the propagation delay is determined based on the distance.

Clause 191. The location server of any of claims 184-186, wherein the at least the portion of the total delay received from the neighboring base station comprises the processing delay and the propagation delay.

Clause 192. The location server of any of claims 184-191, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 193. The location server of any of claims 184-192, wherein the indication of the first time of reception of the first SRS and the second time of reception of the PRS comprises a difference between the first time of reception of the first SRS and the second time of reception of the PRS.

Clause 194. The location server of any of claims 184-192, wherein the indication of the first time of reception of the first SRS and the second time of reception of the PRS comprises both of the first time of reception of the first SRS and the second time of reception of the PRS.

Clause 195. A location server configured for supporting Uplink Time Difference of Arrival (UTDOA) positioning of a user equipment (UE) in a wireless network, comprising: means for receiving a first measurement report message from a reference base station comprising an indication of a first time of reception of a first sounding reference signal (SRS) for positioning from the UE and a second time of reception of a positioning reference signal (PRS) from a neighboring base station; means for receiving a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and means for determining a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

Clause 196. The location server of claim 195, wherein the first SRS is the second SRS.

Clause 197. The location server of claim 195, further comprising means for receiving a message from the UE indicating a time delay between transmission of the first SRS and transmission of the second SRs, wherein the means for determining the RSTD determines the RSTD further based on the time delay between the transmission of the first SRS and the transmission of the second SRS.

Clause 198. The location server of any of claims 195-197, wherein the at least the portion of the total delay received from the neighboring base station comprises only the processing delay and further comprising means for obtaining the propagation delay.

Clause 199. The location server of claim 198, wherein the propagation delay is determined based on a known distance between the reference base station and the neighboring base station.

Clause 200. The location server of claim 199, wherein the known distance between the neighboring base station and the reference base station is determined based on known positions of the neighboring base station and the reference base station.

Clause 201. The location server of claim 198, wherein the means for obtaining the propagation delay comprises: means for receiving from the reference base station a position of the reference base station; means for receiving from the neighboring base station a position of the neighboring base station; and means for determining a distance between the reference base station and the neighboring base station, wherein the propagation delay is determined based on the distance.

Clause 202. The location server of any of claims 195-197, wherein the at least the portion of the total delay received from the neighboring base station comprises the processing delay and the propagation delay.

Clause 203. The location server of any of claims 195-202, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 204. The location server of any of claims 195-203, wherein the indication of the first time of reception of the first SRS and the second time of reception of the PRS comprises a difference between the first time of reception of the first SRS and the second time of reception of the PRS.

Clause 205. The location server of any of claims 195-203, wherein the indication of the first time of reception of the first SRS and the second time of reception of the PRS comprises both of the first time of reception of the first SRS and the second time of reception of the PRS.

Clause 206. A non-transitory storage medium including program code stored thereon, the program code is operable to configure at least one processor in a location server for supporting Uplink Time Difference of Arrival (UTDOA) positioning of a user equipment (UE) in a wireless network, the program code comprising instructions to: receive a first measurement report message from a reference base station comprising an indication of a first time of reception of a first sounding reference signal (SRS) for positioning from the UE and a second time of reception of a positioning reference signal (PRS) from a neighboring base station; receive a second measurement report message from the neighboring base station comprising at least a portion of a total delay associated with the PRS, the total delay comprising a processing delay and a propagation delay, wherein the processing delay comprises a first amount of time between the reception by the neighboring base station of a second SRS from the UE and transmission of the PRS by the neighboring base station, and the propagation delay comprises a second amount of time for the PRS to propagate from the neighboring base station to the reference base station; and determine a Reference Signal Time Difference (RSTD) between reception of the first SRS by the reference base station and the second SRS by the neighboring base station based on the indication of the first time of reception of the first SRS and the second time of reception of the PRS received from the reference base station and the at least the portion of the total delay associated with the PRS received from the neighboring base station.

Clause 207. The non-transitory storage medium of claim 206, wherein the first SRS is the second SRS.

Clause 208. The non-transitory storage medium of claim 206, wherein the program code further comprises instructions to receive a message from the UE indicating a time delay between transmission of the first SRS and transmission of the second SRs, wherein the program code further comprises instructions to determine the RSTD further based on the time delay between the transmission of the first SRS and the transmission of the second SRS.

Clause 209. The non-transitory storage medium of any of claims 206-208, wherein the at least the portion of the total delay received from the neighboring base station comprises only the processing delay and the program code further comprises instructions to obtain the propagation delay.

Clause 210. The non-transitory storage medium of claim 209, wherein the propagation delay is determined based on a known distance between the reference base station and the neighboring base station.

Clause 211. The non-transitory storage medium of claim 210, wherein the known distance between the neighboring base station and the reference base station is determined based on known positions of the neighboring base station and the reference base station.

Clause 212. The non-transitory storage medium of claim 209, wherein the program code comprising instructions to obtain the propagation delay comprises instructions to: receive from the reference base station a position of the reference base station; receive from the neighboring base station a position of the neighboring base station; and determine a distance between the reference base station and the neighboring base station, wherein the propagation delay is determined based on the distance.

Clause 213. The non-transitory storage medium of any of claims 206-208, wherein the at least the portion of the total delay received from the neighboring base station comprises the processing delay and the propagation delay.

Clause 214. The non-transitory storage medium of any of claims 206-213, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 215. The non-transitory storage medium of any of claims 206-214, wherein the indication of the first time of reception of the first SRS and the second time of reception of the PRS comprises a difference between the first time of reception of the first SRS and the second time of reception of the PRS.

Clause 216. The non-transitory storage medium of any of claims 206-214, wherein the indication of the first time of reception of the first SRS and the second time of reception of the PRS comprises both of the first time of reception of the first SRS and the second time of reception of the PRS.

Clause 217. A method performed by a user equipment (UE) for supporting Uplink Time Difference of Arrival (UTDOA) positioning of the UE in a wireless network, the method comprising: transmitting at least one sounding reference signal (SRS) for positioning to be received by a reference base station and a neighboring base station; receiving a first measurement report message from the reference base station comprising an indication of a first time of reception of at least one SRS by the reference base station and a second time of reception by the reference base station of a positioning reference signal (PRS) from the neighboring base station; receiving a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and determining a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

Clause 218. The method of claim 217, wherein a same SRS is received by the reference base station and the neighboring base station.

Clause 219. The method of claim 217, wherein the reference base station receives a first SRS and the neighboring base station receives a second SRs, wherein there is a time delay between transmission of the first SRS and transmission of the second SRs, wherein determining the RSTD is further based on the time delay between the transmission of the first SRS and the transmission of the second SRS.

Clause 220. The method of any of claims 217-219, wherein the at least the portion of the total delay received from the neighboring base station comprises only the processing delay and the method further comprises determining the propagation delay.

Clause 221. The method of claim 220, wherein determining the propagation delay comprises: receiving from the reference base station a position of the reference base station; receiving from the neighboring base station a position of the neighboring base station; and determining a distance between the reference base station and the neighboring base station, wherein the propagation delay is determined based on the distance.

Clause 222. The method of any of claims 217-219, wherein the at least the portion of the total delay received from the neighboring base station comprises the processing delay and the propagation delay.

Clause 223. The method of any of claims 217-222, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 224. A user equipment (UE) configured for supporting Uplink Time Difference of Arrival (UTDOA) positioning of the UE in a wireless network comprising: a wireless transceiver configured to wirelessly communicate with entities in the wireless network; at least one memory; at least one processor coupled to the wireless transceiver and the at least one memory, wherein the at least one processor is configured to: transmit at least one sounding reference signal (SRS) for positioning to be received by a reference base station and a neighboring base station; receive a first measurement report message from the reference base station comprising an indication of a first time of reception of at least one SRS by the reference base station and a second time of reception by the reference base station of a positioning reference signal (PRS) from the neighboring base station; receive a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and determine a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

Clause 225. The UE of claim 224, wherein a same SRS is received by the reference base station and the neighboring base station.

Clause 226. The UE of claim 224, wherein the reference base station receives a first SRS and the neighboring base station receives a second SRs, wherein there is a time delay between transmission of the first SRS and transmission of the second SRS, wherein the at least one processor is configured to determine the RSTD further based on the time delay between the transmission of the first SRS and the transmission of the second SRS.

Clause 227. The UE of any of claims 224-226, wherein the at least the portion of the total delay received from the neighboring base station comprises only the processing delay and the at least one processor is further configured to determine the propagation delay.

Clause 228. The UE of claim 227, wherein the at least one processor is configured to determine the propagation delay by being configured to: receive from the reference base station a position of the reference base station; receive from the neighboring base station a position of the neighboring base station; and determine a distance between the reference base station and the neighboring base station, wherein the propagation delay is determined based on the distance.

Clause 229. The UE of any of claims 224-226, wherein the at least the portion of the total delay received from the neighboring base station comprises the processing delay and the propagation delay.

Clause 230. The UE of any of claims 224-229, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 231. A user equipment (UE) configured for supporting Uplink Time Difference of Arrival (UTDOA) positioning of the UE in a wireless network, comprising: means for transmitting at least one sounding reference signal (SRS) for positioning to be received by a reference base station and a neighboring base station; means for receiving a first measurement report message from the reference base station comprising an indication of a first time of reception of at least one SRS by the reference base station and a second time of reception by the reference base station of a positioning reference signal (PRS) from the neighboring base station; means for receiving a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and means for determining a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

Clause 232. The UE of claim 231, wherein a same SRS is received by the reference base station and the neighboring base station.

Clause 233. The UE of claim 231, wherein the reference base station receives a first SRS and the neighboring base station receives a second SRs, wherein there is a time delay between transmission of the first SRS and transmission of the second SRS, wherein determining the RSTD is further based on the time delay between the transmission of the first SRS and the transmission of the second SRS.

Clause 234. The UE of any of claims 231-233, wherein the at least the portion of the total delay received from the neighboring base station comprises only the processing delay and the method further comprises determining the propagation delay.

Clause 235. The UE of claim 234, wherein the means for determining the propagation delay comprises: means for receiving from the reference base station a position of the reference base station; means for receiving from the neighboring base station a position of the neighboring base station; and means for determining a distance between the reference base station and the neighboring base station, wherein the propagation delay is determined based on the distance.

Clause 236. The UE of any of claims 224-233, wherein the at least the portion of the total delay received from the neighboring base station comprises the processing delay and the propagation delay.

Clause 237. The UE of any of claims 224-236, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Clause 238. A non-transitory storage medium including program code stored thereon, the program code is operable to configure at least one processor in a user equipment (UE) for supporting Uplink Time Difference of Arrival (UTDOA) positioning of the UE in a wireless network, the program code comprising instructions to: transmit at least one sounding reference signal (SRS) for positioning to be received by a reference base station and a neighboring base station; receive a first measurement report message from the reference base station comprising an indication of a first time of reception of at least one SRS by the reference base station and a second time of reception by the reference base station of a positioning reference signal (PRS) from the neighboring base station; receive a second measurement report message from the neighboring base station comprising at least a portion of a total delay associated with the PRS, the total delay comprising a processing delay and a propagation delay, wherein the processing delay comprises a first amount of time between the reception of the at least one SRS by the neighboring base station and transmission of the PRS by the neighboring base station, and the propagation delay comprises a second amount of time for the PRS to propagate from the neighboring base station to the reference base station; and determine a Reference Signal Time Difference (RSTD) between reception of the at least one SRS by the reference base station and the at least one SRS by the neighboring base station based on the indication of the first time of reception of the at least one SRS and the second time of reception of the PRS received from the reference base station and the at least the portion of the total delay associated with the PRS received from the neighboring base station.

Clause 239. The non-transitory storage medium of claim 238, wherein a same SRS is received by the reference base station and the neighboring base station.

Clause 240. The non-transitory storage medium of claim 238, wherein the reference base station receives a first SRS and the neighboring base station receives a second SRs, wherein there is a time delay between transmission of the first SRS and transmission of the second SRs, wherein the program code comprises instructions to determine the RSTD further based on the time delay between the transmission of the first SRS and the transmission of the second SRS.

Clause 241. The non-transitory storage medium of any of claims 238-240, wherein the at least the portion of the total delay received from the neighboring base station comprises only the processing delay and the program code further comprises instructions to determine the propagation delay.

Clause 242. The non-transitory storage medium of claim 241, wherein the program code comprising instructions to determine the propagation delay further comprises instructions to: receive from the reference base station a position of the reference base station; receive from the neighboring base station a position of the neighboring base station; and determine a distance between the reference base station and the neighboring base station, wherein the propagation delay is determined based on the distance.

Clause 243. The non-transitory storage medium of any of claims 238-240, wherein the at least the portion of the total delay received from the neighboring base station comprises the processing delay and the propagation delay.

Clause 244. The non-transitory storage medium of any of claims 238-243, wherein the processing delay comprises one or more of a group delay in the neighboring base station in receiving the SRS; a group delay in the neighboring base station in transmitting the PRS; processing latency in the neighboring base station; delays in the neighboring base station due to transmission restrictions including alignment of the second PRS transmission with a System Frame Number, a slot, or a symbol; or any combination thereof.

Therefore, it is intended that claimed subject matter not be limited to the particular examples disclosed, but that such claimed subject matter may also include all aspects falling within the scope of appended claims, and equivalents thereof.

What is claimed is:

1. A method performed by a base station for supporting Observed Time Difference of Arrival (OTDOA) positioning of a user equipment (UE) in a wireless network, the method comprising:

receiving a first positioning reference signal (PRS) from a reference base station;

transmitting a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmitting to a network entity at least a portion of the total delay for determination of a Reference Signal Time Difference (RSTD) between reception by the UE of a third PRS transmitted by the reference base station and reception by the UE of the second PRS.

2. The method of claim 1, wherein the network entity is a location server and the RSTD and position of the UE is determined using OTDOA by the location server.

3. The method of claim 1, wherein the network entity is the UE and the RSTD and position of the UE is determined using OTDOA by the UE.

4. The method of claim 1, wherein the first PRS is the third PRS transmitted by the reference base station and received by the UE.

5. The method of claim 1, wherein the propagation delay is determined based on a known distance between the base station and the reference base station.

6. The method of claim 1, wherein the at least the portion of the total delay transmitted to the network entity comprises only the processing delay, wherein the network entity independently obtains the propagation delay.

7. The method of claim 1, wherein the at least the portion of the total delay transmitted to the network entity comprises the processing delay and position information for the base station.

8. The method of claim 1, wherein the at least the portion of the total delay transmitted to the network entity comprises the processing delay and the propagation delay.

9. The method of claim 1, wherein the processing delay comprises one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

10. A base station configured for supporting Observed Time Difference of Arrival (OTDOA) positioning of a user equipment (UE) in a wireless network comprising:

an external interface configured to communicate with entities in the wireless network;

at least one memory;

at least one processor coupled to the external interface and the at least one memory, wherein the at least one processor is configured to:

receive a first positioning reference signal (PRS) from a reference base station;

transmit a second PRS to the UE in response to receiving the first PRS, wherein a total delay for transmitting the second PRS comprises a propagation delay and a processing delay, wherein the propagation delay comprises a first amount of time for the first PRS to propagate from the reference base station to the base station and the processing delay comprises a second amount of time between receiving the first PRS and transmitting the second PRS; and transmit to a network entity at least a portion of the total delay for determination of a Reference Signal Time Difference (RSTD) between reception by the UE of a third PRS transmitted by the reference base station and reception by the UE of the second PRS.

11. The base station of claim 10, wherein the network entity is a location server and the RSTD and position of the UE is determined using OTDOA by the location server.

12. The base station of claim 10, wherein the network entity is the UE and the RSTD and position of the UE is determined using OTDOA by the UE.

13. The base station of claim 10, wherein the first PRS is the third PRS transmitted by the reference base station and received by the UE.

14. The base station of claim 10, wherein the propagation delay is determined based on a known distance between the base station and the reference base station.

15. The base station of claim 10, wherein the at least the portion of the total delay transmitted to the network entity comprises only the processing delay, wherein the network entity independently obtains the propagation delay.

16. The base station of claim 10, wherein the at least the portion of the total delay transmitted to the network entity comprises the processing delay and position information for the base station.

17. The base station of claim 10, wherein the at least the portion of the total delay transmitted to the network entity comprises the processing delay and the propagation delay.

18. The base station of claim 10, wherein the processing delay comprises one or more of a group delay in receiving the first PRS; a group delay in transmitting the second PRS; processing latency; delays due to transmission restrictions including alignment of the second PRS transmission with a System Frame Number, a slot, or a symbol; or any combination thereof.

* * * * *